(12) United States Patent
Kondo et al.

(10) Patent No.: US 7,679,678 B2
(45) Date of Patent: Mar. 16, 2010

(54) DATA PROCESSING DEVICE AND METHOD, AND RECORDING MEDIUM AND PROGRAM

(75) Inventors: Tetsujiro Kondo, Tokyo (JP); Kazutaka Ando, Kanagawa (JP)

(73) Assignee: Sony Corporation, Tokyo (JP)

( * ) Notice: Subject to any disclaimer, the term of this patent is extended or adjusted under 35 U.S.C. 154(b) by 2272 days.

(21) Appl. No.: 10/019,124

(22) PCT Filed: Feb. 28, 2001

(86) PCT No.: PCT/JP01/01525

§ 371 (c)(1),
(2), (4) Date: Oct. 25, 2001

(87) PCT Pub. No.: WO01/65847

PCT Pub. Date: Sep. 7, 2001

(65) Prior Publication Data

US 2003/0103668 A1      Jun. 5, 2003

(30) Foreign Application Priority Data

Feb. 29, 2000 (JP) ............................ P2000-053098

(51) Int. Cl.
  *H04N 7/08* (2006.01)
(52) U.S. Cl. .................... 348/473; 348/465; 348/466; 348/470; 348/581; 358/3.28
(58) Field of Classification Search .................. 348/473, 348/461, 465, 466, 460, 470, 581; 358/3.28; 283/113; 713/176
See application file for complete search history.

(56) References Cited

U.S. PATENT DOCUMENTS 5,243,423 A * 9/1993 DeJean et al. ................ 348/473
5,469,216 A * 11/1995 Takahashi et al. ........... 348/441
5,768,535 A    6/1998 Chaddha et al.
6,246,439 B1 * 6/2001 Zink et al. .................... 348/473
6,252,631 B1 * 6/2001 Lakhani ....................... 348/466

(Continued)

FOREIGN PATENT DOCUMENTS

| EP | 0 788 282 | 8/1997 |
|---|---|---|
| JP | 4-292077 | 10/1992 |
| JP | 08 51622 | 2/1996 |

(Continued)

OTHER PUBLICATIONS

Wu M et al: "Watermarking/Data Hiding" NSF Industry/University Co-Operative Research Center for Next Generation Video CNGV Document No. PR-00-08, 'Online! Jan. 11, 2000, XP002326037 Retrieved from the Internet: URL:http://www.ecse.rpi.edu/CNGV/publications/2000_PR/water-hiding_BL.PDF> retrieved on Apr. 21, 2005!

(Continued)

Primary Examiner—M. Lee
Assistant Examiner—Jean W Désir
(74) Attorney, Agent, or Firm—Frommer Lawrence & Haug LLP; William S. Frommer; Thomas F. Presson

(57) ABSTRACT

An improvement information generating unit (11) generates a plurality of types of improvement information for improving the image quality of an image (broadcast image) broadcast as a program. An integrating unit (12) embeds one or more of the plurality of types of improvement information generated by the improvement information generating unit (11) into the broadcast image, thus integrating the improvement information with the broadcast image, and outputs an integrated signal. The integrated signal is transmitted via a transmitting unit (13). Thus, images of various image qualities are provided.

65 Claims, 29 Drawing Sheets

U.S. PATENT DOCUMENTS

| | | | |
|---|---|---|---|
| 6,323,905 B1 * | 11/2001 | Kondo et al. | 348/441 |
| 6,339,615 B1 * | 1/2002 | Kondo et al. | 375/240.14 |
| 6,389,055 B1 * | 5/2002 | August et al. | 375/130 |
| 6,970,508 B1 * | 11/2005 | Kondo | 375/240.14 |
| 7,154,560 B1 * | 12/2006 | Chang et al. | 348/598 |
| 7,224,402 B2 * | 5/2007 | Cho | 348/558 |

FOREIGN PATENT DOCUMENTS

| | | |
|---|---|---|
| JP | 10-243406 | 9/1998 |
| JP | 11-98487 | 4/1999 |
| JP | 11-187407 | 7/1999 |
| JP | 2000-31831 | 1/2000 |

OTHER PUBLICATIONS

Peng Yin et al: "Video transcoding by reducing spatial resolution" Image Processing, 2000. Proceedings. 2000 International Conference on September 10-13, 2000, Piscataway, NJ, USA, USA,IEEE, vol. 1, Sep. 10, 2000, pp. 972-975, XP010530779 ISBN:0-7803-6297-7.

Koshio Matsui, Denshi Sukashi no kiso, the 1$^{st}$ printing (Japan), Mirokita Shuppan K.K. Aug. 21, 1998, pp. 76-89.

* cited by examiner

FIG.8A

| SYSTEM SELECTING SIGNAL | IMPROVEMENT SYSTEM |
| --- | --- |
| 0 | LINEAR INTERPOLATION |
| 1 | ADAPTIVE PROCESSING (MONO-CLASS) |
| 2 | CLASSIFICATION ADAPTIVE PROCESSING |

FIG.8B

| SYSTEM SELECTING SIGNAL | IMPROVEMENT SYSTEM |
| --- | --- |
| 0 | LINEAR INTERPOLATION |
| 1 | CLASSIFICATION ADAPTIVE PROCESSING (SMALL NUMBER OF CLASSES) |
| 2 | CLASSIFICATION ADAPTIVE PROCESSING (LARGE NUMBER OF CLASSES) |

FIG.8C

| SYSTEM SELECTING SIGNAL | IMPROVEMENT SYSTEM |
| --- | --- |
| 0 | LINEAR INTERPOLATION |
| 1 | CLASSIFICATION ADAPTIVE PROCESSING (LOW COEFFICIENT PERFORMANCE) |
| 2 | CLASSIFICATION ADAPTIVE PROCESSING (HIGH COEFFICIENT PERFORMANCE) |

FIG.8D

| SYSTEM SELECTING SIGNAL | IMPROVEMENT SYSTEM |
| --- | --- |
| 0 | LINEAR INTERPOLATION |
| 1 | ADAPTIVE PROCESSING USING CLASSIFICATION BY THRESHOLD VALUE |
| 2 | ADAPTIVE PROCESSING USING CLASSIFICATION BY ADRC |

FIG.25A, FIG.25B, FIG.25C, FIG.25D, FIG.25E, FIG.25F, FIG.25G, FIG.25H, FIG.25I, FIG.25J, FIG.25K

DATA PROCESSING DEVICE AND METHOD, AND RECORDING MEDIUM AND PROGRAM

TECHNICAL FIELD

This invention relates to a data processing device and method, a recording medium, and a program, and particularly to a data processing device and method, a recording medium, and a program which enable provision of images of various image qualities.

BACKGROUND ART

Recently, provision of chargeable program broadcasting services such as cable television broadcast and digital satellite broadcast has become popular in Japan, too.

In the chargeable program broadcasting services, in general, accounting is carried out in accordance with available programs or in accordance with actually viewed programs. If the quality of images as programs can be changed in accordance with the viewing fee paid by users, better services can be provided.

DISCLOSURE OF THE INVENTION

In view of the foregoing status of the art, it is an object of the present invention to enable provision of images of various qualities.

A data processing device according to the present invention comprises improvement information generating means for generating improvement information for improving the quality of data and embedding means for embedding the improvement information into the data.

The improvement information generating means may generate a prediction coefficient used for predicting a prediction value of quality-improved data obtained by improving the quality of the data, as the improvement information.

The improvement information generating means may generate the prediction coefficient for each predetermined class.

The improvement information generating means may comprise class tap constructing means for constructing a class tap used for finding the class of target teacher data of teacher data to be a teacher, by using learner data to be a learner, classifying means for carrying out classification for finding the class of the target teacher data on the basis of the class tap, prediction tap constructing means for constructing a prediction tap used together with the prediction coefficient for predicting the target teacher data, by using the learner data; and prediction coefficient operation means for finding the prediction coefficient for each class by using the teacher data and the prediction tap.

The improvement information generating means may generate a plurality of types of improvement information.

The improvement information generating means may generate prediction coefficients for different number of classes as the plurality of types of improvement information.

The improvement information generating means may generate a plurality of types of prediction coefficients found by using learner data or teacher data of different qualities, as the plurality of types of improvement information.

The improvement information generating means may generate at least the prediction coefficient and information for carrying out linear interpolation, as the plurality of types of improvement information.

The improvement information generating means may generate a plurality of types of prediction coefficients found by using class taps or prediction taps of different structures, as the plurality of types of improvement information.

The improvement information generating means may generate a plurality of types of prediction coefficients found by carrying out classification by different methods, as the plurality of types of improvement information.

The improvement information generating means may generate, as the improvement information, a class code expressing the class of the data, used for predicting the prediction value of the quality-improved data obtained by improving the quality of the data.

The improvement information generating means may comprise prediction tap constructing means for constructing a prediction tap used for predicting target teacher data of teacher data to be a teacher, by using learner data to be a learner; prediction coefficient storage means for storing a prediction coefficient for each class code found by learning, predictive operation means for finding a prediction value of the target teacher data by using the prediction tap and the prediction coefficient, and class code detecting means for detecting the class code of a prediction coefficient that minimizes the prediction value of the target teacher data. The improvement information generating means may output the class code detected by the class code detecting means, as the improvement information.

The improvement information generating means may comprise class tap constructing means for generating a class tap used for finding the class of target teacher data of teacher data to be a teacher, by using the teacher data, and classifying means for carrying out classification for finding the class of the target teacher data on the basis of the class tap. The improvement information generating means may output a class code corresponding to the class found by the classification means, as the improvement information.

The embedding means may embed the improvement information into the data so that the data and the improvement information can be restored, by using the bias of energy held by the data.

The embedding means may embed the improvement information into the data by carrying out spectrum spreading.

The embedding means may embed the improvement information into the data by changing one or more bits of the data to the improvement information.

The data may be image data and the improvement information may be information for improving the image quality of the image data.

A data processing method according to the present invention comprises an improvement information generating step of generating improvement information for improving the quality of data and an embedding step of embedding the improvement information into the data.

A recording medium according to the present invention has a program recorded thereon, the program comprising an improvement information generating step of generating improvement information for improving the quality of data and an embedding step of embedding the improvement information into the data.

A program according to the present invention comprises an improvement information generating step of generating improvement information for improving the quality of data and an embedding step of embedding the improvement information into the data.

A data processing device according to the present invention comprises extracting means for extracting improvement information from embedded data and improving means for improving the quality of data by using the improvement information.

The improvement information may be a prediction coefficient used for predicting a prediction value of quality-improved data obtained by improving the quality of the data. In this case, the improving means may find the prediction value of the quality-improved data by using the data and the prediction coefficient.

The improvement information may be a prediction coefficient found for each predetermined class. In this case, the improving means may find the prediction value of the quality-improved data by using the data and the prediction coefficient for each class.

The improving means may comprise class tap constructing means for constructing a class tap used for finding the class of target quality-improved data, which is targeted quality-improved data, by using the data; classifying means for carrying out classification for finding the class of the target quality-improved data on the basis of the class tap, prediction tap constructing means for constructing a prediction tap used together with a prediction coefficient for predicting the target quality-improved data, by using the data; and predicting means for finding a prediction value of the target quality-improved data by using the prediction coefficient of the class of the target quality-improved data and the prediction tap.

The improvement information may be a class code expressing the class of a prediction coefficient for each predetermined class used for predicting a prediction value of quality-improved data obtained by improving the quality of data. In this case, the improving means may find the prediction value of the quality-improved data by using the data and the prediction coefficient corresponding to the class code.

The improving means may comprise: prediction tap constructing means for constructing a prediction tap used together with a prediction coefficient for predicting target quality-improved data, which is targeted quality-improved data, by using the data; and predicting means for finding a prediction value of the target quality-improved data by using the prediction coefficient corresponding to the class code as the improvement information and the prediction tap.

A plurality of types of improvement information may be embedded in the embedded data.

Prediction coefficients for different numbers of classes may be embedded in the embedded data as the plurality of types of improvement information.

The prediction coefficient may be generated by using learner data to be a learner and teacher data to be a teacher. In this case, a plurality of types of prediction coefficients found by using learner data or teacher data of different qualities may be embedded in the embedded data as the plurality of types of improvement information.

At least the prediction coefficient and information for carrying out linear interpolation may be embedded in the embedded data as the plurality of types of improvement information.

A plurality of types of prediction coefficients found by using class taps or prediction taps of different structures may be embedded in the embedded data as the plurality of types of improvement information.

A plurality of types of prediction coefficients found by carrying out classification by different methods may be embedded in the embedded data as the plurality of types of improvement information.

The data processing device may further comprise improvement information selecting means for selecting improvement information used for improving the quality of the data, from the plurality of types of improvement information.

The extracting means may extract the improvement information from the embedded data by using the bias of energy held by the data.

The extracting means may extract the improvement information from the embedded data by carrying out inverse spectrum spreading.

The extracting means may extract one or more bits of the embedded data as the improvement information.

The data may be image data and the improvement information may be information for improving the image quality of the image data.

A data processing method according to the present invention comprises an extracting step of extracting improvement information from embedded data and an improving step of improving the quality of data by using the improvement information.

A recording medium according to the present invention has a program recorded thereon, the program comprising: an extracting step of extracting improvement information from embedded data; and an improving step of improving the quality of data by using the improvement information.

A program according to the present invention comprises an extracting step of extracting improvement information from embedded data and an improving step of improving the quality of data by using the improvement information.

A data processing device according to the present invention comprises improvement information generating means for generating a plurality of types of improvement information for improving the quality of data and transmitting means for transmitting the data and one or more types of improvement information.

The data processing device according to the present invention may further comprise improvement information selecting means for selecting improvement information to be transmitted together with the data, from the plurality of types of improvement information.

The improvement information selecting means may select the improvement information in response to a request from a receiving device which receives the data.

The data processing device according to the present invention may further comprise accounting means for carrying out accounting in accordance with the improvement information selected by the improvement information selecting means.

The improvement information generating means may generate at least a prediction coefficient used for predicting a prediction value of quality-improved data obtained by improving the quality of the data, as the improvement information.

The improvement information generating means may generate a prediction coefficient for each predetermined class.

The improvement information generating means may comprise class tap constructing means for constructing a class tap used for finding the class of target teacher data of teacher data to be a teacher, by using learner data to be a learner, classifying means for carrying out classification for finding the class of the target teacher data on the basis of the class tap, prediction tap constructing means for constructing a prediction tap used together with a prediction coefficient for predicting the target teacher data, by using the learner data; and prediction coefficient operation means for finding a prediction coefficient for each class by using the teacher data and the prediction tap.

The improvement information generating means may generate prediction coefficients for different numbers of classes as the plurality of types of improvement information.

The improvement information generating means may generate a plurality of types of prediction coefficients found by using learner data or teacher data of different qualities, as the plurality of types of improvement information.

The improvement information generating means may generate at least the prediction coefficient and information for carrying out linear interpolation, as the plurality of types of improvement information.

The improvement information generating means may generate a plurality of types of prediction coefficients found by using class taps or prediction taps of different structures, as the plurality of types of improvement information.

The improvement information generating means may generate a plurality of types of prediction coefficients found by carrying out classification by different methods, as the plurality of types of improvement information.

The transmitting means may embed the improvement information into the data so that the data and the improvement information can be restored, by using the bias of energy held by the data, and may transmit the data and one or more types of improvement information.

The transmitting means may embed the improvement information into the data by carrying out spectrum spreading and transmit the data and one or more types of improvement information.

The transmitting means may embed the improvement information into the data by changing one or more bits of the data to the improvement information and transmit the data and one or more types of improvement information.

The transmitting means may transmit the data and all the plurality of types of improvement information.

The data may be image data and the improvement information may be information for improving the image quality of the image data.

A data processing method according to the present invention comprises an improvement information generating step of generating a plurality of types of improvement information for improving the quality of data and a transmitting step of transmitting the data and one or more types of improvement information.

A recording medium according to the present invention has a program recorded thereon, the program comprising an improvement information generating step of generating a plurality of types of improvement information for improving the quality of data and a transmitting step of transmitting the data and one or more types of improvement information.

A program according to the present invention comprises an improvement information generating step of generating a plurality of types of improvement information for improving the quality of data and a transmitting step of transmitting the data and one or more types of improvement information.

A data processing device according to the present invention comprises receiving means for receiving data and one or more types of improvement information, improving means for improving the quality of the data by using one of the one or more types of improvement information, and accounting means for carrying out accounting in accordance with the improvement information used for improving the quality of the data.

The receiving means may receive a plurality of types of improvement information. In this case, the data processing device according to the present invention may further comprise improvement information selecting means for selecting improvement information used for improving the quality of the data, from the plurality of types of improvement information.

The improvement information selecting means may select the improvement information in response to a request from a user.

The data processing device according to the present invention may further comprise requesting means for requesting a transmitting device which transmit the data and one or more types of improvement information, for the improvement information used for improving the quality of the data. In this case, the receiving means may receive the improvement information transmitted from the transmitting device in response to the request of the requesting means.

The improvement information may be a prediction coefficient used for predicting a prediction value of quality-improved data obtained by improving the quality of the data. In this case, the improving means may find the prediction value of the quality-improved data by using the data and the prediction coefficient.

The improvement information may be a prediction coefficient found for each predetermined class. In this case, the improving means may find the prediction value of the quality-improved data by using the data and the prediction coefficient for each class.

The improving means may comprise class tap constructing means for constructing a class tap used for finding the class of target quality-improved data, which is targeted quality-improved data, by using the data, classifying means for carrying out classification for finding the class of the target quality-improved data on the basis of the class tap, prediction tap constructing means for constructing a prediction tap used together with a prediction coefficient for predicting the target quality-improved data, by using the data, and predicting means for finding the prediction value of the target quality-improved data by using the prediction coefficient of the class of the target quality-improved data and the prediction tap.

The receiving means may receive a plurality of types of improvement information.

The receiving means may receive prediction coefficients for different numbers of classes as the plurality of types of improvement information.

The prediction coefficient may be generated by using learner data to be a learner and teacher data to be a teacher. In this case, the receiving means may receive a plurality of types of prediction coefficients found by using learner data or teacher data of different qualities, as the plurality of types of improvement information.

The receiving means may receive at least the prediction coefficient and information for carrying out linear interpolation, as the plurality of types of improvement information.

The receiving means may receive a plurality of types of prediction coefficients found by using class taps or prediction taps of different structures, as the plurality of types of improvement information.

The receiving means may receive a plurality of types of prediction coefficients found by carrying out classification by different methods, as the plurality of types of improvement information.

The receiving means may receive embedded data obtained by embedding one or more types of improvement information into the data. In this case, the data processing device may further comprise extracting means for extracting the improvement information from the embedded data.

The extracting means may extract the improvement information from the embedded data by using the bias of energy held by the data.

The extracting means may extract the improvement information from the embedded data by carrying out inverse spectrum spreading.

The extracting means may extract one or more bits of the embedded data as the improvement information.

The data may be image data and the improvement information may be information for improving the image quality of the image data.

A data processing method according to the present invention comprises a receiving step of receiving data and one or more types of improvement information, an improving step of improving the quality of the data by using one of the one or more types of improvement information and an accounting step of carrying out accounting in accordance with the improvement information used for improving the quality of the data.

A recording medium according to the present invention has a program recorded thereon, the program comprising a receiving step of receiving data and one or more types of improvement information, an improving step of improving the quality of the data by using one of the one or more types of improvement information, and an accounting step of carrying out accounting in accordance with the improvement information used for improving the quality of the data.

A program according to the present invention comprises a receiving step of receiving data and one or more types of improvement information, an improving step of improving the quality of the data by using one of the one or more types of improvement information, and an accounting step of carrying out accounting in accordance with the improvement information used for improving the quality of the data.

In the data processing device and method, the recording medium and the program according to the present invention, improvement information for improving the quality of data is generated and the improvement information is embedded into the data.

In the data processing device and method, the recording medium and the program according to the present invention, improvement information is extracted from embedded data and the quality of data is improved by using the improvement information.

In the data processing device and method, the recording medium and the program according to the present invention, a plurality of types of improvement information for improving the quality of data are generated, and the data and one or more types of improvement information are transmitted.

In the data processing device and method, the recording medium and the program according to the present invention, data and one or more types of improvement information are received and the quality of the data is improved by using one of the one or more types of improvement information, while accounting is carried out in accordance with the improvement information used for improving the quality of the data.

BRIEF DESCRIPTION OF THE DRAWINGS

FIGS. 8A to 8D show the corresponding relations between a system selecting signal and an improvement system.

FIGS. 25A to 25K illustrate the switching of image arrays.

BEST MODE FOR CARRYING OUT THE INVENTION

Figure 1:
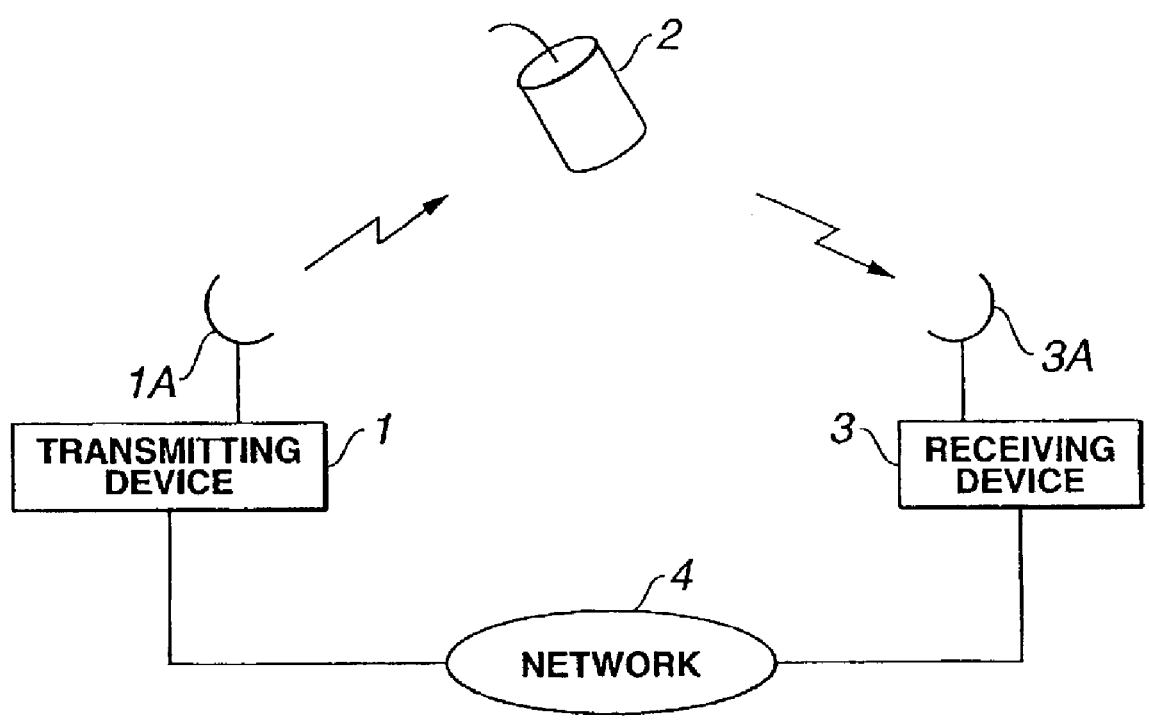
FIG. 1 shows an exemplary structure of an embodiment of a broadcasting system to which the present invention is applied.

FIG. 1 shows an exemplary structure of an embodiment of a digital satellite broadcasting system to which the present invention is applied. (A system is a logical set of a plurality of devices, irrespective of whether the devices are within the same casing or not.)

A transmitting device 1 transmits satellite broadcast waves as radio waves corresponding to program broadcast from an antenna (parabolic antenna) 1A to a satellite 2. The satellite (communication satellite or broadcasting satellite) 2 receives the satellite broadcast waves from the transmitting device 1, then performs amplification and other necessary processing on the satellite broadcast waves, and sends out the resultant satellite broadcast waves.

The satellite broadcast waves sent out from the satellite 2 are received by an antenna (parabolic antenna) 3A of a receiving device 3.

The transmitting device 1 and the receiving device 3 can communicate with each other via a network 4 which enables bidirectional communication such as a public network, the Internet, a CATV (cable television) network or a radio communication network. Between the transmitting device 1 and the receiving device 3, the processing for accounting such as transmission/reception of accounting information is carried out via the network 4.

In the embodiment of FIG. 1, only one receiving device 3 is shown in order to simplify the description. However, it is possible to provide a plurality of receiving devices having the same structure as the receiving device 3.

Figure 2:
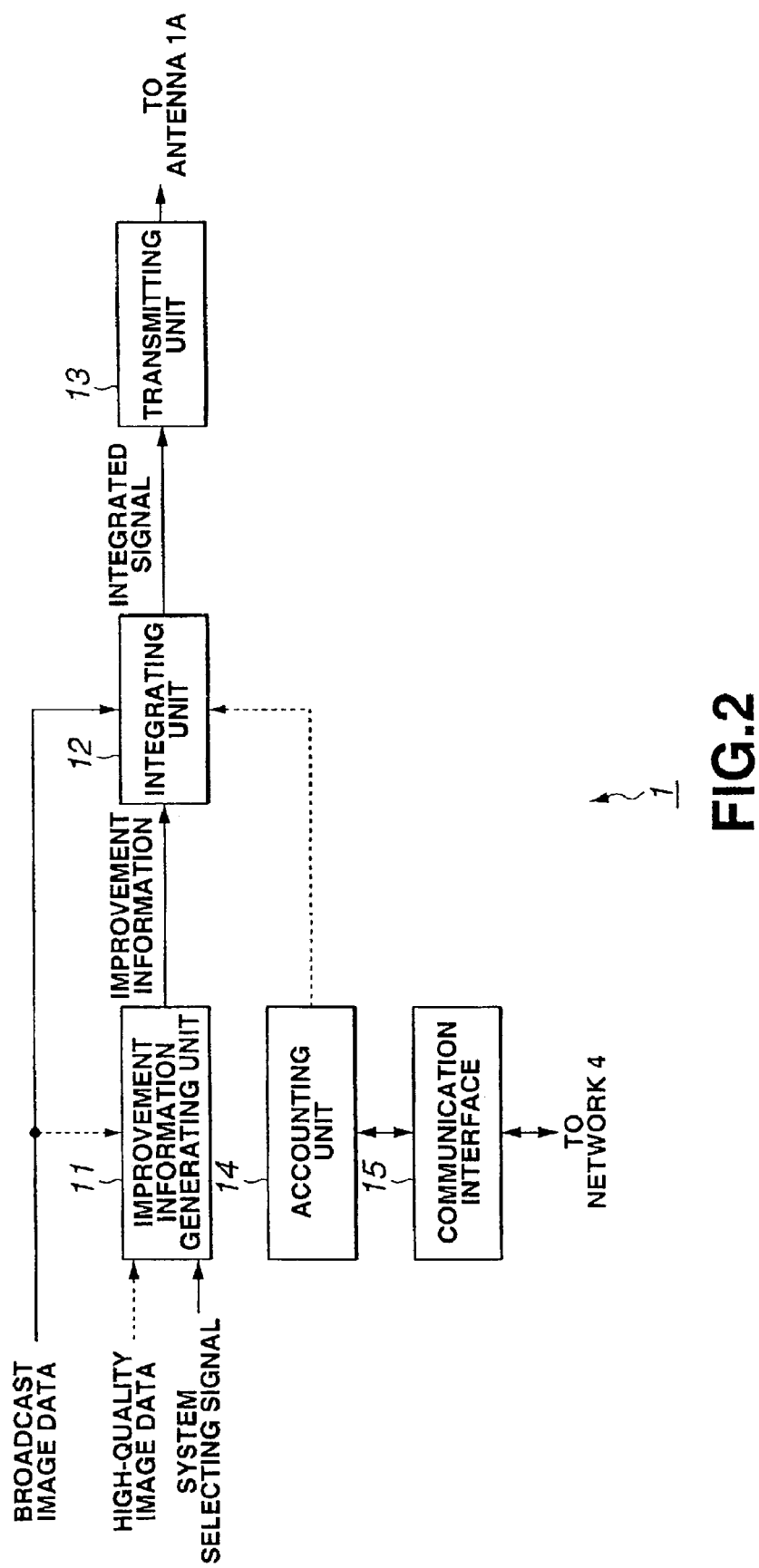
FIG. 2 is a block diagram showing an exemplary structure of a transmitting device 1.

FIG. 2 shows an exemplary structure of the transmitting device 1 of FIG. 1.

Image data broadcast as a program (hereinafter suitably referred to as broadcast image data) or image data having the same contents as the broadcast image data and having higher image quality (hereinafter referred to as image data of high image quality) is inputted to an improvement information generating unit 11. The improvement information generating unit 11 generates improvement information for improving the image quality of the broadcast image data in the receiving device 3.

Specifically, a system selecting signal for selecting an improvement system for improving the image quality of the broadcast image data is also supplied to the improvement information generating unit 11. The improvement information generating unit 11 generates one or more types of improvement information in accordance with the system selecting signal supplied thereto. The improvement information generated by the improvement information generating unit 11 is supplied to an integrating unit 12.

To the integrating unit 12, the improvement information is supplied from the improvement information generating unit 11 and the broadcast image data is also supplied. The integrating unit 12 integrates the broadcast image data with the improvement information to generate an integrated signal and supplies the integrated signal to a transmitting unit 13.

As a technique for integrating the broadcast image data with the improvement information, it is possible to use embedded coding, which will be described later, as well as time-division multiplexing and frequency multiplexing. It is also possible to transmit the broadcast image data and the improvement information as separate programs without integrating them.

The transmitting unit 13 performs modulation, amplification and other necessary processing on the integrated signal outputted from the integrating unit 12, and supplies the resultant integrated signal to the antenna 1A.

An accounting unit 14 communicates with the receiving device 3 via a communication interface 15 and the network 4, thereby carrying out accounting for the provision of programs to the receiving device 3.

The communication interface 15 carries out communication control via the network 4.

Figure 3:
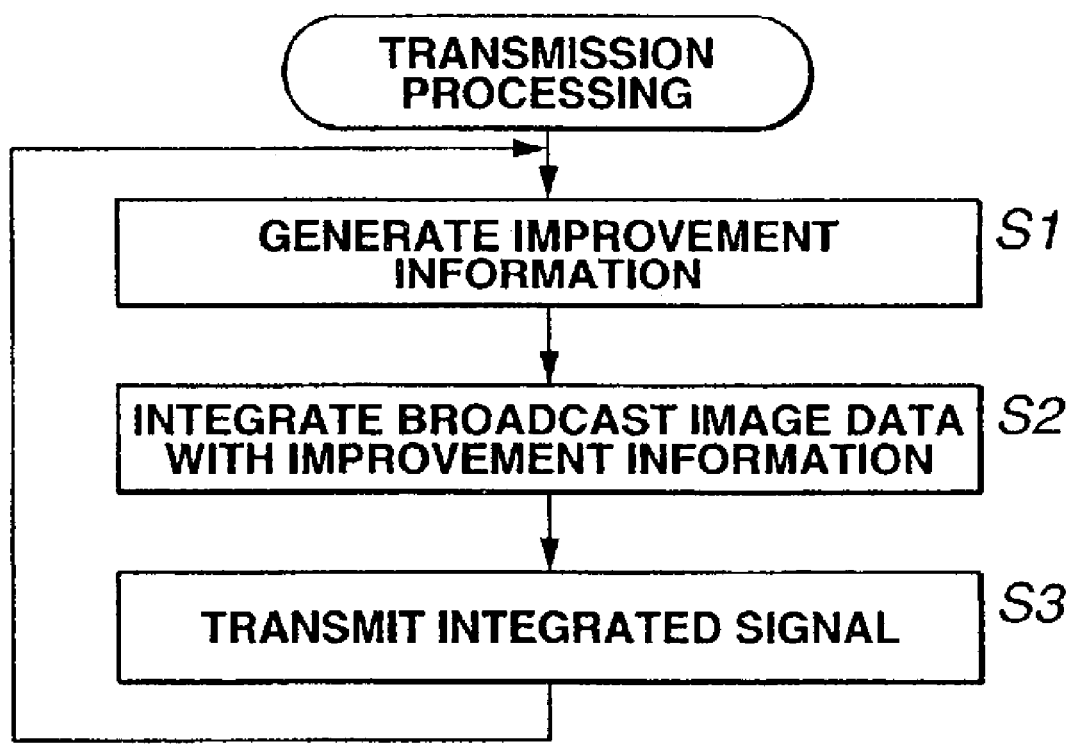
FIG. 3 is a flowchart for explaining the processing by the transmitting device 1.

The program transmission processing carried out by the transmitting device 1 of FIG. 2 will now be described with reference to the flowchart of FIG. 3.

First, at step S1, the improvement information generating unit 11 generates one or more types of improvement information for improving the image quality of broadcast image data in accordance with a system selecting signal supplied thereto, and supplies the improvement information to the integrating unit 12. The unit of broadcast image data for which improvement information is generated (hereinafter suitably referred to as improvement information generation unit) may be, for example, one frame, one program or the like.

When the improvement information is supplied from the improvement information generating unit 11, the integrating unit 12 at step S2 integrates the broadcast image data with the improvement information to generate an integrated signal and supplies the integrated signal to the transmitting unit 13. At step S3, the transmitting unit 13 performs modulation, amplification and other necessary processing on the integrated signal outputted from the integrating unit 12 and supplies the resultant integrated signal to the antenna 1A. Thus, the integrated signal is sent out as a satellite broadcast wave from the antenna 1A.

Then, the processing returns to step S1 and the same processing is repeated.

Figure 4:
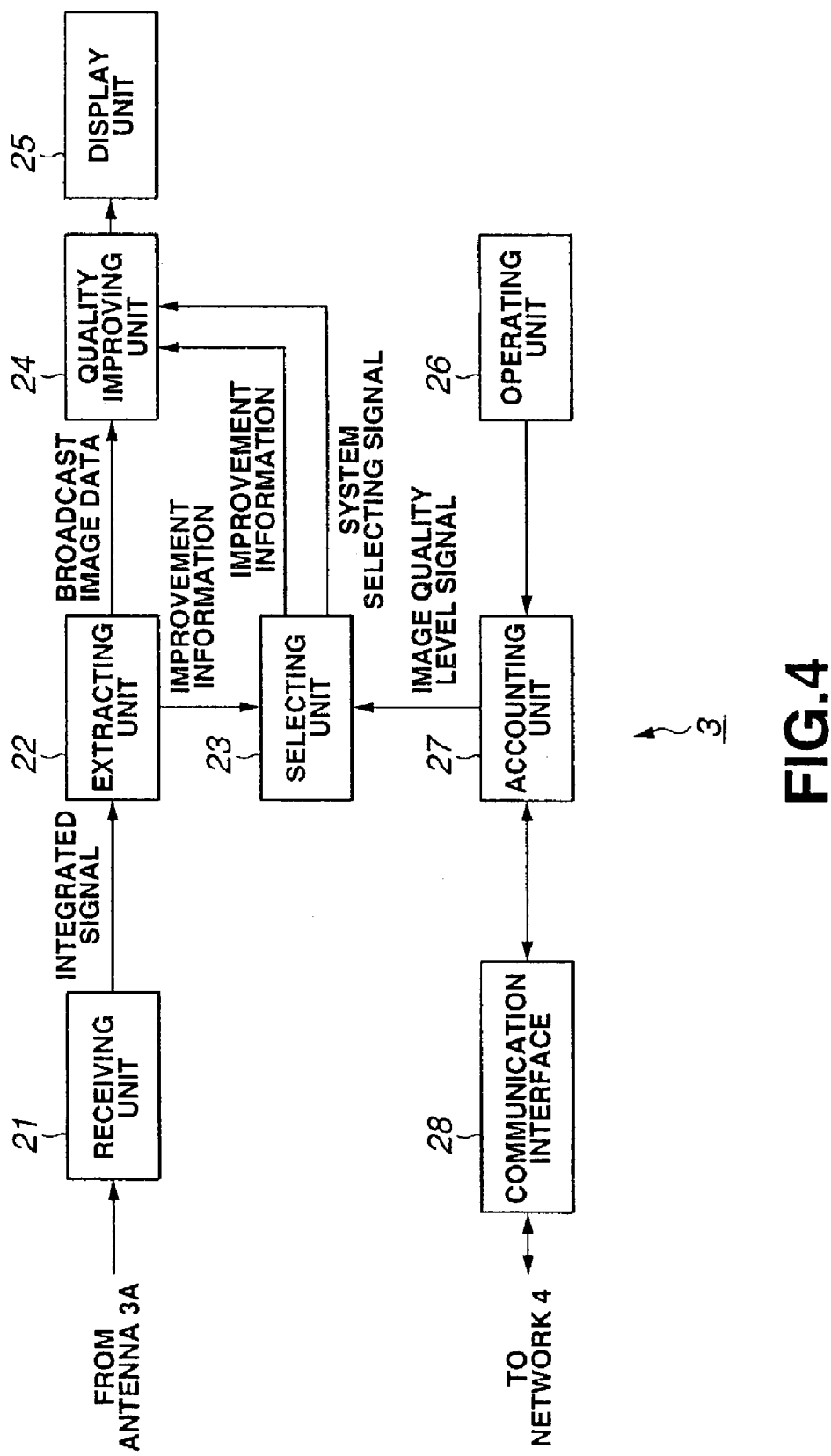
FIG. 4 is a block diagram showing an exemplary structure of a receiving device 3.

FIG. 4 shows an exemplary structure of the receiving device 3 of FIG. 1.

Satellite broadcast waves broadcast via the satellite 2 are received by the antenna 3A and the received signals are supplied to a receiving unit 21. The receiving unit 21 performs amplification, demodulation and other necessary processing on the received signals from the antenna 3A to obtain an integrated signal and supplies the integrated signal to an extracting unit 22.

The extracting unit 22 extracts broadcast image data and one or more types of improvement information from the integrated signal from the receiving unit 21. The extracting unit 22 supplies the broadcast image data to a quality improving unit 24 and supplies the one or more types of improvement information to a selecting unit 23.

The selecting unit 23 selects a type of improvement information corresponding to an image quality level signal from an accounting unit 27, of the one or more types of improvement information from the extracting unit 22, and supplies a system selecting signal for selecting an improvement system for improving the image quality by the selected improvement information, together with the selected improvement information, to the quality improving unit 24.

The quality improving unit 24 performs the processing of the system indicated by the system selecting signal, on the broadcast image data supplied from the extracting unit 22, using the improvement information supplied from the selecting unit 23. The quality improving unit 24 thus obtains image data of improved image quality and supplies the image data to a display unit 25. The display unit 25 is constituted by, for example, a CRT (cathode ray tube), a liquid crystal panel, or a DMD (dynamic mirror device), and displays an image corresponding to the image data supplied from the quality improving unit 24.

An operating unit 26 is operated by a user when the user selects the image quality of an image to be displayed on the display unit 25. An operation signal corresponding to the operation is supplied to the accounting unit 27.

On the basis of the operation signal from the operating unit 26, the accounting unit 27 carries out accounting for the image quality selected by the user. That is, the accounting unit 27 identifies the image quality requested by the user on the basis of the operation signal from the operating unit 26 and supplies an image quality level signal indicating the degree of the image quality to the selecting unit 23. Thus, the selecting unit 23 selects improvement information suitable for obtaining the image quality requested by user. The accounting unit 27 also transmits the image quality level signal to the transmitting device 1 via a communication interface 28 and the network 4.

The image quality level signal thus transmitted from the accounting unit 27 to the transmitting device 1 is received by the accounting unit 14 via the communication interface 15 in the transmitting device 1 (FIG. 2). The accounting unit 14 carries out accounting to the user of the receiving device 3 in accordance with the image quality level signal. Specifically, for example, the accounting-unit 14 calculates the viewing fee for each user, and transmits an accounting signal including at least the account number of the transmitting device 1, the account number of the user and the accumulated viewing fee, to an accounting center (bank center), not shown, via the communication interface 15 and the network 4. On receiving the accounting signal, the accounting center carries out settlement processing to draw an amount corresponding to the viewing fee from the account of the user and to deposit the amount to the account of the transmitting device 1.

The communication interface 28 carries out communication control via the network 4.

Figure 5:
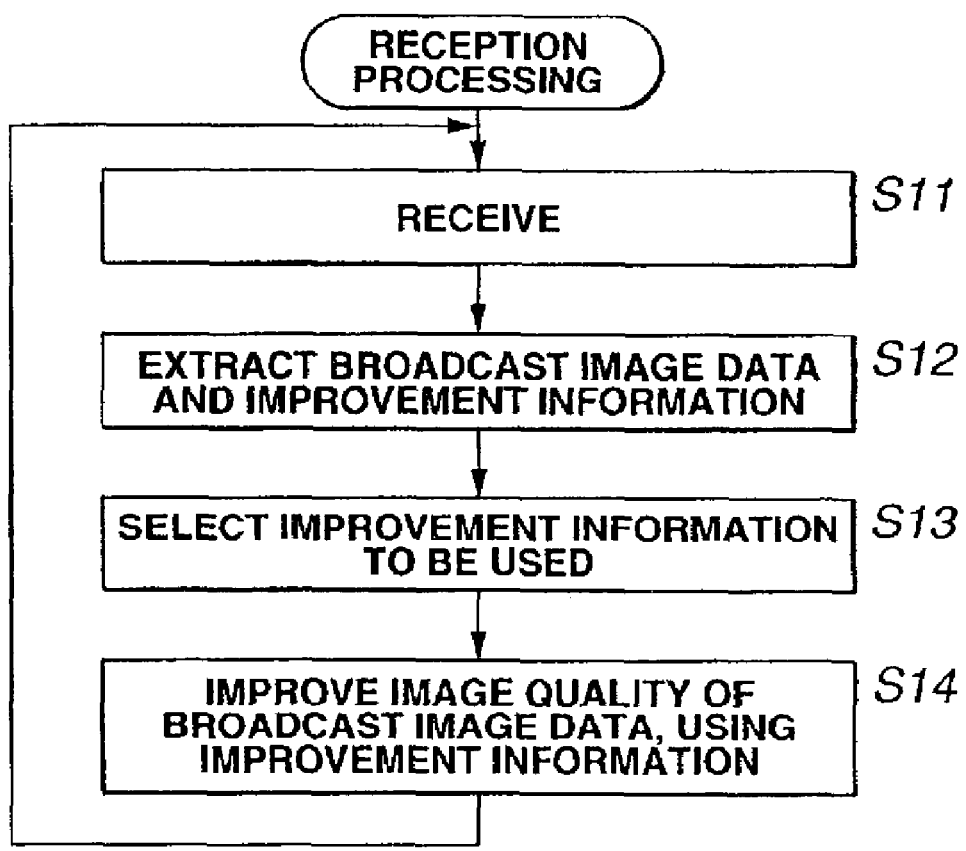
FIG. 5 is a flowchart for explaining the processing by the receiving device 3.

The program reception processing carried out by the receiving device 3 of FIG. 4 will now be described with reference to the flowchart of FIG. 5.

A received signal, outputted by the antenna 3A having received a satellite broadcast wave, is supplied to the receiving unit 21. At step S11, the receiving unit 21 receives the received signal and converts it to an integrated signal. The integrated signal is supplied to the extracting unit 22.

At step S12, the extracting unit 22 extracts broadcast image data and one or more types of improvement information from the integrated signal from the receiving unit 21. The broadcast image data is supplied to the quality improving unit 24 and the one or more types of improvement information is supplied to the selecting unit 23.

At step S13, the selecting unit 23 selects a type of improvement information corresponding to an image quality level signal from the accounting unit 27, of the one or more types of improvement information from the extracting unit 22, and supplies a system selecting signal indicating an improvement system for improving the image quality by the selected improvement information, together with the selected improvement information, to the quality improving unit 24.

At step S14, the quality improving unit 24 performs the processing of the system indicated by the system selecting signal, on the broadcast image data supplied from the extracting unit 22, using the improvement information supplied from the selecting unit 23. The quality improving unit 24 thus obtains image data of improved image quality and supplies the image data to the display unit 25 to display the image data. Then, the processing returns to step S11 and the same processing is repeated.

In the above-described reception processing, the image quality level signal outputted by the accounting unit 27 corresponds to the image quality requested by the user by operating the operating unit 26. Therefore, the display unit 25 displays an image of the image quality requested by the user.

As a technique for improving the image quality of image data, for example, classification adaptive processing can be used, which is proposed in the Japanese Publication of Unexamined Patent Application No. H8-51622 by the present Applicant.

The classification adaptive processing includes classification processing and adaptive processing. The classification processing classifies data on the basis of the characteristics thereof so as to perform adaptive processing for each class. The adaptive processing is the following technique.

That is, in the adaptive processing, for example, by using a linear combination of a pixel constituting an SD (standard definition) image having a standard resolution or a low resolution (hereinafter suitably referred to as an SD pixel) with a predetermined prediction coefficient, a prediction value of a pixel of an HD (high definition) image obtained by improving the resolution of the SD image is found, thus providing the image obtained by improving the resolution of the SD image.

Specifically, for example, it is now assumed that a certain HD image is teacher data and that an SD image having its image quality such as resolution deteriorated by reducing the number of pixels of the HD image is learner data. It is assumed that a prediction value $E[y]$ of a pixel value y of a pixel constituting the HD image (hereinafter suitably referred to as an HD pixel) is to be found by a linear combination model prescribed by a linear combination of a set of pixel values $x_1, x_2, \ldots$ of several SD pixels (pixels constituting the SD image) with predetermined prediction coefficients $w_1, w_2, \ldots$. In this case, the prediction value $E[y]$ can be expressed by the following equation.

$$E[y] = w_1 x_1 + w_2 x_2 + \ldots \quad (1)$$

If a matrix W made up of a set of prediction coefficients $w_j$, a matrix X made up of a set of learner data $x_{ij}$, and a matrix Y' made up of prediction values $E[y_j]$ are defined as follows, in order to generalize the equation (1), $$X = \begin{bmatrix} x_{11} & x_{12} & \ldots & x_{1J} \\ x_{21} & x_{22} & \ldots & x_{2J} \\ \ldots & \ldots & \ldots & \ldots \\ x_{I1} & x_{I2} & \ldots & x_{IJ} \end{bmatrix}$$

$$W = \begin{bmatrix} w_1 \\ w_2 \\ \ldots \\ w_J \end{bmatrix}, Y = \begin{bmatrix} E[y_1] \\ E[y_2] \\ \ldots \\ E[y_J] \end{bmatrix}$$

the following observational equation is set up.

$$XW = Y' \quad (2)$$

In this case, the component $x_{ij}$ of the matrix X means the j-th learner data of the i-th set of learner data (a set of learner data used for predicting the i-th teacher data), and the component $w_j$ of the matrix W means a prediction coefficient used for calculating a product with the j-th learner data of the set of learner data. Moreover, since $y_i$ represents the i-th teacher data, $E[y_i]$ represents a prediction value of the i-th teacher data. In the equation (1), y on the left side represents the component $y_i$ of the matrix Y without having the suffix i, and $x_1, x_2, \ldots$ on the right side represent the components $x_{ij}$ of the matrix X without having the suffix i.

It is now assumed that a prediction value $E[y]$ close to the pixel value y of the HD pixel is to be found by applying a minimum square method to the observational equation (2). In this case, if a matrix Y made up of a set of true pixel values y of the HD pixels to be teacher data and a matrix E made up of a set of residuals e of the prediction value $E[y]$ with respect to the pixel values y of the HD pixels are defined as follows, $$E = \begin{bmatrix} e_1 \\ e_2 \\ \ldots \\ e_I \end{bmatrix}, Y = \begin{bmatrix} y_1 \\ y_2 \\ \ldots \\ y_I \end{bmatrix}$$

the following residual equation is set up from the equation (2).

$$XW = Y + E \quad (3)$$

In this case, the prediction coefficient wj for finding the prediction value E[y] close to the pixel value y of the HD pixel can be found by minimizing the following square error.

$$\sum_{i=1}^{I} e_i^2$$

Therefore, if the above-described square error differentiated by the prediction coefficient wj is 0, the prediction coefficient wj satisfying the following equation is an optimum value for finding the prediction value E[y] close to the pixel value y of the HD pixel.

$$e_1 \frac{\partial e_1}{\partial w_j} + e_2 \frac{\partial e_2}{\partial w_j} + \ldots + e_I \frac{\partial e_I}{\partial w_j} = 0 (j = 1, 2, \ldots, J) \quad (4)$$

Thus, first, differentiating the equation (3) by the prediction coefficient wj provides the following equation.

$$\frac{\partial e_i}{\partial w_1} = x_{i1}, \frac{\partial e_i}{\partial w_2} = x_{i2}, \ldots, \frac{\partial e_i}{\partial w_J} = x_{iJ} (i = 1, 2, \ldots, I) \quad (5)$$

From the equations (4) and (5), the following equation (6) is obtained.

$$\sum_{i=1}^{I} e_i x_{i1} = 0, \sum_{i=1}^{I} e_i x_{i2} = 0, \ldots, \sum_{i=1}^{I} e_i x_{iJ} = 0 \quad (6)$$

Moreover, in consideration of the relation of the learner data xij, the prediction coefficient wj, the teacher data yi and the residual ei in the residual equation (3), the following normal equation can be obtained from the equation (6).

$$\begin{cases} (\sum_{i=1}^{I} x_{i1}x_{i1})w_1 + (\sum_{i=1}^{I} x_{i1}x_{i2})w_2 + \ldots + (\sum_{i=1}^{I} x_{i1}x_{iJ})w_J = (\sum_{i=1}^{I} x_{i1}y_i) \\ (\sum_{i=1}^{I} x_{i2}x_{i1})w_1 + (\sum_{i=1}^{I} x_{i2}x_{i2})w_2 + \ldots + (\sum_{i=1}^{I} x_{i2}x_{iJ})w_J = (\sum_{i=1}^{I} x_{i2}y_i) \\ (\sum_{i=1}^{I} x_{iJ}x_{i1})w_1 + (\sum_{i=1}^{I} x_{iJ}x_{i2})w_2 + \ldots + (\sum_{i=1}^{I} x_{iJ}x_{iJ})w_J = (\sum_{i=1}^{I} x_{iJ}y_i) \end{cases} \quad (7)$$

By preparing a predetermined number of sets of learner data xij and teacher data yi, the equations constituting the normal equation (7) of the same number as the number J of prediction coefficients wj to be found can be set up. Therefore, the optimum prediction coefficient wj can be found by solving the equation (7). (However, to solve the equation (7), the matrix made up of the coefficients according to the prediction coefficient wj must be regular.) In solving the equation (7), it is possible to adopt, for example, a sweep method (Gauss-Jordan elimination method, etc.).

As described above, in the adaptive processing, the optimum prediction coefficient wj is found and the prediction value E[y] of the pixel value y of the HD pixel is found in accordance with the equation (1) Using the prediction coefficient wj.

The adaptive processing differs from simple interpolation processing in that a component not included in the SD image but included in the HD image is reproduced. As far as the equation (1) is concerned, the adaptive processing is the same as the interpolation processing using a so-called interpolation filter. In the adaptive processing, since the prediction coefficient w equivalent to the tap coefficient of the interpolation filter is found by so-called learning with the teacher data y, the component included in the HD image can be reproduced. Therefore, it can be said that the adaptive processing has an image creation (resolution creation) effect.

In the above description, the adaptive processing is used in the case of improving the resolution. However, the number of pixels may be unchanged before and after the adaptive processing, and the adaptive processing can also be for finding a prediction value of an image from which noise and blur have been removed. In this case, the adaptive processing enables improvement in the image quality such as removal of noise and blur.

Figure 6:
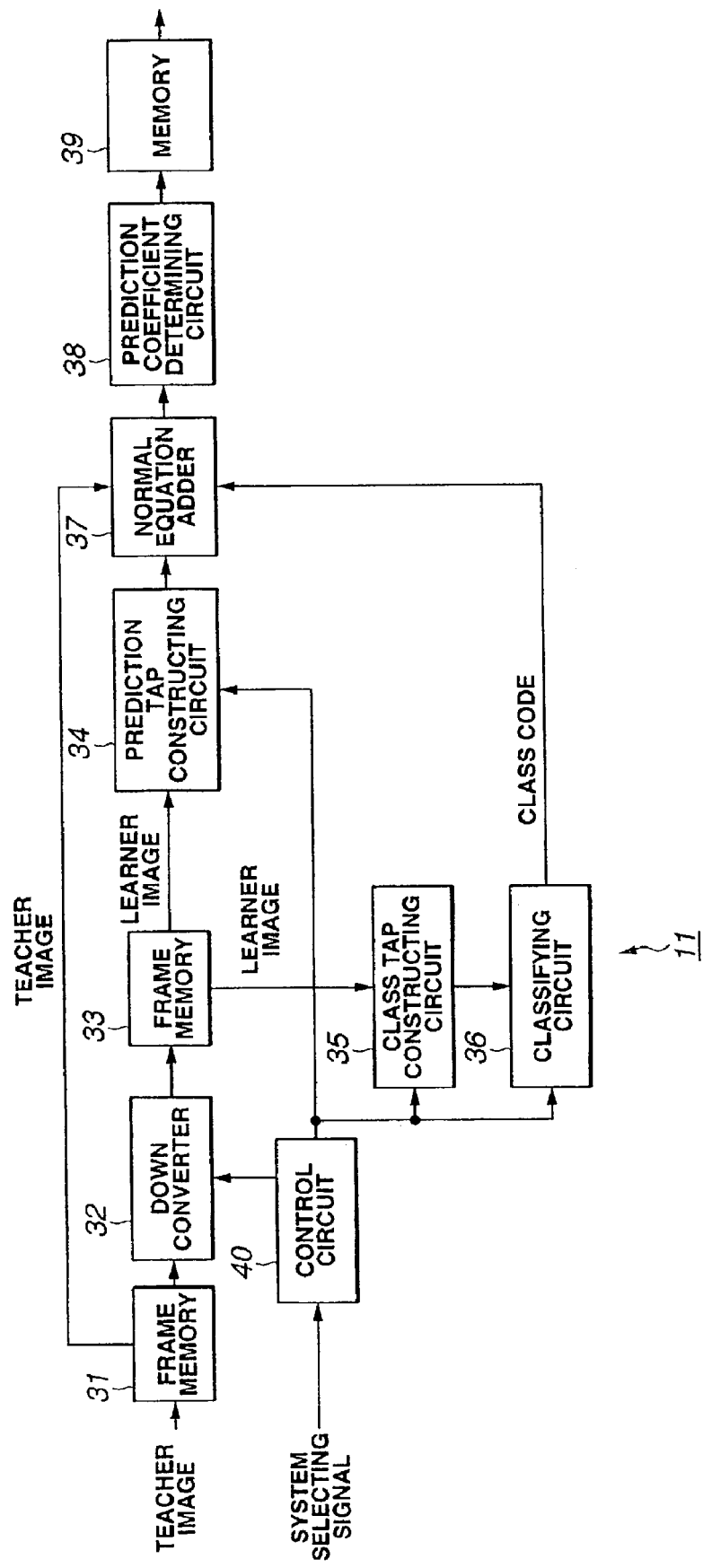
FIG. 6 is a block diagram showing a first exemplary structure of an improvement information generating unit 11.

FIG. 6 shows an exemplary structure of the improvement information generating unit 11 of FIG. 2 in the case where a prediction coefficient is to be found as improvement information by the above-described classification adaptive processing.

In the embodiment of FIG. 6, there exists image data of high image quality having the same contents as broadcast image data. This image data of high image quality is supplied to the improvement information generating unit 11 as teacher data for learning the prediction coefficient.

The image data of high image quality as teacher data is supplied, for example, by each frame, to a frame memory 31. The frame memory 31 sequentially stores the teacher data supplied thereto.

A down converter 32 reads out the teacher data stored in the frame memory 31, for example, by each frame, and performs LPF (low pass filter) filtering and decimation, thereby generating image data having basically the same image quality as the broadcast image data, that is, image data of lower image quality, as learner data for learning the prediction coefficient. The down converter 32 then supplies the image data of lower quality to a frame memory 33.

The frame memory 33 sequentially stores the image data of lower image quality as the learner data outputted from the down converter 32, for example, by each frame.

A prediction tap constructing circuit 34 sequentially uses pixels (hereinafter suitably referred to as teacher pixels) constituting an image as the teacher data (hereinafter suitably referred to as a teacher image) stored in the frame memory 31, as target pixels, and reads out several pixels (hereinafter suitably referred to as learner pixels) of the learner data situated at positions that are spatially or temporally close to the position of an image as the learner data (hereinafter suitably referred to as a learner image) corresponding to the position of the target pixel, from the frame memory 33 in accordance with a control signal from a control circuit 40. The prediction tap constructing circuit 34 thus constitutes a prediction tap used for multiplication with the prediction coefficient.

Figure 7:
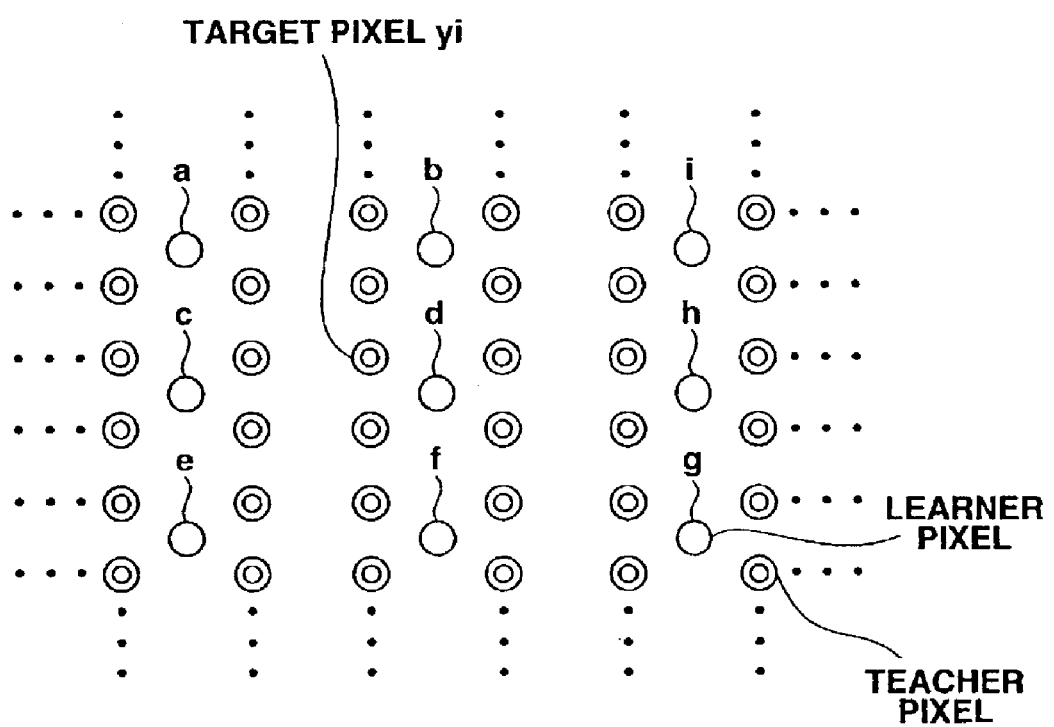
FIG. 7 shows the structure of a prediction tap (class tap).

Specifically, for example, if the learner image is obtained by decimating the pixels of the teacher image to ¼, the prediction tap constructing circuit 34 uses, as a prediction tap, four learner pixels a, b, c, d, which are spatially close to the position of the learner image corresponding to the position of the target pixel, in accordance with a control signal from the control circuit 40, as shown in FIG. 7. The prediction tap constructing circuit 34 also uses, as a prediction tap, nine learner pixels a, b, c, d, e, f, g, h, i, which are spatially close to the position of the learner image corresponding to the position of the target pixel, in accordance with another control signal from the control circuit 40.

Basically, the prediction accuracy of the teacher pixels is higher and an image of high image quality (or a prediction coefficient for obtaining an image of high image quality) is obtained when the nine learner pixels are used as a prediction tap than when the four learner pixels a to d are used.

The prediction tap (similar to a class tap, which will be described later) can be constituted by pixels forming a cross, a rhombus or an arbitrary shape as well as pixels forming a rectangle as shown in FIG. 7. The prediction tap can also be constituted by every other pixels instead of adjacent pixels.

Referring again to FIG. 6, the prediction tap constructed by the prediction tap constructing circuit 34 is supplied to a normal equation adder 37.

A class tap constructing circuit 35 reads out the learner pixels used for classifying the target pixel into one of several classes, from the frame memory 33. Specifically, the class tap constructing circuit 35 reads out several learner pixels situated at positions spatially or temporally close to the position of the learner image corresponding to the position of the target pixel from the frame memory 33 in accordance with a control signal from the control circuit 40, and supplies these learner pixels as a class tap used for classification to a classifying circuit 36.

The prediction tap and the class tap may be constituted by the same learner pixels and may also be constituted by different learner pixels.

The classifying circuit 36 classifies the target pixel using a method conforming to the control signal from the control circuit 40 on the basis of the class tap from the class tap constructing circuit 35, and supplies a class code corresponding to the class of the target pixel obtained as a result of classification to the normal equation adder 37.

As a method for classification, for example, a method using a threshold value or a method using ADRC (adaptive dynamic range coding) may be employed.

In the method using a threshold value, the pixel values of the learner pixels constituting the class tap are binarized depending on whether or not the pixel values are greater than a predetermined threshold value (or equal to/greater than the threshold value), and the class of the target pixel is determined in accordance with the result of binarization.

In the method using ADRC, the learner pixels constituting the class tap are ADRC-processed and the class of the target pixel is determined in accordance with an ADRC code obtained as a result of ADRC processing.

In K-bit ADRC, for example, a maximum value MAX and a minium value MIN of the pixel values of the learner pixels constituting the class tap are detected and DR=MAX−MIN is used as a local dynamic range of the class tap. On the basis of the dynamic range DR, the learner pixels constituting the class tap are re-quantized to K bits. That is, the minimum value MIN is subtracted from the pixel values of the pixels constituting the class tap and the subtraction value is divided (quantized) by DR/2K. Therefore, for example, when the class tap is one-bit ADRC-processed, the pixel value of each learner pixel constituting the class tap is caused to be one bit. In this case, a bit string such that the pixel values each being one bit of the respective pixels constituting the class tap, obtained as described above, are arrayed in a predetermined order, is outputted as an ADRC code.

Therefore, according to ADRC, when the class tap is constituted by N learner pixels and the result of K-bit ADRC processing the class tap is caused to be a class code, the target pixel is classified into one of $(2N)K$ classes.

The normal equation adder 37 reads out the teacher pixel as the target pixel from the frame memory 31 and carries out addition with respect to the prediction tap (that is, learner pixels constituting the prediction tap) and the target pixel (teacher pixel).

Specifically, the normal equation adder 37 carries out arithmetic operation equivalent to the multiplication ($xin \times xim$) of the learner pixels, which are multipliers of prediction coefficient, and the summation ($\Sigma$) on the left side of the normal equation (7) using the prediction tap (learner pixels), for each class corresponding to the class code supplied from the classifying circuit 36.

Moreover, the normal equation adder 37 carries out arithmetic operation equivalent to the multiplication ($xin \times yi$) of the learner pixels and the target pixel (teacher pixel) and the summation ($\Sigma$) on the right side of the normal equation (7) using the prediction tap (earner pixels) and the target pixel (teacher pixel), for each class corresponding to the class code supplied from the classifying circuit 36.

The normal equation adder 37 carries out the above-described addition with respect to all the teacher pixels stored in the frame memory 31 as target pixels. Thus, the normal equation expressed by the equation (7) is set up for each class. On the basis of the normal equation, improvement information is generated for each predetermined number of teacher pixels.

A prediction coefficient determining circuit 38 solves the normal equation generated for each class by the normal equation adder 37, thus finding a prediction coefficient for each class. The prediction coefficient determining circuit 38 supplies the prediction coefficients to addresses corresponding to the respective class in a memory 39. The memory 39 stores the prediction coefficients supplied from the prediction coefficient determining circuit 38 as improvement information, and when necessary, supplies the prediction coefficients to the integrating unit 12 (FIG. 2).

In some cases, a class is generated for which a necessary number of normal equations for finding the prediction coefficient cannot be obtained by the normal equation adder 37. As for such a class, the prediction coefficient determining circuit 38 outputs a default prediction coefficient (for example, a prediction coefficient found in advance by using a relatively large number of teacher images).

The control circuit 40 is supplied with a system selecting signal (FIG. 2) for selecting an improvement system for improving the image quality of the broadcast image data. In accordance with the improvement system indicated by the system selecting signal, the control circuit 40 controls the prediction tap constructing circuit 34, the class tap constructing circuit 35 and the classifying circuit 36 so that necessary improvement information for improving the image quality of the broadcast image data is generated.

In the present embodiment, the amount (viewing fee) charged by the accounting unit 14 is varied in accordance with the improvement system (improvement information used for the improvement system) used by the receiving device 3.

The charged amount (viewing fee) can be set in accordance with, for example, whether or not to use classification processing as the improvement system. For example, the charged amount can be varied among three cases, that is, the case where linear interpolation is used as the improvement system, the case where only adaptive processing is used as the improvement system, and the case where classification adaptive processing is used as the improvement system, as shown in FIG. 8A.

The case where only adaptive processing is used is the case where only adaptive processing is carried out without carrying out classification. Therefore, it is the case where there is only one class (mono-class) in classification adaptive processing.

In the case where linear interpolation is used as the improvement system, since no prediction coefficient is necessary, the improvement information generating unit 11 does not carry out particular processing and outputs the information that linear interpolation is designated, as the improvement information.

The charged amount can also be set in accordance with the number of classes in classification adaptive processing used as the improvement system. For example, the charged amount can be varied among three cases, that is, the case where linear interpolation is used as the improvement system, the case where classification adaptive processing with a small number of classes is used as the improvement system, and the case where classification adaptive processing with a large number of classes is used as the improvement system, as shown in FIG. 8B.

The charged amount can also be set in accordance with the image quality of the learner image or the teacher image used for generating prediction coefficients in classification adaptive processing used as the improvement system. For example, if the image quality of the teacher image is good, a prediction coefficient of high performance that can largely improve the image quality of the broadcast image data is provided. On the contrary, if the image quality of the teacher image is not very good, a prediction coefficient of low performance that can only slightly improve the image quality of the broadcast image data is provided. Thus, the charged amount can be varied among three cases, that is, the case where linear interpolation is used as the improvement system, the case where classification adaptive processing with a prediction coefficient of low performance is used as the improvement system, and the case where classification adaptive processing with a prediction coefficient of high performance is used as the improvement system, as shown in FIG. 8C.

The charged amount can also be set in accordance with the class tap or the prediction tap constructed in classification adaptive processing as the improvement system. That is, since the image quality of the resultant image varies as described above depending on the manner of constructing the class tap or the prediction tap (the shape of the tap, the number of pixels constituting the tap, and construction of the tap by pixels in either the spatial direction or the temporal direction or in both directions), the charged amount can be varied in accordance with the manner of construction.

Moreover, the charged amount can also be set in accordance with the classification method in classification adaptive processing used as the improvement system. The charged amount can be varied among three cases, that is, the case where linear interpolation is used as the improvement system, the case where adaptive processing using classification by the above-described threshold value is used as the improvement system, and the case where adaptive processing using classification by ADRC processing is used as the improvement system, as shown in FIG. 8D.

The improvement system and the system selecting signal can be associated with each other, for example, as shown in FIGS. 8A to 8D, and the control circuit 40 outputs a control signal for carrying out designation so that the improvement information used for the improvement system corresponding to the system selecting supplied thereto is obtained, to the prediction tap constructing circuit 34, the class tap constructing circuit 35 and the classifying circuit 36. As the improvement system, a combination of a plurality of systems of the above-described improvement systems can also be employed.

The improvement information generation processing for generating improvement information, carried out by the improvement information generating unit 11 of FIG. 6, will now be described with reference to the flowchart of FIG. 9.

First, at step S21, a teacher image corresponding to a unit of improvement information generation is stored in the frame memory 31. Then, at step S22, the control circuit 40 supplies a control signal for carrying out designation so that improvement information used for an improvement system corresponding to a system selecting signal supplied thereto is obtained, to the prediction tap constructing circuit 34, the class tap constructing circuit 35 and the classifying circuit 36. Thus, the prediction tap constructing circuit 34, the class tap constructing circuit 35 and the classifying circuit 36 are set to carry out the processing to obtain a prediction coefficient as the improvement information used for the improvement system in accordance with the control signal.

The system selecting signal supplied to the control circuit 40 includes information indicating a plurality of improvement systems. The control circuit 40 sequentially outputs a control signal corresponding to the plurality of improvement systems every time the processing of step S22 is carried out.

If the control signal outputted from the control circuit 40 indicates linear interpolation, information that linear interpolation is designated is stored into the memory 39 as the improvement information. The processing of steps S23 to S28 is skipped and the processing goes to step S29.

After the processing of step S22, the processing goes to step S23 and the down converter 32 performs LPF (low pass filter) filtering or decimation of the teacher image stored in the frame memory 31, when necessary, thus generating an image of the same image quality as the broadcast image data, as a learner image. The learner image is supplied to and stored in the frame memory 33.

The learner image can also be an image of image quality different from that of the broadcast image data. In such a case, a control signal to that effect is supplied from the control circuit 40 to the down converter 32 and the down converter 32 generates a learner image of image quality conforming to the control signal from the control circuit 40.

Then, at step S24, a teacher pixel that has not yet been a target pixel, of the teacher pixels stored in the frame memory 31, is used as a target pixel, and the prediction tap constructing circuit 34 constructs a prediction tap for the target pixel of the structure conforming to the control signal from the control circuit 40, by using the learner pixel stored in the frame memory 33. Moreover, at step S24, the class tap constructing circuit 35 constructs a class tap for the target pixel of the structure conforming to the control signal from the control circuit 40, by using the learner pixel stored in the frame memory 33. Then, the prediction tap is supplied to the normal equation adder 37 and the class tap is supplied to the classifying circuit 36.

At step S25, the classifying circuit 36 classifies the target pixel by the method conforming to the control signal from the control circuit 40 on the basis of the class tap from the class tap constructing circuit 35, and supplies a class code corresponding to a class obtained as a result of classification to the normal equation adder 37. Then, the processing goes to step S26.

At step S26, the normal equation adder 37 reads out the teacher pixel as the target pixel from the frame memory 31 and carries out addition as described above with respect to the prediction tap (learner pixels constituting the prediction tap) and the target pixel (teacher pixel).

Then, at step S27, the control circuit 40 discriminates whether or not addition has been carried out using all the teacher pixels of the unit of improvement information generation stored in the frame memory 31 as target pixels. If it is determined that addition has not yet been carried out using all the teacher pixels as target pixels, the processing returns to step S24. In this case, one of the teacher pixels that have not yet been target pixels is used as a new target pixel and the processing of steps S24 to S27 is repeated.

If it is determined by the control circuit 40 at step S27 that addition has been carried out using all the teacher pixels of the unit of improvement information generation as target pixels, that is, if the normal equation for each class is obtained by the normal equation adder 37, the processing goes to step S28 and the prediction coefficient determining circuit 38 solves each of the normal equations generated for the respective classes, thus finds prediction coefficients for the respective classes, and supplies the prediction coefficients to addresses corresponding to the respective classes in the memory 39. The memory 39 stores the prediction coefficients supplied from the prediction coefficient determining circuit 38 as improvement information.

The memory 39 has a plurality of banks and therefore can store a plurality of types of improvement information simultaneously.

After that, the processing goes to step S29 and the control circuit 40 discriminates whether or not improvement information has been obtained for all of the plurality of improvement systems included in the system selecting signal supplied thereto.

If it is determined at step S29 that one or some of the plurality of types of improvement information used for the plurality of improvement systems included in the system selecting signal have not yet been obtained, the processing returns to step S22 and the control circuit 40 outputs a control signal corresponding to the improvement system for which improvement information has not yet been obtained. Then, the processing similar to the above-described processing is repeated.

On the other hand, if it is determined at step S29 that improvement information has been obtained for all of the plurality of improvement systems included in the system selecting signal, that is, if the plurality of types of improvement information used for the plurality of improvement systems included in the system selecting signal are stored in the memory 39, the processing goes to step S30. The plurality of types of improvement information are read out from the memory 39 and are supplied to the integrating unit 12 (FIG. 2). Then, the processing ends.

Figure 9:
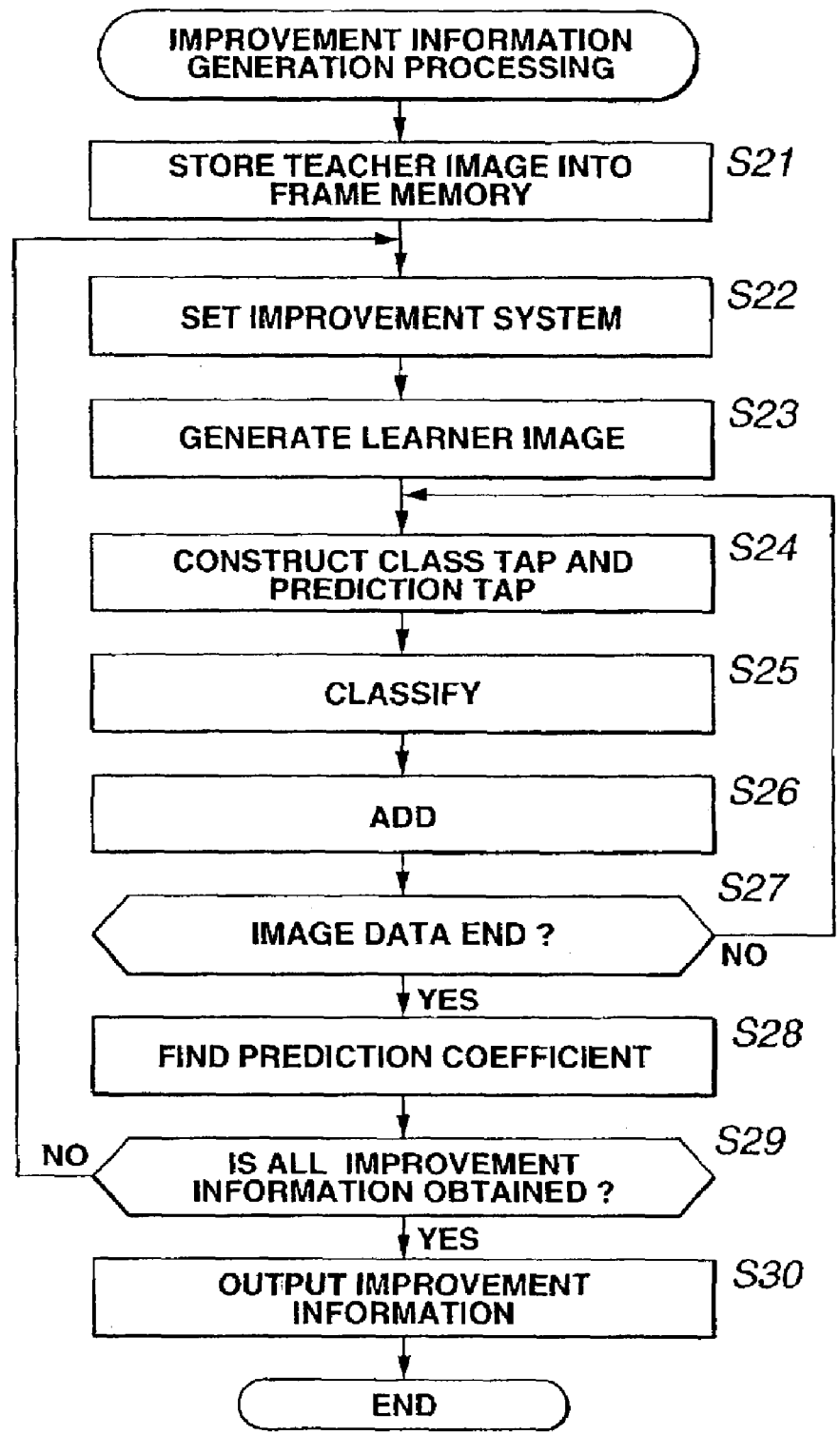
FIG. 9 is a flowchart for explaining the processing by the improvement information generating unit 11 of FIG. 6.

The improvement information generation processing of FIG. 9 is repeated every time the teacher image for a unit of improvement information generation is supplied to the frame memory 31.

In the embodiment of FIG. 6, it is assumed that there exists image data of high image quality having the same contents as broadcast image data. However, in a certain, there is no such image data of high image quality (for example, in the case where the original image is directly used as broadcast image data.) In such a case, since no teacher images exist, the improvement information generating unit 11 of FIG. 6 cannot generate a prediction coefficient as improvement information.

Figure 10:
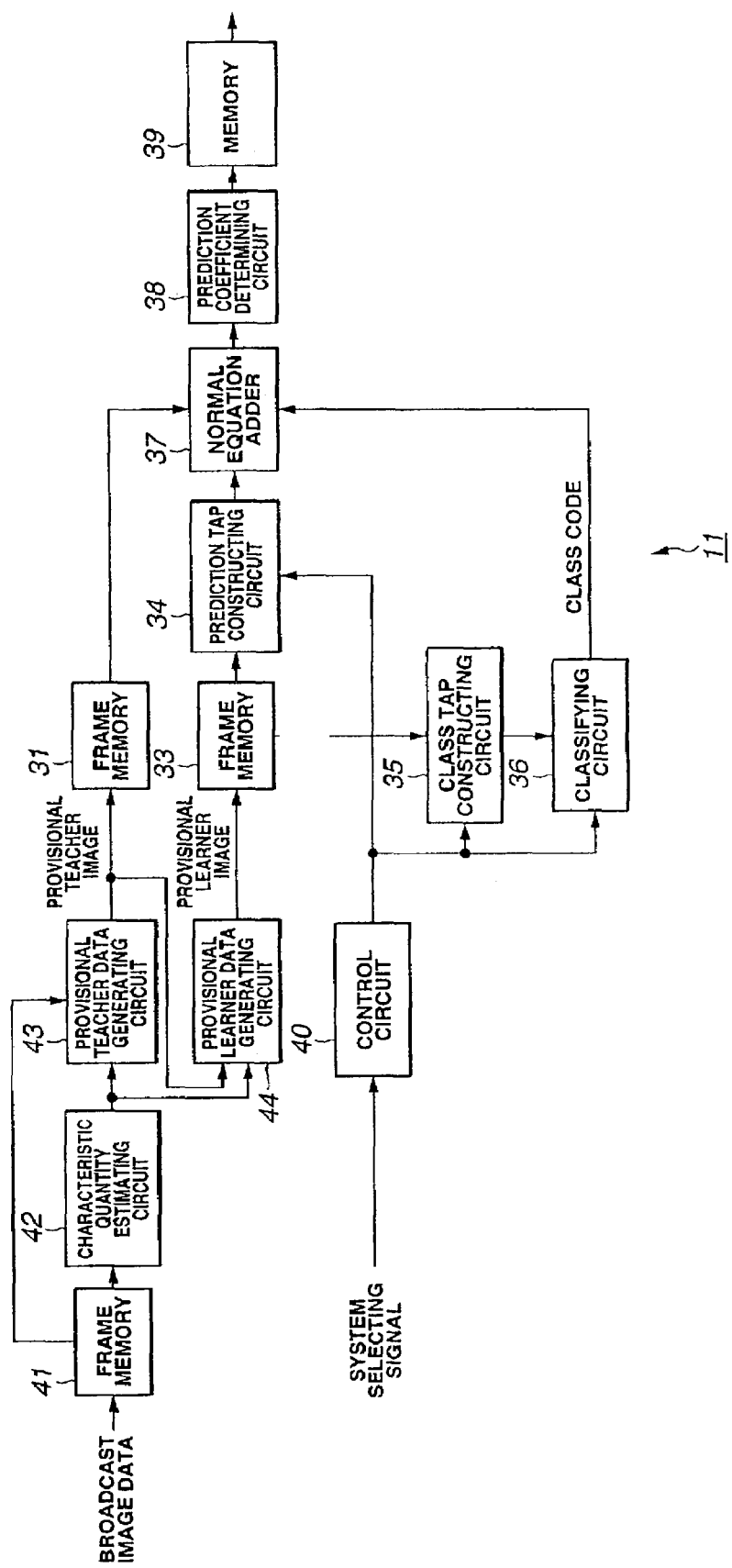
FIG. 10 is a block diagram showing a second exemplary structure of the improvement information generating unit 11.

Thus, FIG. 10 shows another exemplary structure of the improvement information generating unit 11 capable of generating a prediction coefficient as improvement information without using image data of high image quality to be a teacher image when the transmitting device 1 sends out an image of the same size as an original image. In FIG. 10, portions corresponding to those in FIG. 6 are denoted by the same numerals and will not be described further in detail. Specifically, the improvement information generating unit 11 of FIG. 10 is constituted similarly to the improvement information generating unit 11 of FIG. 6, except that the down converter 32 is not provided and that a frame memory 41, a characteristic quantity estimating circuit 42, a provisional teacher data generating circuit 43 and a provisional learner data generating circuit 44 are newly provided.

In the improvement information generating unit 11 of FIG. 10, since no true teacher image exists, a provisional teacher image having a relation with broadcast image data as a learner image similar to the relation between a true teacher image and the broadcast image data as a learner image, and a provisional learner image (hereinafter suitably referred to as a provisional teacher image and a provisional learner image, respectively) are generated from the broadcast image data, and a prediction coefficient as improvement information is generated by using the provisional teacher image and the provisional learner image.

The broadcast image data is supplied to the frame memory 41, and the frame memory 41 stores the broadcast image data supplied thereto, by each unit of improvement information generation.

The characteristic quantity estimating circuit 42 finds the characteristic quantity of the broadcast image data stored in the frame memory 41 and supplies the characteristic quantity to the provisional teacher data generating circuit 43 and the provisional learner data generating circuit 44.

As the characteristic quantity of the broadcast image data, for example, an auto correlation coefficient in the horizontal direction or in the vertical direction, a histogram of pixel values, or a histogram of differential values of adjacent pixels (histogram of activity) can be used.

The provisional teacher data generating circuit 43 estimates the characteristic quantity (hereinafter suitably referred to as estimated teacher characteristic quantity) of the original teacher image (true teacher image) with respect to the broadcast image data on the basis of the characteristic quantity of the broadcast image data from the characteristic quantity estimating circuit 42. Moreover, the provisional teacher data generating circuit 43 performs LPF filtering and decimation on the broadcast image data stored in the frame memory 41, thus generating an image having the same characteristic quantity as the estimated teacher characteristic quantity. The provisional teacher data generating circuit 43 supplies the generated image as a provisional teacher image to the frame memory 31 and the provisional learner data generating circuit 44.

The provisional learner data generating circuit 44 performs LPF filtering on the provisional teacher image supplied from the provisional teacher data generating circuit 43, thus generating an image having the same characteristic quantity as the characteristic quantity of the broadcast image data, which is the original learner image, supplied from the characteristic quantity estimating circuit 42. The provisional learner data generating circuit 44 supplies the generated image as a provisional learner image to the frame memory 33.

The improvement information generation processing for generating improvement information, carried out by the improvement information generating unit 11 of FIG. 10, will now be described with reference to the flowchart of FIG. 11.

First, when broadcast image data is supplied to and stored in the frame memory 41, the characteristic quantity estimating circuit 42 at step S41 extracts the characteristic quantity of the broadcast image data stored in the frame memory 41 and supplies the characteristic quantity to the provisional teacher data generating circuit 43 and the provisional learner data generating circuit 44.

When the characteristic quantity of the broadcast image data is supplied from the characteristic quantity estimating circuit 42, the provisional teacher data generating circuit 43 at step S42 estimates the characteristic quantity of an original teacher image (estimated teacher characteristic quantity) with respect to the broadcast image data on the basis of the characteristic quantity of the broadcast image data. Then, the processing goes to step S43. At step S43, the provisional teacher data generating circuit 43 sets the LPF filter characteristics and the decimation width (decimation rate) for obtaining an image having the same characteristic quantity as the estimated teacher characteristic quantity from the broadcast image data, on the basis of the estimated teacher characteristic quantity. Then, the processing goes to step S44.

At step S44, the provisional teacher data generating circuit 43 decimates the broadcast image data stored in the frame memory 41 by using the preset decimation width and then performs LPF filtering with the preset filter characteristics on the decimated image, thus generating a provisional teacher image.

The purpose of decimating the broadcast image data at step S44 is to obtain an image having a high space frequency and an acute shape of auto-correlation as a provisional teacher image because an image of high image quality has an acute shape of auto-correlation in comparison with an image of lower image quality with the same size.

After the processing of step S44, the processing goes to step S45. The provisional teacher data generating circuit 43 finds the characteristic quantity of the provisional teacher image generated at step S44 and discriminated whether or not the characteristic quantity is approximate to the estimated teacher characteristic quantity. If it is determined at step S45 that the characteristic quantity of the provisional teacher image is not approximate to the estimated teacher characteristic quantity, the processing goes to step S46 and the provisional teacher data generating circuit 43 changes the set value of the filter characteristics of the LPF filtering or the decimation width for the broadcast image data. The processing then returns to step S44. Thus, the generation of the provisional teacher image will be redone.

On the other hand, if it is determined at step S45 that the characteristic quantity of the provisional teacher image is approximate to the estimated teacher characteristic quantity, the provisional teacher image is supplied to and stored in the frame memory 31 and is also supplied toe the provisional learner data generating circuit 44. The processing then goes to step S47.

At step S47, the provisional learner data generating circuit 44 sets the filter characteristics of the LPF filtering performed on the provisional teacher image supplied from the provisional teacher data generating circuit 43 and the processing goes to step S48.

At step S48, the provisional learner data generating circuit 44 performs LPF filtering with the preset filter characteristics on the provisional teacher image, thus generating a provisional learner image.

Then, at step S49, the provisional learner data generating circuit 44 finds the characteristic quantity of the provisional learner image generated at step S48 and discriminates whether or not the characteristic quantity is approximate to the characteristic quantity of the broadcast image data supplied from the characteristic quantity estimating circuit 42. If it is determined at step S49 that the characteristic quantity of the provisional learner image is not approximate to the characteristic quantity of the broadcast image data, the processing goes to step S50 and the provisional learner data generating circuit 44 changes the set value of the filter characteristics of the LPF filtering performed on the provisional teacher image. The processing then returns to step S48. Thus, the generation of the provisional learner image will be redone.

On the other hand, if it is determined at step S49 that the characteristic quantity of the provisional learner image is approximate to the characteristic quantity of the broadcast image data, the provisional learner image is supplied to and stored in the frame memory 33 and the processing goes to step S51.

At steps S51 to S58, the processing similar to the processing of steps S22, S24 to S30 of FIG. 9 is carried out using the provisional teacher image stored in the frame memory 31 as the original teacher image and using the provisional learner image stored in the frame memory 33 as the original learner image. Thus, a plurality of types of improvement information are generated and stored in the memory 39. The plurality of types of improvement information are read out from the memory 39 and are supplied to the integrating unit 12 (FIG. 2). Then, the processing ends. In the embodiment of FIG. 11, since the teacher image and the learner image have the same size, the constructed class tap and prediction tap are different from those shown in FIG. 7. However, the embodiment of FIG. 11 is similar to the embodiment of FIG. 9 in that the class tap and the prediction tap are constructed from a plurality of pixels of the learner image situated around the position of a target pixel in the teacher image.

Figure 11:
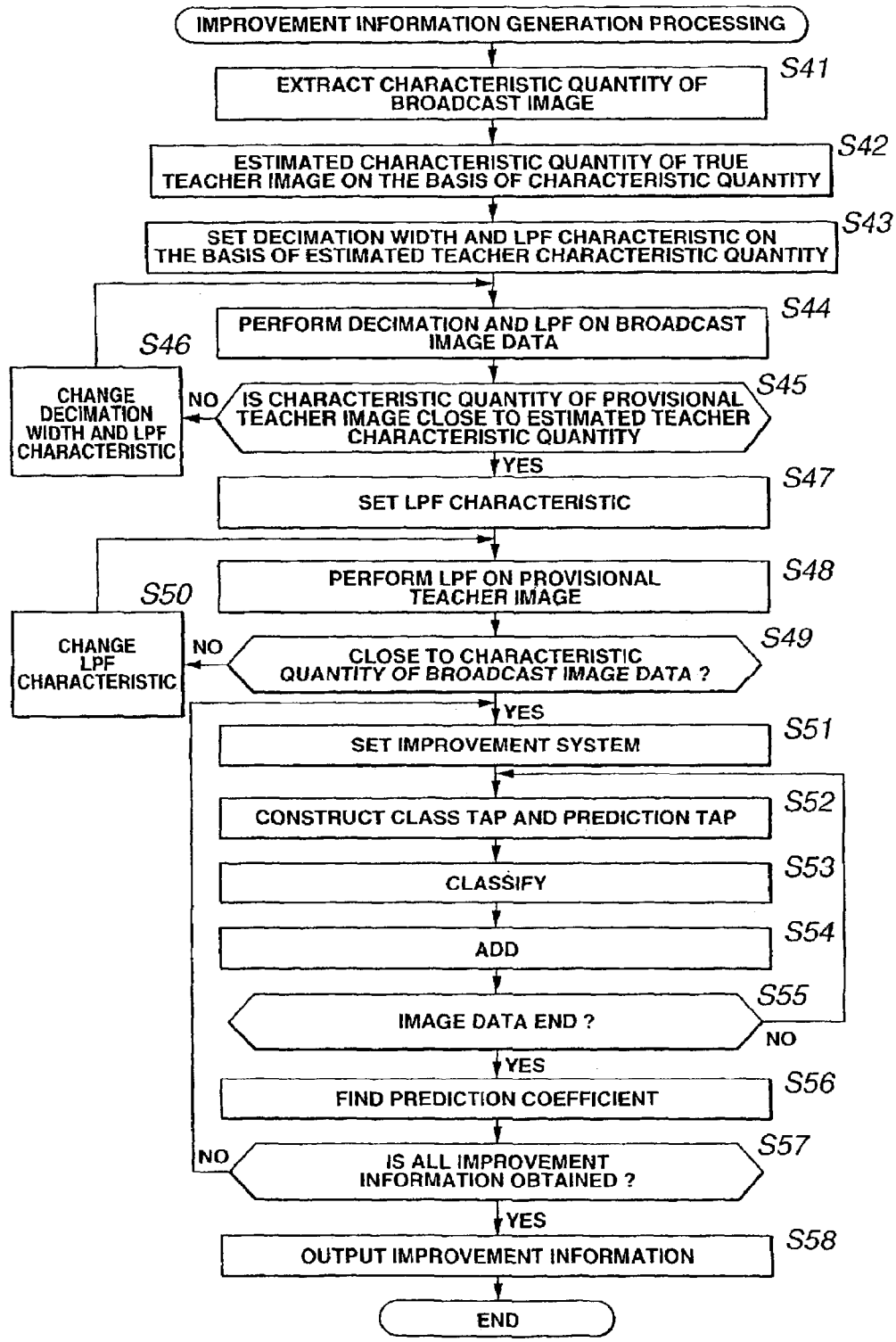
FIG. 11 is a flowchart for explaining the processing by the improvement information generating unit 11 of FIG. 10.

The improvement information generation processing of FIG. 11, similar to the case of FIG. 9, is repeated every time broadcast image data for a unit of improvement information generation is supplied to the frame memory 41.

Figure 12:
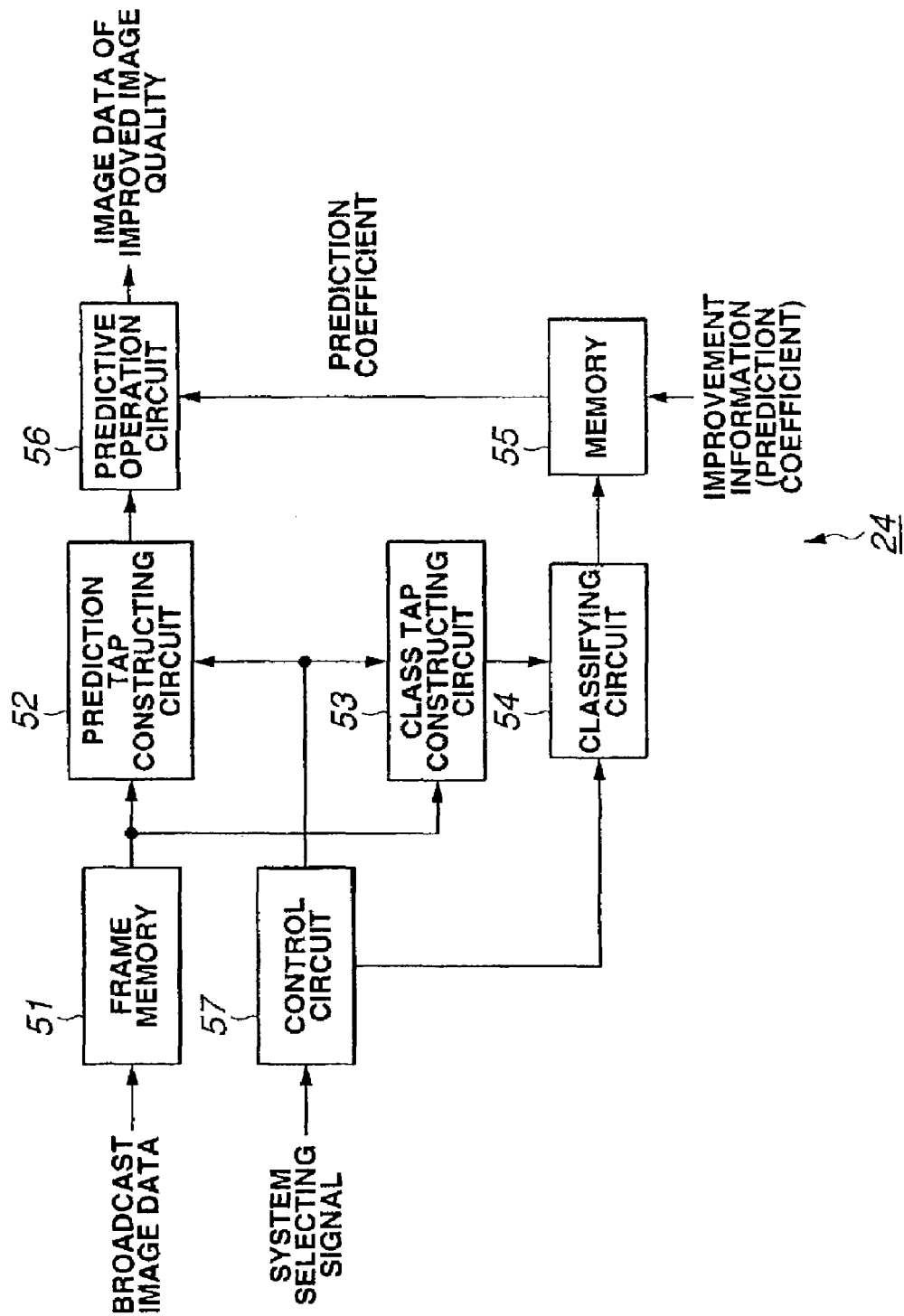
FIG. 12 is a block diagram showing a first exemplary structure of a quality improving unit 24.

FIG. 12 shows an exemplary structure of the quality improving unit 24 of the receiving device 3 (FIG. 4) in the case where the improvement information generating unit 11 of the transmitting device 1 (FIG. 2) is constituted as shown in FIG. 6 or FIG. 10.

A frame memory 51 is supplied with the broadcast image data outputted from the extracting unit 22 (FIG. 4). The frame memory 51 stores the broadcast image data by each unit of improvement information generation.

A prediction tap constructing circuit 52 carries out the processing similar to that of the prediction tap constructing circuit 34 of FIG. 6 in accordance with a control signal from a control circuit 57. Thus, the prediction tap constructing circuit 52 constructs a prediction tap by using the broadcast image data stored in the frame memory 51 and supplies the prediction tap to a predictive operation circuit 56.

A class tap constructing circuit 53 carries out the processing similar to that of the class tap constructing circuit 35 of FIG. 6 in accordance with a control signal from the control circuit 57. Thus, the class tap constructing circuit 53 constructs a class tap by using the broadcast image data stored in the frame memory 51 and supplies the class tap to a classifying circuit 54.

The classifying circuit 54 carries out the processing similar to that of the classifying circuit 36 of FIG. 6 in accordance with a control signal from the control circuit 57. Thus, the classifying circuit 54 supplies a class code as a result of classification using the class tap from the class tap constructing circuit 53, as an address to a memory 55.

The memory 55 stores the prediction coefficient as improvement information supplied from the selecting unit 23 (FIG. 4). Moreover, the memory 55 reads out the prediction coefficient stored at the address corresponding to the class code from the classifying circuit 54 and supplies the read-out prediction coefficient to the predictive operation circuit 56.

The predictive operation circuit 56 carries out linear predictive operation (product-sum operation) expressed by the equation (1) using the prediction tap supplied from the prediction tap constructing circuit 52 and the prediction coefficient supplied from the memory 55, and outputs a resultant pixel value as a prediction value of the image of high image quality (teacher image) obtained by improving the image quality of the broadcast image data.

The control circuit 57 is supplied with the system selecting signal outputted from the selecting unit 23 (FIG. 4). On the basis of the system selecting signal, the control circuit 57 outputs control signals similar to those in the case of the control circuit 40 of FIG. 6, to the prediction tap constructing circuit 52, the class tap constructing circuit 53 and the classifying circuit 54.

The system selecting signal supplied from the selecting unit 23 to the control circuit 57 includes only one piece of information corresponding to the image quality level signal outputted from the accounting unit 27 (FIG. 4) in response to a request from the user, of the information indicating a plurality of improvement systems included in the system selecting signal supplied to the control circuit 40 of FIG. 6. Therefore, the control circuit 57 controls the prediction tap constructing circuit 52, the class tap constructing circuit 53 and the classifying circuit 54 so as to provide an image of the image quality requested by the user.

The quality improvement processing for improving the image quality of a broadcast image, carried out by the quality improving unit 24 of FIG. 12, will now be described with reference to the flowchart of FIG. 13.

In the receiving device 3 (FIG. 4), when broadcast image data of each unit of improvement information generation is supplied from the extracting unit 22 to the quality improving unit 24, one type (one set) of improvement information selected from a plurality of improvement information on the basis of the image quality level signal is supplied from the selecting unit 23 to the quality improving unit 24, together with the system selecting signal indicating the improvement system for improving the image quality by using the improvement information.

At step S61, the broadcast image data supplied from the extracting unit 22 is stored into the frame memory 51 by each unit of improvement information generation. Also at step S61, the improvement information supplied from the selecting unit 23 is stored into the memory 55. Moreover, at step S61, the control circuit 57 is supplied with the system selecting signal from the selecting unit 23 and supplies control signals for designating the improvement of the image quality of the broadcast image data by the improvement system corresponding to the system selecting signal, to the prediction tap constructing circuit 52, the class tap constructing circuit 53 and the classifying circuit 54. Thus, the prediction tap constructing circuit 52, the class tap constructing circuit 53 and the classifying circuit 54 are set to carry out the processing in accordance with the improvement system indicated by the control signals from the control circuit 57.

In the present embodiment, the improvement information stored in the memory 55 is a prediction coefficient except for the case where the system selecting signal supplied to the control circuit 57 indicates linear interpolation.

If the system selecting signal supplied to the control circuit 57 indicates linear interpolation, the control circuit 57 supplies a control signal designating linear interpolation of the broadcast image data stored in the frame memory 51, to the predictive operation circuit 56. In this case, the predictive operation circuit 56 reads out the broadcast image data stored in the frame memory 51 via the prediction tap constructing circuit 52, then carries out linear interpolation, and outputs the resultant broadcast image data. In this case, the processing of step S62 and the subsequent steps is not carried out.

After the processing of step S61, the processing goes to step S62. Of the pixels constituting an image of high image quality obtained by improving the broadcast image data stored in the frame memory 51, one of the pixels that have not yet been target pixels is used as a target pixel, and the prediction tap constructing circuit 52 constructs a prediction tap for the target pixel, of a structure conforming to the control signal from the control circuit 57, by using the pixels of the broadcast image data stored in the frame memory 51. Moreover, at step S62, the class tap constructing circuit 53 constructs a class tap for the target pixel, of a structure conforming to the control signal from the control circuit 57, by using the pixels of the broadcast image data stored in the frame memory 51. The prediction tap is supplied to the predictive operation circuit 56 and the class lap is supplied to the classifying circuit 54.

At step S63, the classifying circuit 54 classifies the target pixel by a method conforming to the control signal from the control circuit 57, using the class tap from the class tap constructing circuit 53, and supplies a class code corresponding to a resultant class as an address to the memory 55. Then, the processing goes to step S64.

At step S64, the memory 55 reads out the prediction coefficient stored at the address indicated by the class code from the classifying circuit 54, of the prediction coefficients as improvement information stored at step S61, and supplies the read-out prediction coefficient to the predictive operation circuit 56.

At step S65, the predictive operation circuit 56 carries out linear predictive operation expressed by the equation (1) using the prediction tap supplied from the prediction tap constructing circuit 52 and the prediction coefficient supplied from the memory 55, and temporarily stores a resultant pixel value as a prediction value of the target pixel.

Then, at step S66, the control circuit 57 discriminates whether or not prediction values have been found for all the pixels constituting the frame of the image of high image quality corresponding to the frame of the broadcast image data stored in the frame memory 51, as target pixels. If it is determined at step S66 that prediction values have not yet been found for all the pixels constituting the frame of the image of high image quality as target pixels, the processing returns to step S62. Of the pixels constituting the frame of the image of high image quality, pixels that have not yet been target pixels are newly used as target pixels, and similar processing is repeated.

On the other hand, if it is determined at step S66 that prediction values have been found for all the pixels constituting the frame of the image of high image quality as target pixels, the processing goes to step S67 and the predictive operation circuit 56 sequentially outputs an image of high image quality made up of the already found prediction values to the display unit 25 (FIG. 4). Then, the processing ends.

Figure 13:
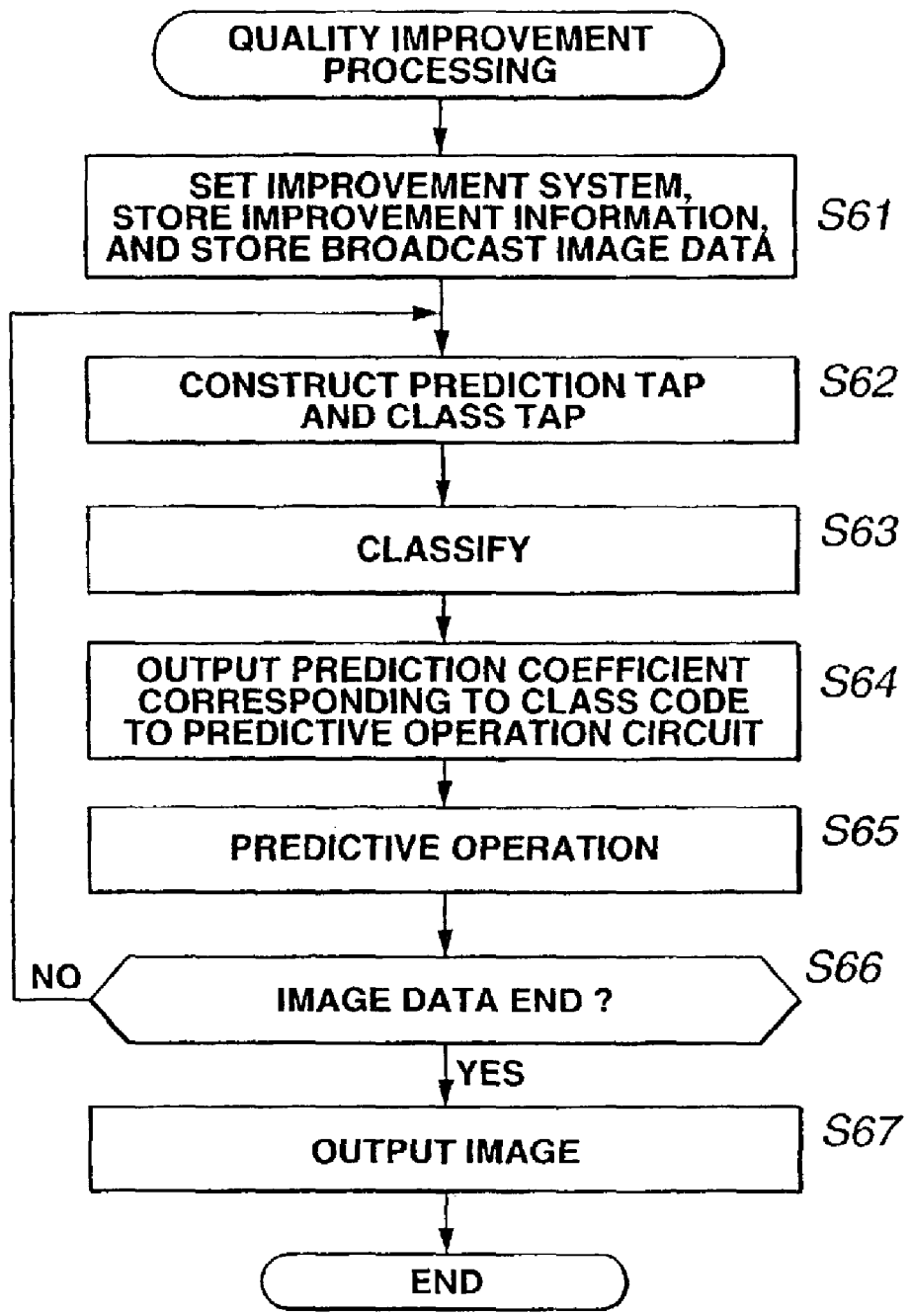
FIG. 13 is a flowchart for explaining the processing by the quality improving unit 24 of FIG. 12.

The quality improvement processing of FIG. 13 is repeated every time broadcast image data for a unit of improvement information generation is supplied to the frame memory 51.

As described above, a plurality of types of improvement information are transmitted from the transmitting device 1, and in the receiving device 3, improvement information corresponding to the image quality meeting the request from the user is selected from the plurality of improvement information and the image quality is improved by using the selected improvement information. Therefore, an image of the image quality meeting the request of the user can be provided and more detailed accounting can be carried out in accordance with the image quality of the image provided for the user.

In the above-described case, a plurality of types of improvement information area transmitted from the transmitting device 1, and in the receiving device 3, improvement information corresponding to the image quality meeting the request from the user is selected from the plurality of improvement information. However, it is also possible that the transmitting device 1 accepts the request by the user from the receiving device 3 in advance and transmits only the improvement information corresponding to the image quality meeting the request, to the receiving device 3. In this case, only the improvement information corresponding to the image quality meeting the request from the user is included in an integrated signal by the integrating unit 12 under the control of the accounting unit 14, as indicated by a dotted line in FIG. 2.

In the above-described case, a plurality of types of prediction coefficients are information designating linear interpolation are transmitted as a plurality of types of improvement information. However, it is also possible to store predetermined prediction coefficients in the memory 55 of the receiving device 3 instead of transmitting the plurality of types of prediction coefficients from the transmitting device 1, and to transmit information about which of the plurality of types of prediction coefficients stored in the memory 55 is to be used, as the plurality of types of improvement information.

In the above-described case, classification adaptive processing and linear interpolation are used as the improvement systems. However, other processing can also be employed as the improvement systems.

Moreover, in the above-described case, the improvement information generating unit 11 generates a prediction coefficient as improvement information and the quality improving unit 24 carries out classification adaptive processing with the prediction coefficient, thus improving the image quality of the image. However, it is also possible that the improvement information generating unit 11 finds, as improvement information, a class code of an appropriate prediction coefficient to be used for predicting a target pixel, and that the quality improving unit 24 carries out adaptive processing with the prediction coefficient of the class code, thus improving the image quality of the image.

Specifically, prediction coefficients for respective classes, obtained by learning in advance, are stored in the improvement information generating unit 11 and the quality improving unit 24. Then, the improvement information generating unit 11 carries out adaptive processing with the prediction coefficient of each class stored in advance, thus finding a prediction value of the image of high image quality. The improvement information generating unit 11 finds, as improvement information, a class code of the prediction coefficient at the time when a prediction value closest to the true value is obtained for each pixel. Meanwhile, the quality improving unit 24 finds a prediction value of the image of high image quality by using a prediction coefficient corresponding to the class code as the improvement information, of the prediction coefficient stored in advance, and thus obtains an image of improved image quality. In this case, the receiving device 3 can obtain an image of the same image quality as in the transmitting device 1 (improvement information generating unit 11).

In this case, the improvement information generating unit 11 and the quality improving unit 24 do not carry out classification as described above. That is, the improvement information generating unit 11 finds a class code of an appropriate prediction coefficient for finding a prediction value, for example, by carrying out adaptive processing (predictive operation) with the prediction coefficients of all the classes, and the quality improving unit 24 uses such a class code as improvement information and improves the quality of the image by carrying out adaptive processing with a prediction coefficient of the class code. Therefore, neither the improvement information generating unit 11 nor the quality improving unit 24 needs to carry out classification.

Figure 14:
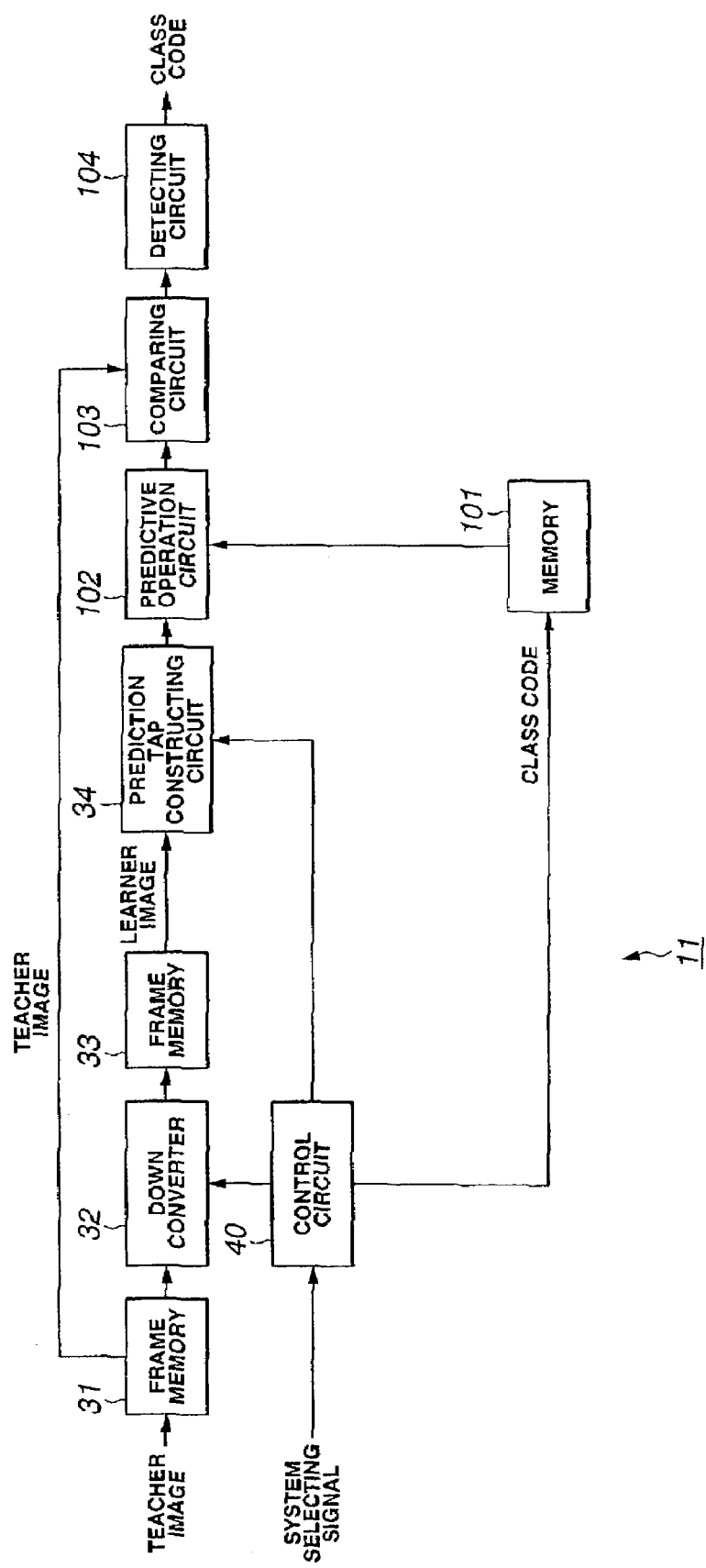
FIG. 14 is a block diagram showing a third exemplary structure of the improvement information generating unit 11.

FIG. 14 shows an exemplary structure of the improvement information generating unit 11 for finding, as improvement information, a class code of an appropriate prediction coefficient used for predicting a target pixel. In FIG. 14, portions corresponding to those in FIG. 6 are denoted by the same numerals and will not be described further in detail.

Prediction coefficients of respective classes found by learning in a learning device (FIG. 16), which will be described later, are stored in a memory 101. The memory 101, which is controlled by the control circuit 40, sequentially reads out the prediction coefficients of the respective classes and supplies the read-out prediction coefficients to a predictive operation circuit 102.

The predictive operation circuit 102 is supplied with a prediction tap from the prediction tap constructing circuit 34, as well as with the prediction coefficients from the memory 101. The predictive operation circuit 102, similarly to the predictive operation circuit 56, carries out linear predictive operation (product-sum operation) expressed by the equation (1) using the prediction tap supplied from the prediction tap constructing circuit 34 and the prediction coefficients supplied from the memory 101. However, with respect to one prediction tap, the predictive operation circuit 102 carries out linear predictive operation with each of the prediction coefficients of the respective classes sequentially supplied from the memory 101, thus finding a prediction value of a teacher pixel. Therefore, for each teacher pixel, the predictive operation circuit 102 finds prediction values of the same number as the total number of classes.

The prediction values found by the predictive operation circuit 102 are supplied to a comparing circuit 103. The comparing circuit 103 is also supplied with a teacher image from the frame memory 31. The comparing circuit 103 compares each of the teacher pixels constituting the teacher image supplied from the frame memory 31 with each of the prediction values found from the predictive coefficients of the respective classes, for the teacher pixels, supplied from the predictive operation circuit 102, thus finding a prediction error. The comparing circuit 103 supplies the prediction error to a detecting circuit 104.

The detecting circuit 104 detects a prediction value of a teacher pixel which minimizes the prediction error supplied from the comparing circuit 103. Moreover, the detecting circuit 104 detects a class code indicating the class of the prediction coefficient at the time when that prediction value is obtained, and the detecting circuit 104 outputs the class code as improvement information.

The improvement information generation processing for generating improvement information, carried out by the improvement information generating unit 11 of FIG. 14, will now be described with reference to the flowchart of FIG. 15.

First, at step S111, a teacher image corresponding to a unit of improvement information generation is stored in the frame memory 31. Then, at step S112, the control circuit 40 supplies a control signal for carrying out designation so as to obtain improvement information used for an improvement system corresponding to the system selecting signal supplied thereto, to the prediction tap constructing circuit 34. Thus, the prediction tap constructing circuit 34 is set to carry out the processing so as to obtain a class code as the improvement information used for the improvement system conforming to the control signal.

The system selecting signal supplied to the control circuit 40 includes information indicating a plurality of improvement systems. The control circuit 40 sequentially outputs a control signal corresponding to the plurality of improvement systems every time the processing of step S112 is carried out.

If the control signal outputted from the control circuit 40 indicates linear interpolation, information that linear interpolation is designated is stored into the memory 39 as the improvement information. The processing of steps S113 to S122 is skipped and the processing goes to step S123.

After the processing of step S112, the processing goes to step S113 and the down converter 32 performs LPF (low pass filter) filtering or decimation of the teacher image stored in the frame memory 31, when necessary, thus generating an image of the same image quality as the broadcast image data, as a learner image. The learner image is supplied to and stored in the frame memory 33.

Figure 15:
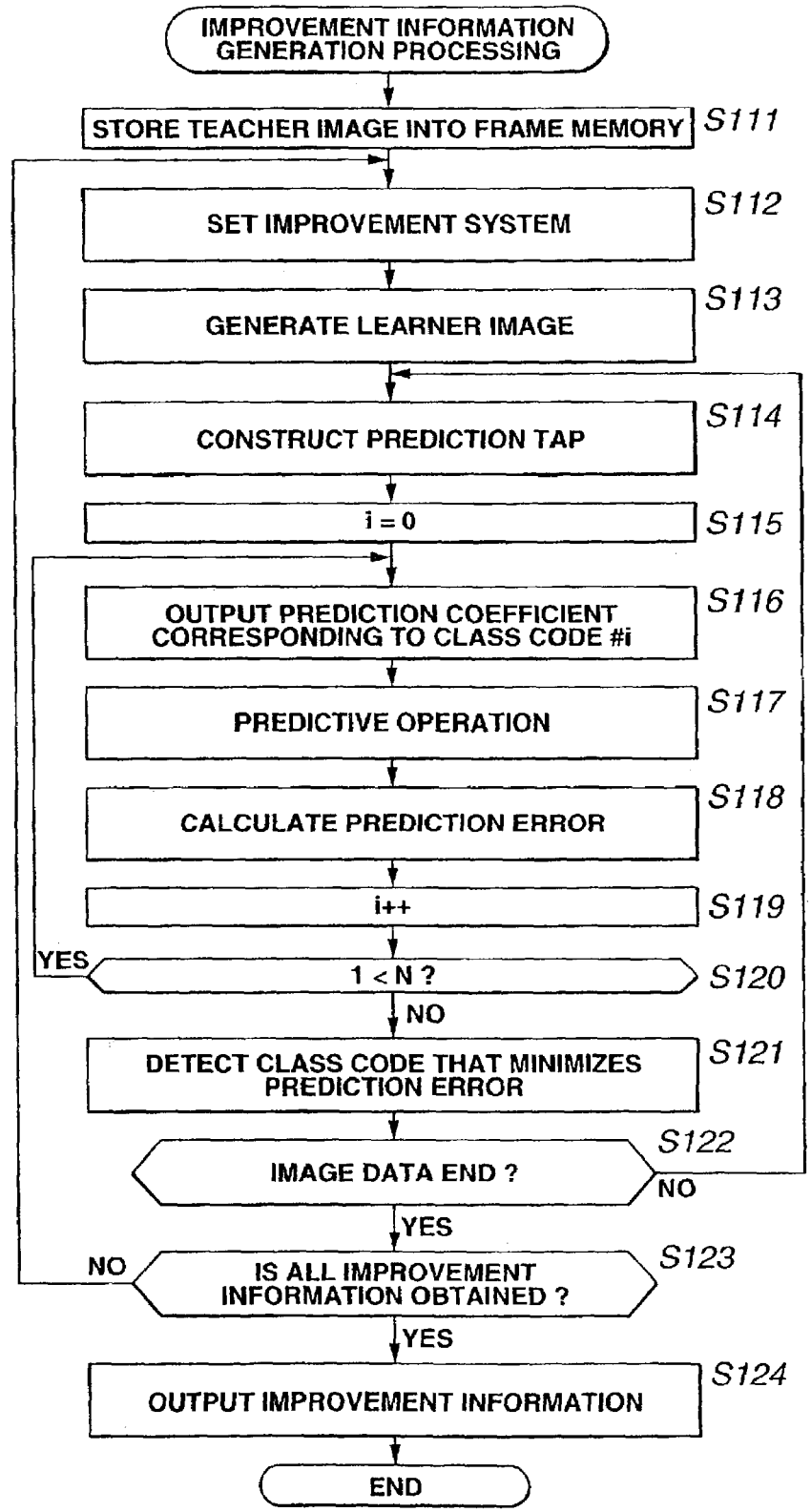
FIG. 15 is a flowchart for explaining the processing by the improvement information generating unit 11 of FIG. 14.

In the embodiment of FIG. 15, too, similarly to the embodiment of FIG. 9, the learner image can also be an image of image quality different from that of the broadcast image data. In such a case, a control signal to that effect is supplied from the control circuit 40 to the down converter 32 and the down converter 32 generates a learner image of image quality conforming to the control signal from the control circuit 40.

Then, at step S114, a teacher pixel that has not yet been a target pixel, of the teacher pixels stored in the frame memory 31, is used as a target pixel, and the prediction tap constructing circuit 34 constructs a prediction tap for the target pixel of the structure conforming to the control signal from the control circuit 40, by using the learner pixel stored in the frame memory 33. The prediction tap is supplied to the predictive operation circuit 102.

After that, at step S115, the control circuit 40 sets a variable i for counting classes at 0 as an initial value and the processing goes to step S116. At step S116, the control circuit 40 supplies the variable i as an address to the memory 101. Thus, at step S116, a prediction coefficient corresponding to a class code #i is read out from the memory 101 and is supplied to the predictive operation circuit 102.

At step S117, the predictive operation circuit 102 carries out linear predictive operation expressed by the equation (1) using the prediction tap supplied from the prediction tap constructing circuit 34 and the prediction coefficient supplied from the memory 101, and supplies a resultant pixel value to the comparing circuit 103 as a prediction value of the target pixel.

At step S118, the comparing circuit 103 reads out the pixel value of the target pixel from the frame memory 31 and compares it with the prediction value from the red predictive operation circuit 102, thus finding a prediction error of the prediction value. Moreover, at step S118, the comparing circuit 103 supplies the prediction error to the detecting circuit 104 and the processing goes to step S119.

At step S119, the control circuit 40 increments the variable i by one and the processing goes to step S120. At step S120, the control circuit 40 discriminates whether or not the variable i is less than N, which is the total number of classes. If it is determined that the variable i is less than N, the processing returns to step S116 and similar processing is repeated.

If it is determined at step 5120 that the variable i is not less than N, that is, if the prediction error of the prediction value is found by using the prediction coefficients corresponding to all the classes with respect to the target pixel, the processing goes to step S121. The detecting circuit 104 detects the class of a prediction coefficient which minimizes the prediction error with respect to the target pixel and stores a class code corresponding to that class as improvement information.

Then, at step S123, the control circuit 40 discriminates whether or not improvement information has been obtained for all of the plurality of improvement systems included in the system selecting signal supplied thereto.

If it is determined at step S123 that one or some of the plurality of types of improvement information used for the plurality of improvement systems included in the system selecting signal have not yet been obtained, the processing returns to step S112 and the control circuit 40 outputs a control signal corresponding to the improvement system for which improvement information has not yet been obtained. Then, the processing similar to the above-described processing is repeated.

On the other hand, if it is determined at step S123 that improvement information has been obtained for all of the plurality of improvement systems included in the system selecting signal, that is, if the plurality of types of improvement information used for the plurality of improvement systems included in the system selecting signal are stored in the detecting circuit 104, the processing goes to step S124. The plurality of types of improvement information are read out from the detecting circuit 104 and are supplied to the integrating unit 12 (FIG. 2). Then, the processing ends.

The improvement information generation processing of FIG. 15, similar to the improvement information generation processing of FIG. 9, is repeated every time the teacher image for a unit of improvement information generation (for example, a teacher image of one frame) is supplied to the frame memory 31.

Figure 16:
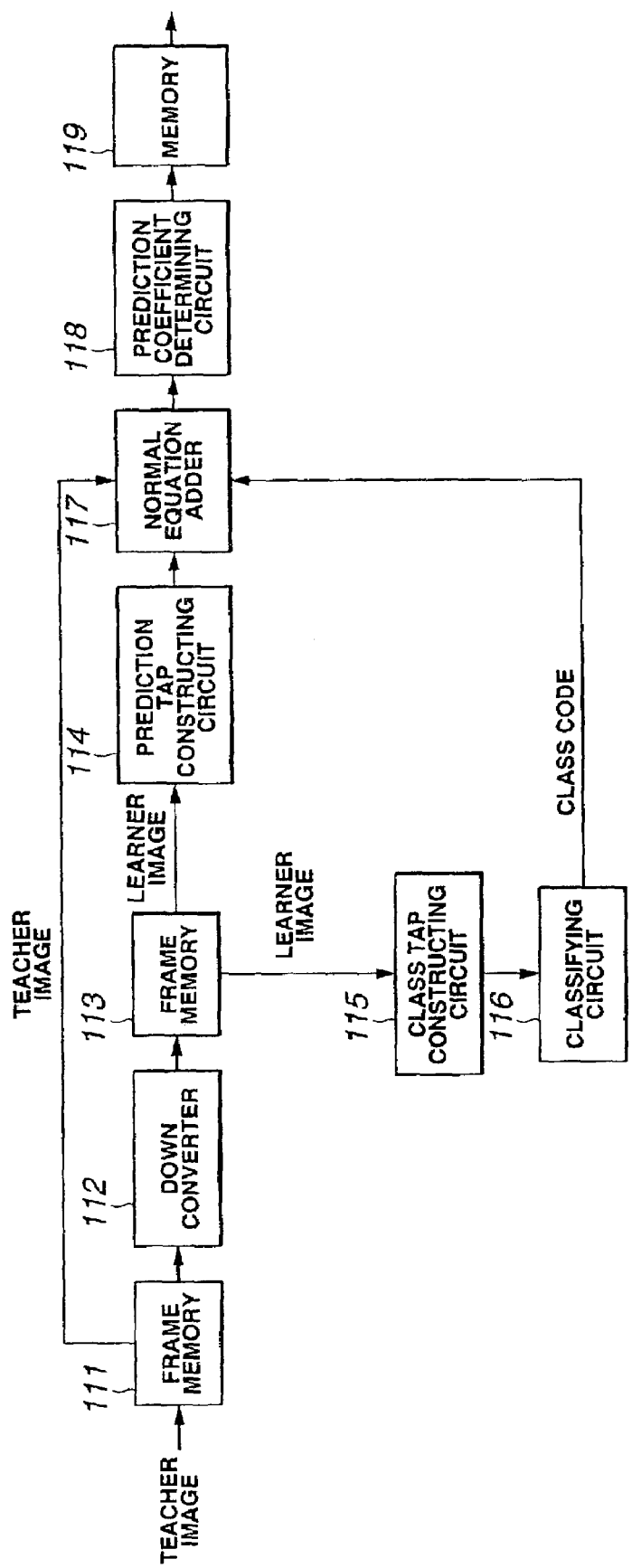
FIG. 16 is a block diagram showing a first exemplary structure of a learning device for finding a prediction coefficient.

FIG. 16 shows an exemplary structure of an embodiment of a learning device for finding a prediction coefficient for each class stored in the memory 101 of FIG. 14.

In the embodiment of FIG. 16, a frame memory 111, a down converter 112, a frame memory 113, a prediction tap constructing circuit 114, a class tap constructing circuit 115, a classifying circuit 116, a normal equation adder 117, a prediction coefficient determining circuit 118 and a memory 119 are constituted similarly to the frame memory 31, the down converter 32, the frame memory 33, the prediction tap constructing circuit 34, the class tap constructing circuit 35, the classifying circuit 36, the normal equation adder 37, the prediction coefficient determining circuit 38 and the memory 39 of the improvement information generating unit 11 shown in FIG. 6, respectively.

Therefore, in the learning device of FIG. 16, a prediction coefficient for each class is found basically by carrying out the processing similar to the processing in the improvement information generating unit 11 of FIG. 6. In the memory 101 of FIG. 14, the prediction coefficient for each class found by learning in advance in the learning device of FIG. 16 is stored.

In the embodiment of FIG. 16, it is possible to change the tap structure and the classification method by controlling the down converter 112, the prediction tap constructing circuit 114, the class tap constructing circuit 115 and the classifying circuit 116 and thus find a plurality of types of prediction coefficients.

Figure 17:
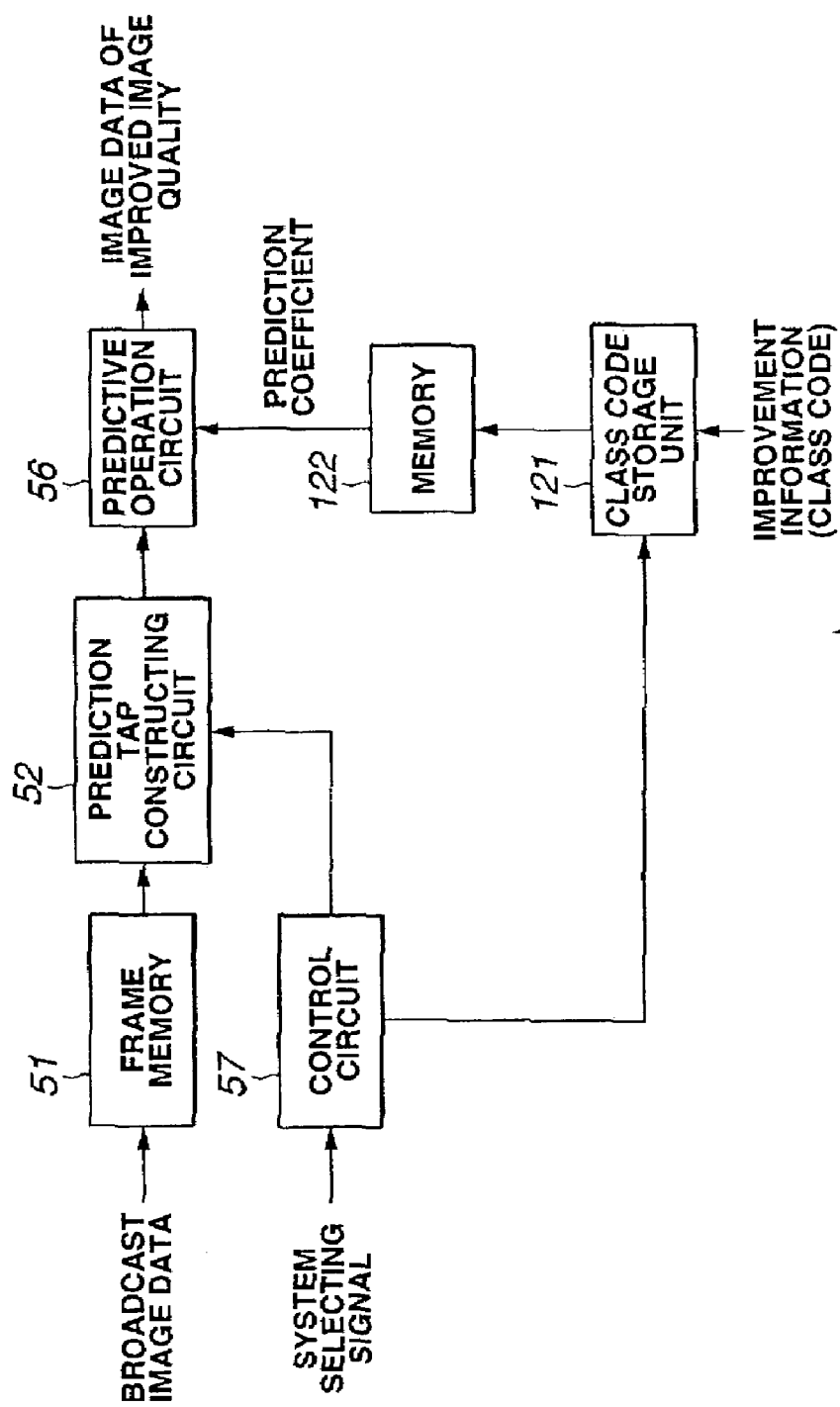
FIG. 17 is a block diagram showing a second exemplary structure of the quality improving unit 24.

FIG. 17 shows an exemplary structure of the quality improving unit 24 of the receiving device 3 (FIG. 4) in the case where the improvement information generating unit 11 is constituted as shown in FIG. 14. In FIG. 17, portions corresponding to those in FIG. 12 are denoted by the same numerals and will not be described further in detail.

A class code storage unit 121 stores a class code as improvement information. In this example, a class code for each pixel of an image of high image quality obtained by improving the image quality of the broadcast image data is transmitted as improvement information from the transmitting device 1. The class code as improvement information is supplied from the selecting unit 23 of the receiving device 3

(FIG. 4) to the quality improving unit 24 (FIG. 17), and the class code storage unit 121 stores the class code as improvement information. Under the control of the control circuit 57, the class code storage unit 121 supplies the stored class code as an address to a memory 122.

The memory 122 stores the prediction coefficient for each class found in the learning device of FIG. 16. The memory 122 reads out a prediction coefficient corresponding to the class code provided as an address from the class code storage unit 121, and supplies the prediction coefficient to the predictive operation circuit 56.

The quality improvement processing for improving the image quality of a broadcast image, carried out by the quality improving unit 24 of FIG. 17, will now be described with reference to the flowchart of FIG. 18.

In the receiving device 3 (FIG. 4), when broadcast image data of each unit of improvement information generation is supplied from the extracting unit 22 to the quality improving unit 24, one type (one set) of improvement information selected from a plurality of improvement information on the basis of the image quality level signal is supplied from the selecting unit 23 to the quality improving unit 24, together with the system selecting signal indicating the improvement system for improving the image quality by using the improvement information.

At step S131, the broadcast image data supplied from the extracting unit 22 is stored into the frame memory 51 by each unit of improvement information generation. Also at step S131, the improvement information supplied from the selecting unit 23 is stored into the memory 121. Moreover, at step S131, the control circuit 57 is supplied with the system selecting signal from the selecting unit 23 and supplies a control signal for designating the improvement of the image quality of the broadcast image data by the improvement system corresponding to the system selecting signal, to the prediction tap constructing circuit 52. Thus, the prediction tap constructing circuit 52 is set to carry out the processing in accordance with the improvement system indicated by the control signal from the control circuit 57.

In the present embodiment, the improvement information stored in the memory 122 is a class code except for the case where the system selecting signal supplied to the control circuit 57 indicates linear interpolation.

If the system selecting signal supplied to the control circuit 57 indicates linear interpolation, the control circuit 57 supplies a control signal designating linear interpolation of the broadcast image data stored in the frame memory 51, to the predictive operation circuit 56. In this case, the predictive operation circuit 56 reads out the broadcast image data stored in the frame memory 51 via the prediction tap constructing circuit 52, then carries out linear interpolation, and outputs the resultant broadcast image data. In this case, the processing of step S132 and the subsequent steps is not carried out.

After the processing of step S131, the processing goes to step S132. Of the pixels constituting an image of high image quality obtained by improving the broadcast image data stored in the frame memory 51, one of the pixels that have not yet been target pixels is used as a target pixel, and the prediction tap constructing circuit 52 constructs a prediction tap for the target pixel, of a structure conforming to the control signal from the control circuit 57, by using the pixels of the broadcast image data stored in the frame memory 51. The prediction tap is supplied to the predictive operation circuit 56.

Then, at step S133, the control circuit 57 controls the class code storage unit 121 to read out the class code as the improvement information for the target pixel. Thus, the class code as the improvement information for the target pixel is read out from the class code storage unit 121 and is supplied to the memory 122.

At step S134, the memory 122 reads out the prediction coefficient stored at the address indicated by the class code from the class code storage unit 121 and supplies the read-out prediction coefficient to the predictive operation circuit 56.

At step S135, the predictive operation circuit 56 carries out linear predictive operation expressed by the equation (1) using the prediction tap supplied from the prediction tap constructing circuit 52 and the prediction coefficient supplied from the memory 55, and temporarily stores a resultant pixel value as a prediction value of the target pixel.

Then, at step S136, the control circuit 57 discriminates whether or not prediction values have been found for all the pixels constituting the frame of the image of high image quality corresponding to the frame of the broadcast image data stored in the frame memory 51, as target pixels. If it is determined at step S136 that prediction values have not yet been found for all the pixels constituting the frame of the image of high image quality as target pixels, the processing returns to step S132. Of the pixels constituting the frame of the image of high image quality, pixels that have not yet been target pixels are newly used as target pixels, and similar processing is repeated.

On the other hand, if it is determined at step S136 that prediction values have been found for all the pixels constituting the frame of the image of high image quality as target pixels, the processing goes to step S137 and the predictive operation circuit 56 sequentially outputs an image of high image quality made up of the already found prediction values to the display unit 25 (FIG. 4). Then, the processing ends.

Figure 18:
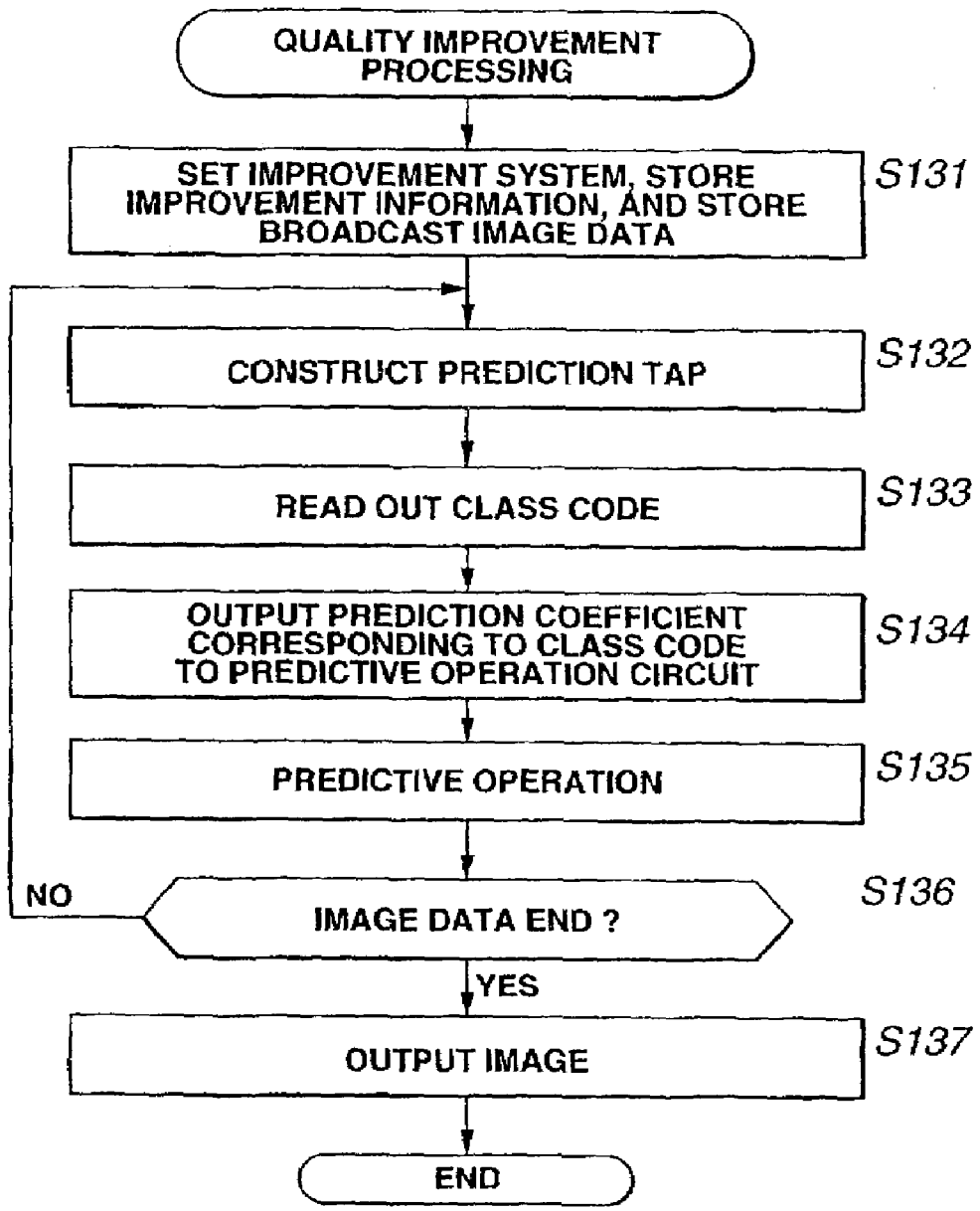
FIG. 18 is a flowchart for explaining the processing by the quality improving unit 24 of FIG. 17.

The quality improvement processing of FIG. 18 is repeated every time broadcast image data for a unit of improvement information generation is supplied to the frame memory 51.

In the embodiments of FIGS. 14 and 17, the prediction coefficients commonly stored in the memory 101 of FIG. 14 and the memory 122 of FIG. 17 are obtained by constructing and classifying a class tap using an SD image in the learning device of FIG. 16. However, the prediction coefficients commonly stored in the memories 101 and 122 can also be obtained by constructing and classifying a class tap using an HD image instead of an SD image. In this case, the improvement information generating unit 11 can obtain a class code as improvement information without finding the prediction value of the target pixel by using the prediction coefficient of each class as described above. That is, in this case, the improvement information generating unit 11 may construct and classify a class tap using an HD image for each pixel constituting the HD image and may use the resultant class code as improvement information.

Figure 19:
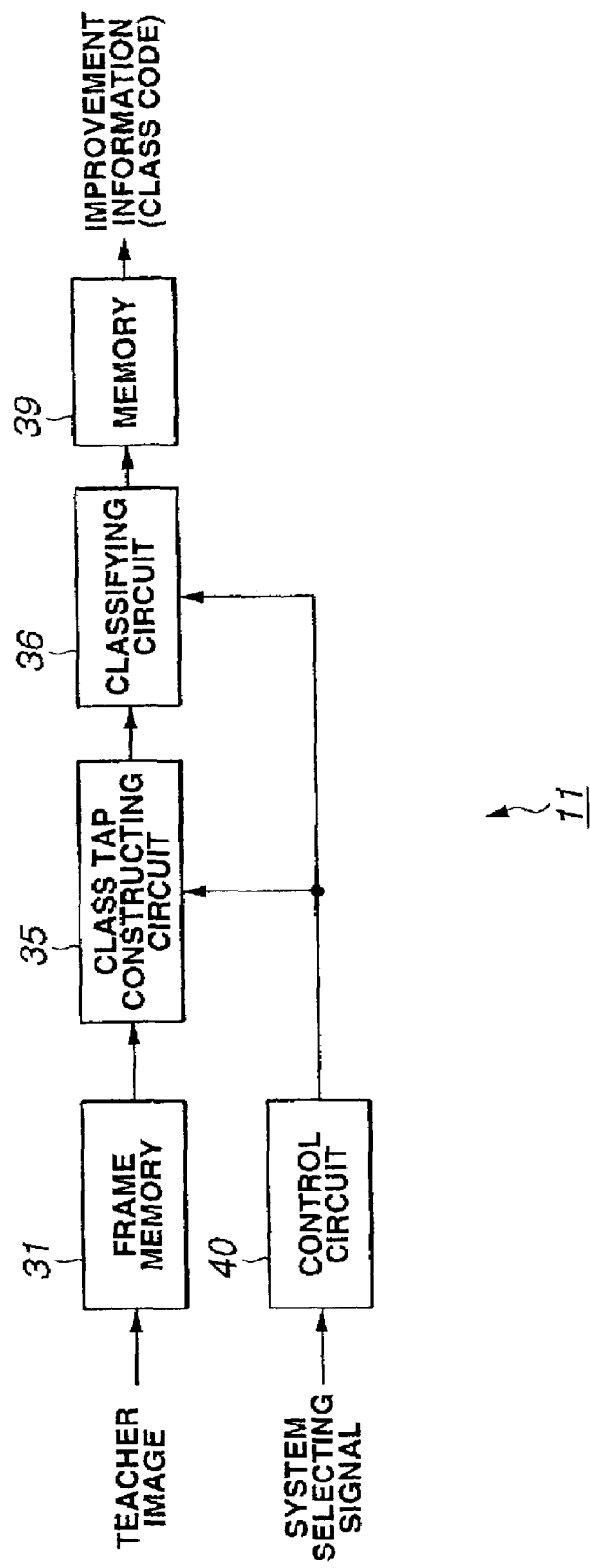
FIG. 19 is a block diagram showing a fourth exemplary structure of the improvement information generating unit 11.

Thus, FIG. 19 shows an exemplary structure of the improvement information generating unit 11 for finding a class code as improvement information by constructing and classifying a class tap from an HD image (teacher image). In FIG. 19, portions corresponding to those in FIG. 6 are denoted by the same numerals and will not be described further in detail. Specifically, the improvement information generating unit 11 of FIG. 19 is constituted similarly to the improvement information generating unit 11 of FIG. 6, except that the down converter 32, the frame memory 33, the prediction tap constructing circuit 34, the normal equation adder 37 and the prediction coefficient determining circuit 38 are not provided.

The improvement information generation processing for generating improvement information, carried out by the improvement information generating unit 11 of FIG. 19, will now be described with reference to the flowchart of FIG. 20.

First, at step S141, a teacher image corresponding to a unit of improvement information generation is stored in the frame memory 31. Then, at step S142, the control circuit 40 supplies a control signal for carrying out designation so that improvement information used for an improvement system corresponding to a system selecting signal supplied thereto is obtained, to the class tap constructing circuit 35 and the classifying circuit 36. Thus, the class tap constructing circuit 35 and the classifying circuit 36 are set to carry out the processing to obtain a class code as the improvement information used for the improvement system in accordance with the control signal.

The system selecting signal supplied to the control circuit 40 includes information indicating a plurality of improvement systems, similarly to the above-described case. The control circuit 40 sequentially outputs a control signal corresponding to the plurality of improvement systems every time the processing of step S142 is carried out.

If the control signal outputted from the control circuit 40 indicates linear interpolation, information that linear interpolation is designated is stored into the memory 39 as the improvement information. The processing of steps S143 to S145 is skipped and the processing goes to step S146.

After the processing of step S142, the processing goes to step S143. A teacher pixel that has not yet been a target pixel, of the teacher pixels stored in the frame memory 31, is used as a target pixel, and the class tap constructing circuit 35 constructs a class tap for the target pixel of the structure conforming to the control signal from the control circuit 40, by using the teacher pixel stored in the frame memory 31. The class tap is supplied to the classifying circuit 36.

At step S144, the classifying circuit 36 classifies the target pixel by the method conforming to the control signal from the control circuit 40 on the basis of the class tap from the class tap constructing circuit 35, and supplies and stores a class code corresponding to a class obtained as a result of classification into the memory 39. Then, the processing goes to step S145.

At step S145, the control circuit 40 discriminates whether or not classification has been carried out using all the teacher pixels of the unit of improvement information generation stored in the frame memory 31 as target pixels. If it is determined that classification has not yet been carried out using all the teacher pixels as target pixels, the processing returns to step S143. In this case, one of the teacher pixels that have not yet been target pixels is used as a new target pixel and the processing of steps S144 and S145 is repeated.

If it is determined by the control circuit 40 at step S145 that classification has been carried out using all the teacher pixels of the unit of improvement information generation as target pixels, the processing goes to step S146 and the control circuit 40 discriminates whether or not improvement information has been obtained for all of the plurality of improvement systems included in the system selecting signal supplied thereto.

If it is determined at step S146 that one or some of the plurality of types of improvement information used for the plurality of improvement systems included in the system selecting signal have not yet been obtained, the processing returns to step S142 and the control circuit 40 outputs a control signal corresponding to the improvement system for which improvement information has not yet been obtained. Then, the processing similar to the above-described processing is repeated.

On the other hand, if it is determined at step S146 that the class code as improvement information has been obtained for all of the plurality of improvement systems included in the system selecting signal, that is, if the class codes as the plurality of types of improvement information used for the plurality of improvement systems included in the system selecting signal are stored in the memory 39, the processing goes to step S147. The plurality of types of improvement information are read out from the memory 39 and are supplied to the integrating unit 12 (FIG. 2). Then, the processing ends.

Figure 20:
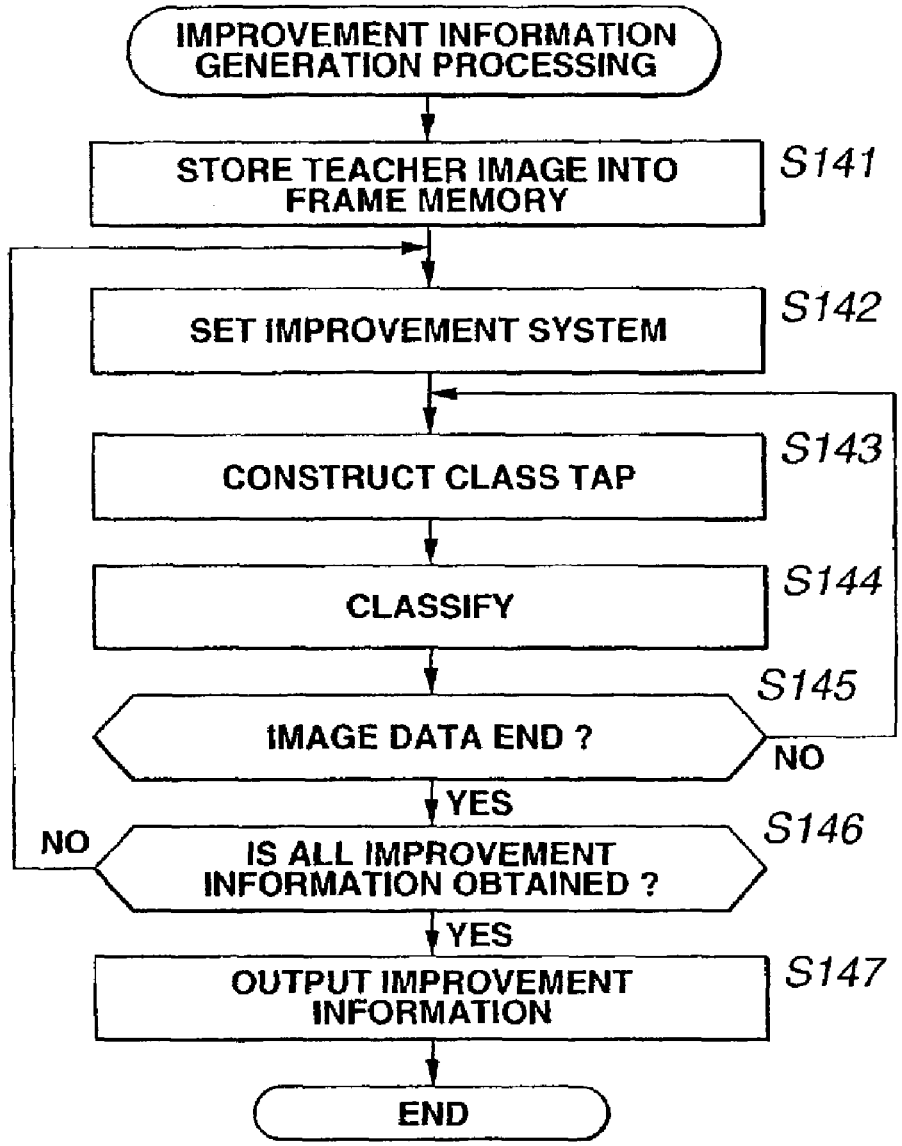
FIG. 20 is a flowchart for explaining the processing by the improvement information generating unit 11 of FIG. 19.

The improvement information generation processing of FIG. 20, too, is repeated every time the teacher image for a unit of improvement information generation is supplied to the frame memory 31.

Figure 21:
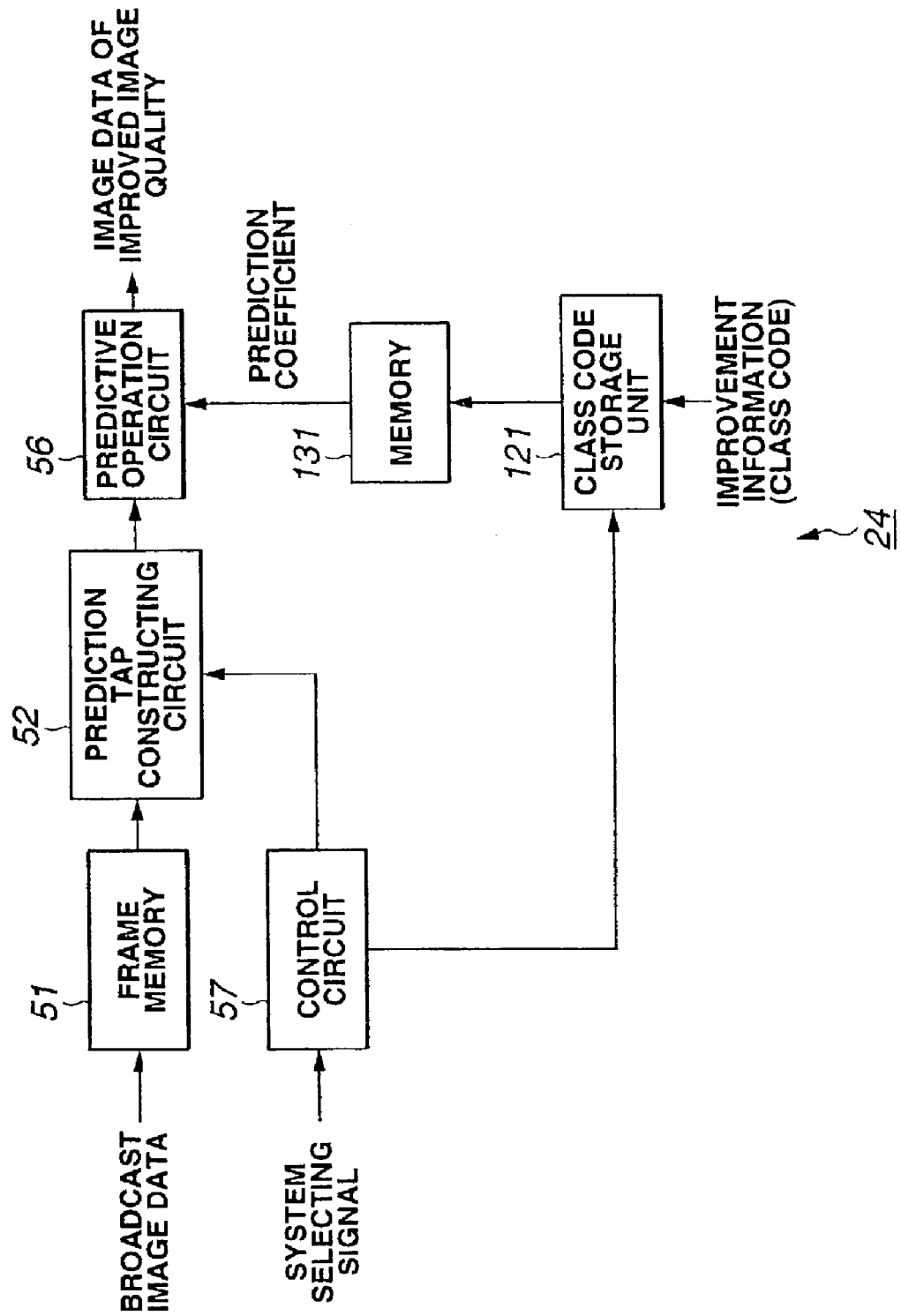
FIG. 21 is a block diagram showing a third exemplary structure of the quality improving unit 24.

FIG. 21 shows an exemplary structure of the quality improving unit 24 of the receiving device 3 (FIG. 4) in the case where the improvement information generating unit 11 is constituted as shown in FIG. 19. In FIG. 21, portions corresponding to those in FIG. 17 are denoted by the same numerals and will not be described further in detail. That is, the quality improving unit 24 is constituted similarly to the quality improving unit 24 of FIG. 17 except that a memory 131 is provided in place of the memory 122.

In the embodiment of FIG. 17, a prediction coefficient for each class obtained by carrying out learning in which classification is carried out using a class tap made up of learner pixels in the learning device of FIG. 16 is stored in the memory 122. In the embodiment of FIG. 21, however, a prediction coefficient for each class obtained by carrying out learning in which classification is carried out using a class tap made up of teacher pixels is stored in the memory 131.

Figure 22:
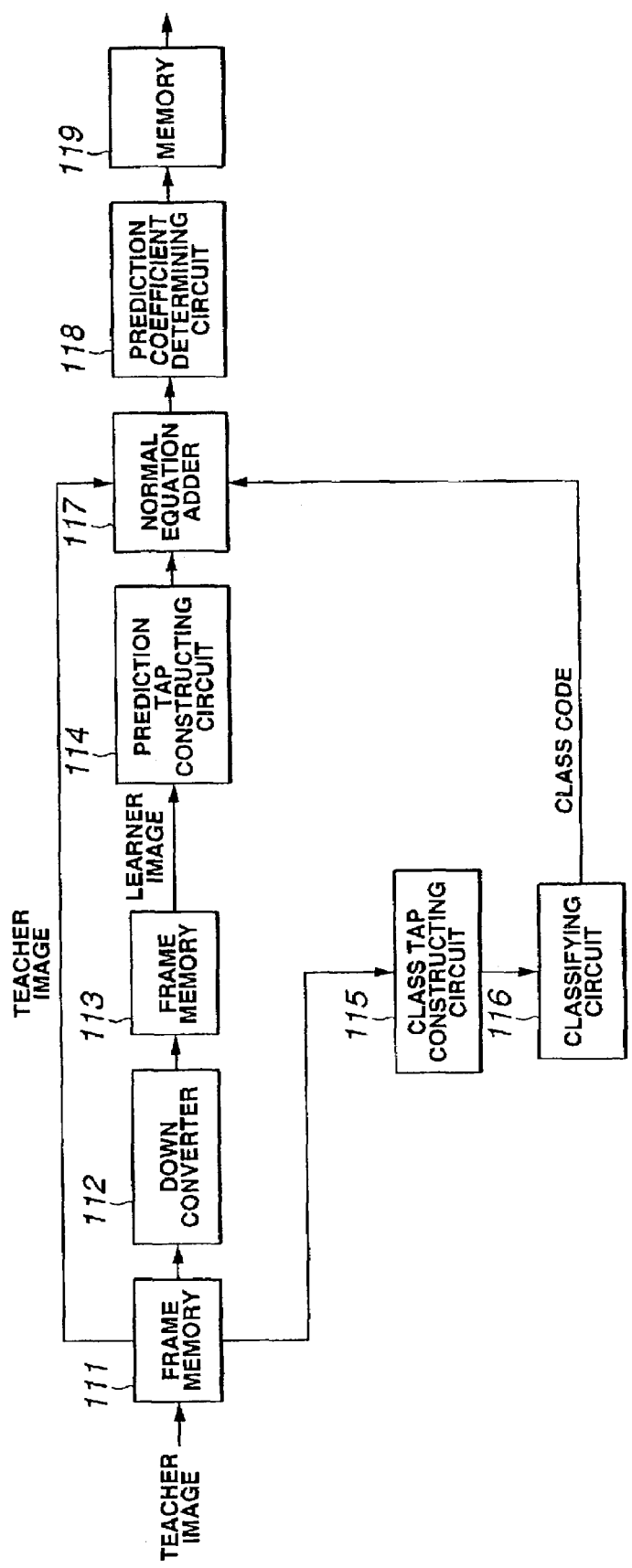
FIG. 22 is a block diagram showing a second exemplary structure of the learning device for finding a prediction coefficient.

FIG. 22 shows an exemplary structure of an embodiment of the learning device for carrying out learning in which classification is carried out using a class tap made up of teacher pixels. In FIG. 22, portions corresponding to those in FIG. 16 are denoted by the same numerals and will not be described further in detail. That is, basically, the learning device of FIG. 22 is constituted similarly to the learning device of FIG. 16.

In the learning device of FIG. 22, the class tap constructing circuit 115 constructs a class tap using a teacher image stored in the frame memory 111, instead of a learner image stored in the frame memory 113. The class tap constructing circuit 115 constructs the same class tap as the class tap constructed by the class tap constructing circuit 35 of the improvement information generating unit 11 of FIG. 19.

As described above, the image quality can be improved in response to the request from the user also in the case where a class code is used as improvement information. Therefore, in this case, too, an image of the image quality meeting the request of the user can be provided and more detailed accounting can be carried out in accordance with the image quality of the image provided for the user.

In the case where a class code is used as improvement information, as described above, it is possible to cope with the absence of image data of high image quality having the same contents as broadcast image data, similarly to the case where a prediction coefficient is used as improvement information.

Broadcast image data and improvement information can be integrated to form an integrated signal, for example, by time-division multiplexing or frequency multiplexing, as described above. An integrated signal can also be formed by embedding improvement information into broadcast image data.

Thus, an embedding method for embedding improvement information into broadcast image data, and a decoding method for decoding the improvement information embedded by the embedding method, will now be described.

In general, what is called information has the bias (universality) of energy (entropy). This bias is recognized as information (valuable information). For example, an image obtained by shooting a certain scene is recognized as it is by a person because the image (pixel values of pixels constituting the image) has the bias of energy corresponding that scene. An image having no bias of energy is only noise or the like and is useless as information.

Therefore, even in the case where the original bias of energy proper to valuable information is broken by manipulating the information in a certain way, the original information can be restored from the manipulated information by restoring the original bias of energy from the broken bias of energy. That is, manipulation result data obtained by manipulating the information can be decoded to the original valuable information by using the original bias of energy proper to that information.

The energy (bias of energy) proper to the information can be expressed, for example, by correlativity.

The correlativity of information means the correlation (for example, auto-correlation and distance between one constituent element and another constituent element) between constituent elements of the information (for example, in the case of an image, pixels and lines constituting the image). The correlativity of an image can be expressed, for example, by the correlation between lines of the image. As a correlation value expressing the correlation, the square sum of differences of corresponding pixel values in two lines can be used. (In this case, a smaller correlation value indicates larger correlation between lines, and a larger correlation value indicates smaller correlation between lines.)

Specifically, with respect to an image, the correlation between the top line (first line) and another line is generally larger when the distance between the first line and another line is shorter, and the correlation is smaller when the distance between the first line and another line is longer. Therefore, the bias of correlation exists such that the correlation is larger for a line closer to the first line and that the correlation is smaller for a line farther from the first line.

It is now considered that the operation to switch the pixel values of the M-th line, which is relatively close to the first line, and the N-th line, which is relatively far from the first line, is carried out (1<M<N), and the correlation between the first line and the other lines is calculated with respect to the image after the switching. The correlation between the first line and the M-th line (N-th line before the switching), which is closer to the first line, becomes small, and the correlation between the first line and the N-th line (M-th line before the switching), which is farther from the first line, becomes larger.

Thus, in the image after the switching, the bias of correlativity such that the correlation is larger for a line closer to the first line and that the correlation is smaller for a line farther from the first line is broken. However, with respect to an image, the bias of correlativity can be restored from the broken bias of correlativity by generally using the bias of correlativity such that the correlation is larger for a line closer to the first line and that the correlation is smaller for a line farther from the first line. That is, the bias of correlativity in the image after the switching, such that the correlation with the M-th line, which is closer to the first line, is small and that the correlation with the N-th line, which is farther from the first line, is large, is obviously unnatural (abnormal). The M-th line and the N-th line should be switched. By switching the M-th line and the N-th line in the image after the switching, the image having the original bias of correlativity, that is, the original image can be restored.

In this case, the lines of the image to be shifted or switched are determined in accordance with improvement information, and the improvement information is embedded into the image by such shifting and switching of the. By switching the lines to the original positions using the correlation in the image having the improvement information embedded therein, that is, the image in which the lines are switched, and by thus restoring the original image, the image and the improvement information are decoded. That is, by detecting the shifted lines and the switched lines when restoring the original image, the improvement information is decoded.

Similarly to the decoding by using the bias of energy of an image as described above, in the case where improvement information is embedded in an image, the image having the improvement information embedded therein can be decoded to the original image and improvement information without having an overhead for decoding, by using the bias of energy proper to the original image.

An image obtained by embedding improvement information into an image (hereinafter suitably referred to as an embedded image) is a different image from the original image and is not an image that can be recognized as valuable information by a person. Therefore, encryption of the original image can be realized without having an overhead.

Figure 23:
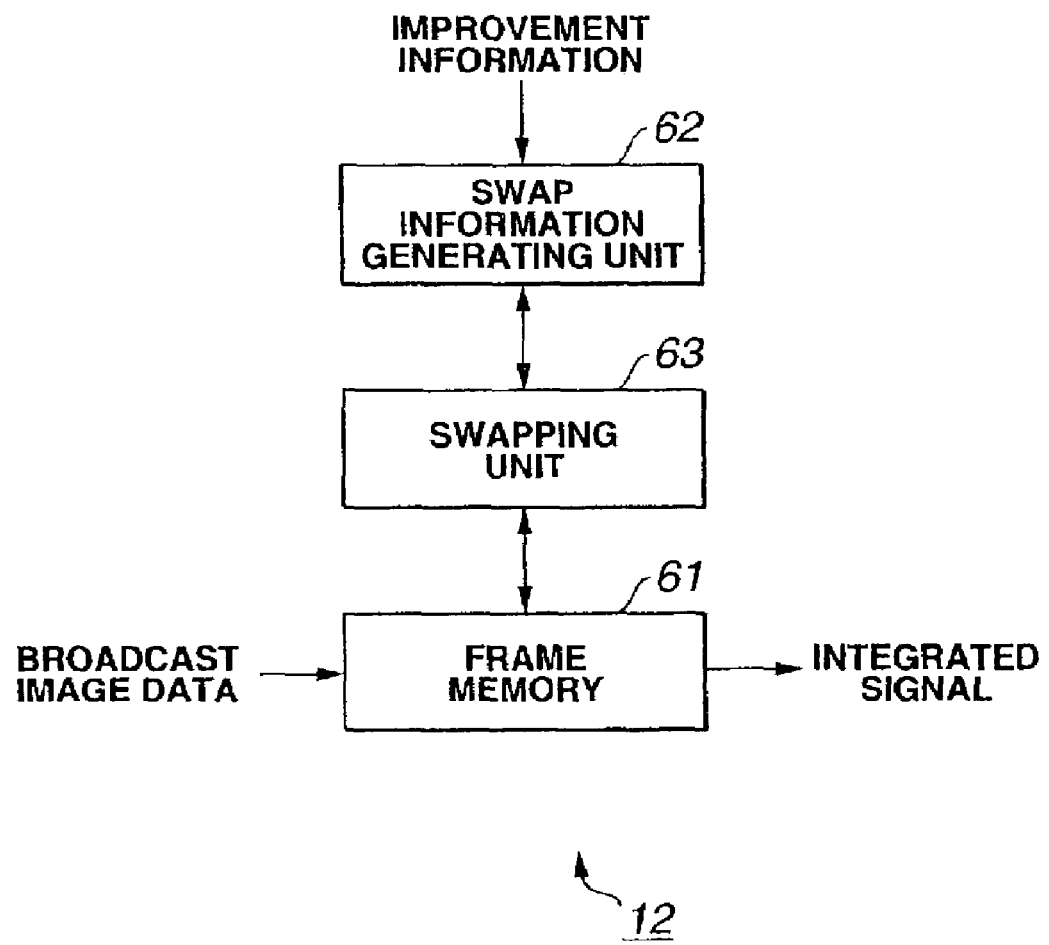
FIG. 23 is a block diagram showing an exemplary structure of an integrating unit 12.

FIG. 23 shows an exemplary structure of the integrating unit 12 of FIG. 2, which generates an integrated signal by embedding improvement information into broadcast image data as described above.

A frame memory 61 stores the broadcast image data, for example, by each frame. The frame memory 61 is constituted by a plurality of banks and can simultaneously carry out storage of the broadcast image data supplied thereto, switching of columns as will be described later, and reading of data from the frame memory 61, by switching the banks.

A swap information generating unit 62 is supplied with improvement information from the improvement information generating unit 11 (FIG. 2) and generates swap information indicating how the positions of respective columns of one frame of image (broadcast image data) stored in the frame memory 61 should be switched, on the basis of the improvement information. Specifically, in the case where one frame of image stored in the frame memory 61 is constituted by pixels in M rows and N columns, when the n-th column (n-th column from left) of the image is to be switched to the n'-th column, the swap information generating unit 62 generates swap information which associates n with n' (n and n' are integers not smaller than 1 and not larger than N.)

In the case where the number of columns in one frame of image is N, there are N! patterns (! expressing factorial) of switching methods if all the columns are used as targets of switching. Therefore, in this case, it is possible embed log 2(N!) bits of improvement information into one frame at the maximum.

The swap information generated by the swap information generating unit 62 is supplied to a swapping unit 63. The swapping unit 63 switches the positions of the respective columns in one frame of image stored in the frame memory 61 in accordance with the swap information supplied from the swap information generating unit 62. Thus, the improvement information is embedded into the broadcast image data stored in the frame memory 61.

Figure 24:
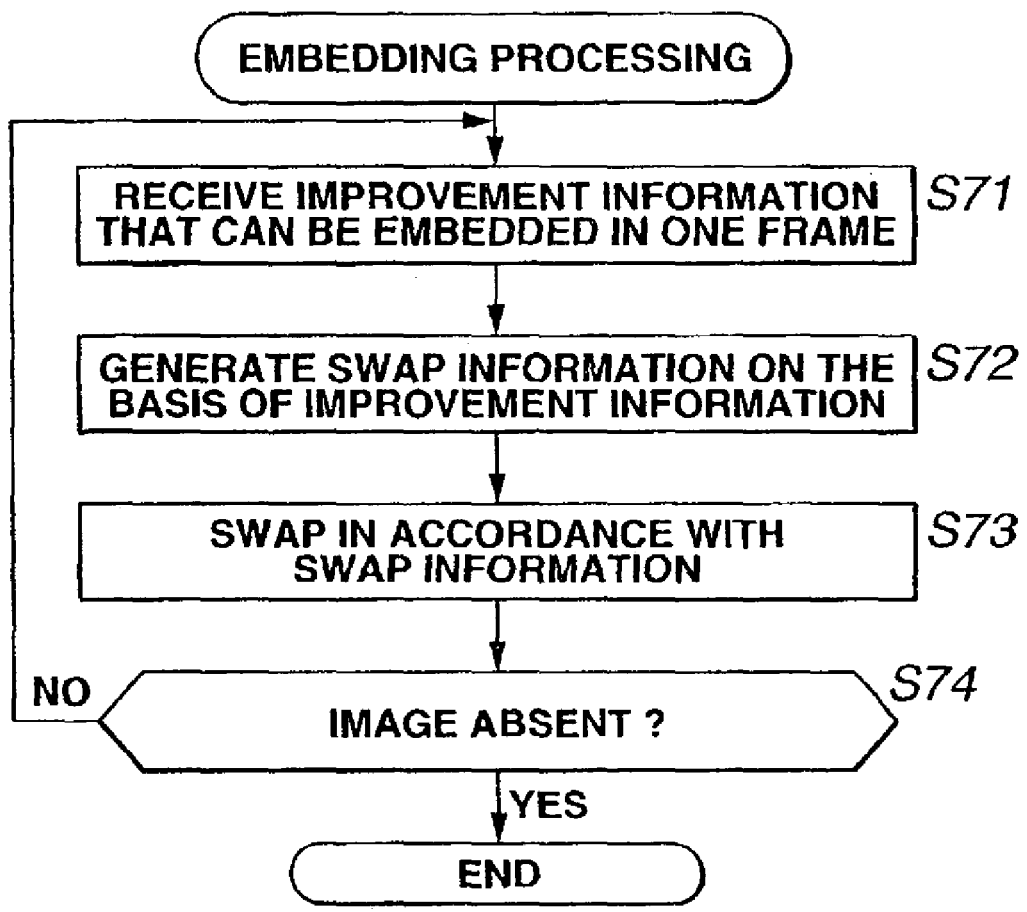
FIG. 24 is a flowchart for explaining the processing by the integrating unit 12 of FIG. 23.

The embedding processing carried out by the integrating unit 12 of FIG. 23 will now be described with reference to the flowchart of FIG. 24.

The broadcast image data is supplied to the frame memory 61 and the broadcast image data is sequentially stored in the frame memory 61.

At step S71, the swap information generating unit 62 is supplied with improvement information of a data quality that can be embedded in one frame of image (broadcast image data), from the improvement information generating unit 11. For example, if the number of columns in one frame of broadcast image data is N and all the columns are used as targets of switching, as described above, log 2(N!) bits of improvement information at the maximum can be embedded and therefore improvement information of such a number of bits (or less) is supplied.

Then, at step S72, the swap information generating unit 62 generates swap information on the basis of the improvement information supplied at step S71. Specifically, the swap information generating unit 62 generates swap information indicating which columns should be switched with the second to N-th columns except for the first column, of the first to N-th columns in the frame as a target of embedding processing (hereinafter suitably referred to as a processing target frame) stored in the frame memory 61, on the basis of the improvement information. This swap information is supplied to the swapping unit 63.

When the swap information is supplied to the swapping unit 63 from the swap information generating unit 62, the processing goes to step S73 and the swapping unit 63 switches the positions of the respective columns in the processing target frame stored in the frame memory 61, in accordance with the swap information. Thus, the improvement information is embedded in the processing target frame and the broadcast image data (embedded image) having the improvement information thus embedded therein is read out from the frame memory 61 and supplied to the transmitting unit 13 (FIG. 2) as an integrated signal.

The switching of the position of the respective columns in the frame can be carries out by changing the storage positions of the image data (pixels constituting the image data) in the frame memory 61. However, the frame in which the positions of the columns are switched may be read out from the frame memory 61 by controlling the address when reading out the frame from the frame memory 61.

In the present embodiment, the swap information includes the information indicating which columns should be switched with the second to N-th columns, as described above, but does not include which column should be switched with the first column. Therefore, the swapping unit 63 carries out the switching of the second to N-th columns but does not carry out the switching of the first column. The reason for this will be described later.

On completion of the switching of all the second to N-th columns in the processing target frame, the processing goes to step S74 and whether or not a frame of broadcast image data that has not yet been a processing target frame is stored in the frame memory 61 is discriminated. If it is determined that such a frame is stored, the processing returns to step S71 and similar processing is repeated by using the frame that has not yet been a target processing frame, as a new processing target frame.

If it is determined at step S74 that no frame that has not yet been a processing target frame is stored in the frame memory 61, the embedding processing ends.

In accordance with the embedding processing as described above, one frame of image (in this case, broadcast image data) is caused to be an integrated signal as the following embedded image.

Specifically, it is now assumed that improvement information corresponds to a processing target frame having N columns (as shown in FIG. 25A) such that the second column is to be switched to the sixth column (FIG. 25B), the third column is to be switched to the ninth column (FIG. 25C), the fourth column is to be switched to the seventh column (FIG. 25D), the fifth column is to be switched to the third column (FIG. 25E), the sixth column is to be switched to the eighth column (FIG. 25F), the seventh column is to be switched to the fourth column (FIG. 25G), the eighth column is to be switched to the fifth column (FIG. 25H), the ninth column is to be switched to the second column (FIG. 25I), . . . , and the N-th column is to be switched to the N-th column. Then, swap information indicating such switching is generated by the swap information generating unit 62. The swapping unit 63 switches the second column to the sixth column, the third column to the ninth column, the fourth column to the seventh column, the fifth column to the third column, the sixth column to the eighth column, the seventh column to the fourth column, the eighth column to the fifth column, the ninth column to the second column, . . . , and the N-th column to the N-th column in a frame as shown in FIG. 25J, in accordance with the above-described swap information. As a result, the image of FIG. 25J is caused to be an embedded image as shown in FIG. 25K.

In this manner, in the case where improvement information is embedded in the respective columns by switching the positions of pixels of the respective columns as a set of one or more pixels constituting an image stored in the frame memory 61 in accordance with the improvement information, the original image can be decoded by carrying out reverse switching, and what switching is carried out becomes the improvement information. Therefore, the improvement information can be embedded into the image while minimizing deterioration in the image quality of the image and without increasing the data quantity.

In an image in which the positions of the columns are switched, which is an image having the improvement information embedded therein, the respective columns can be switched to the original positions without having an overhead, by using the correlativity of the image, that is, the correlation with the columns situated at correct positions as in the original image. Moreover, the improvement information can be decoded in accordance with the switching method. Therefore, basically, the deterioration in the image quality due to the embedding of the improvement information does not occur in a resultant decoded image (reproduced image).

If there is no column situated at a correct position in the embedded image, it is difficult to decode the image and the improvement information by using the correlativity of the image as described above. Thus, switching of the first column in each frame is not carried out in the embedding processing of FIG. 24.

However, it is also possible to carry out embedding, using all the columns including the first column as targets of switching. In this case, at least one or more original positions of the columns after the switching are included as an overhead in an integrated signal as an embedded image. Thus, it is easily made possible to decode the image and the improvement information.

Improvement information can also be embedded into an image by sequentially switching the columns, or can also be embedded into an image by switching all the columns at a time. That is, improvement information can be embedded into an image by repeating such an operation to switch one column on the basis of the improvement information and then switch the next column on the basis of the next improvement information. Alternatively, improvement information can be embedded into an image by determining the switching pattern of all the columns on the basis of the improvement information and carrying out such switching at a time.

Figure 26:
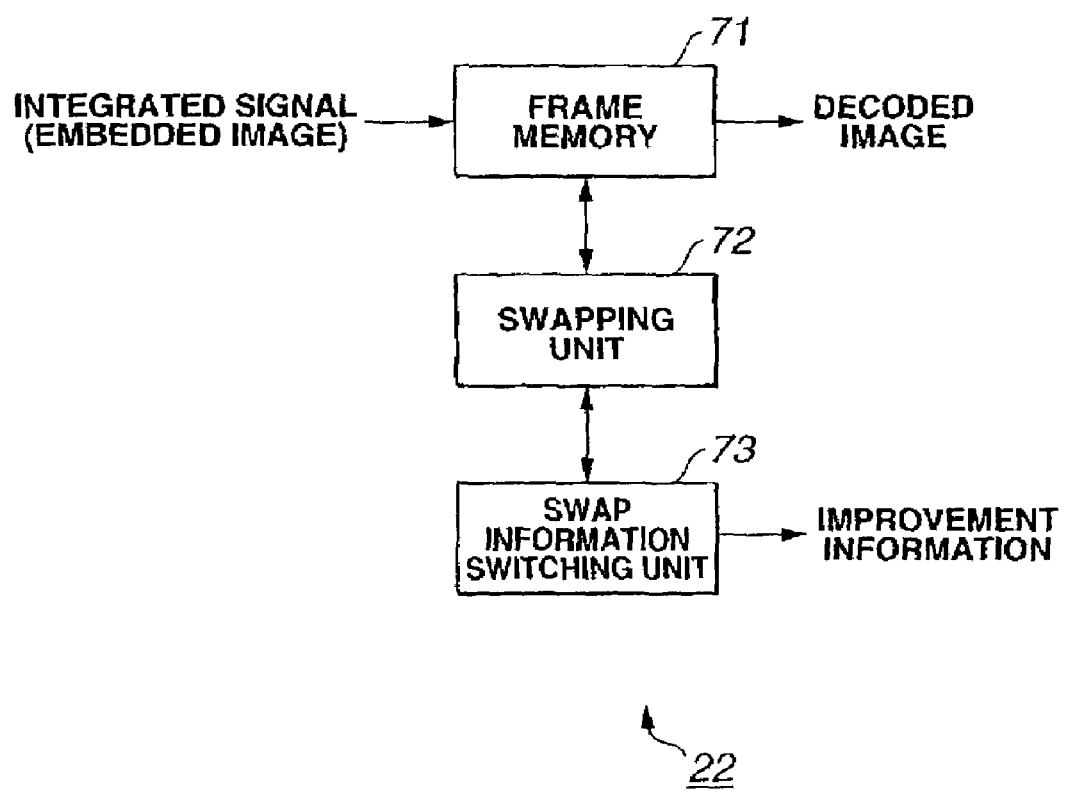
FIG. 26 is a block diagram showing an exemplary structure of an extracting unit 22.

FIG. 26 shows an exemplary structure of the extracting unit 22 of the receiving device 3 (FIG. 4) in the case where the integrating unit 12 of the transmitting device 1 (FIG. 2) is constituted as shown in FIG. 23.

A frame memory 71 is constituted similarly to the frame memory 61 of FIG. 23 and sequentially stores an embedded image as an integrated signal outputted from the receiving unit 21 (FIG. 4), for example, by each frame.

A swapping unit 72 calculates the correlation between the latest column that has already been switched to the original position and another column (that has not yet been returned to the original position) in a frame as a processing target (processing target frame) of the embedded image stored in the frame memory 71. On the basis of the correlation, the swapping unit 72 restores the original position of the column (or decodes the position of the column) by switching the position of the column that has not yet been returned to the original position in the processing target frame. Moreover, the swapping unit 72 supplies swap information indicating how the respective columns in the frame have been switched, to a swap information converting unit 73.

The swap information converting unit 73 decodes improvement information embedded in the embedded image on the basis of the swap information from the swapping unit 72, that is, the corresponding relation between the position before switching and the position after switching of the respective columns in the processing target frame.

The decoding processing for decoding an embedded image to extract original broadcast image data and improvement information, carried out by the extracting unit 22 of FIG. 26, will now be described with reference to the flowchart of FIG. 27.

The frame memory 71 sequentially stores an embedded image (coded data) supplied thereto, for example, by each frame.

At step S81, the swapping unit 72 sets an initial value of, for example, 1, for a variable n for counting the number of columns in the frame. The processing goes to step S82 and the swapping unit 72 discriminates whether or not the variable n is equal to or less than N−1, which is obtained by subtracting 1 from the number of columns N in the frame.

If it is determined at step S82 that the variable n is equal to or less than N−1, the processing goes to step S83. The swapping unit 72 reads out the pixels (pixel array) of the n-th column from the processing target frame stored in the frame memory 71 and generates a vector (hereinafter suitably referred to as a column vector) vn by arranging the respective pixels (pixel values thereof) of the n-th column as its elements. In this embodiment, since the frame is made up of pixels of M columns as described above, the column vector vn (similar to a column vector vk, which will be described later) is an M-dimensional vector.

After that, at step S84, the swapping unit 72 sets an initial value of n+1 for a variable k for counting the columns situated on the right side from the n-th column. Th processing goes to step S85 and the swapping unit 72 reads out the pixels of the k-th column and generates a column vector vk having the pixels of the k-th column as its elements. Then, the processing goes to step S86.

At step S86, the swapping unit 72 finds the correlation between the n-th column and the k-th column by using the column vectors vn and vk.

Specifically, the swapping unit 72 calculates the distance d(n,k) between the column vectors vn and vk in accordance with the following equation.

$$d(n, k) = |vn - vk| \qquad (8)$$

$$= \left(\sum (A(m, n) - A(m, k))2\right)\frac{1}{2}$$

In this equation, Σ expresses the summation in which m is changed from 1 to M. A(i,j) expresses a pixel (pixel value) of the i-th row and the j-th column in the processing target frame.

Then, the swapping unit 72 finds the reciprocal 1/d(n,k) of the distance d(n,k) between the column vectors vn and vk, as the correlation (correlation value expressing the correlation) between the n-th column and the k-th column.

After the correlation between the n-th column and the k-th column is calculated, the processing goes to step S87 and it is discriminated whether or not the variable k is equal to or less than N−1 obtained by subtracting 1 from N, which is the number of columns in the frame. If it is determined at step S87 that the variable k is equal to or less than N−1, the processing goes to step S88 and the variable k is incremented by one. Then, the processing returns to step S85 and the processing of steps S85 to S88 is repeated until it is determined at step S87 that the variable k is not equal to or less than N−1. Thus, the correlation between the n-th column and each of the columns of the embedded image situated on the right side from the n-th column is found.

After that, if it is determined at step S87 that the variable k is not equal to or less than N−1, the processing goes to step S89 and the swapping unit 72 finds k which maximizes the correlation with the n-th column. At step S90, where k which maximizes the correlation with the n-th column is expressed by K, the swapping unit 72 carries out swapping of the (n+1) th column and the K-th column in the processing target frame stored in the frame memory 71, that is, switches the K-th column to the (n+1)th column, which is rightward adjacent to the n-th column.

Then, at step S91, the variable n is incremented by one. The processing returns to step S82 and the processing of steps S82 to S91 is repeated until it is determined at step S82 that the variable n is not equal to or less than N−1.

In this embodiment, since the first column of the embedded image remains to be the first column of the original image, when the variable n is the initial value of 1, a column of the embedded image having the largest correlation with the first column is switched to the second column, which is rightward adjacent to the first column. The column having the largest correlation with the first column is basically the second column of the original image because of the correlativity of the image. Therefore, in this case, the second column of the original image switched to another column of the embedded image is returned (decoded) to the original position by the embedding processing.

When the variable n becomes 2, a column having the largest correlation with the second column switched to the original position in the above-described manner is switched to the third column, which is rightward adjacent to the second column. The column having the largest correlation with the second column is basically the third column of the original image because of the correlativity of the image, similarly to the above-described case. Therefore, in this case, the third column of the original image switched to another column of the embedded image is returned to the original position by the embedding processing.

Similarly, the embedded image stored in the frame memory 71 is decoded to the original image (broadcast image data).

If it is determined at step S82 that the variable n is not equal to or less than N−1, that is, if all the second to N-th columns constituting the embedded image are returned to the original positions by using the correlativity of the image and the embedded image stored in the frame memory 71 is thus decoded to the original image (broadcast image data), the processing goes to step S92 and the decoded image is read out from the frame memory 71. Moreover, at step S92, the swapping unit 72 outputs swap information indicating the way of switching the second to N-th columns of the embedded image when decoding the embedded image to the original image, to the swap information converting unit 73. On the basis of the swap information from the swapping unit 72, the swap information converting unit 73 decodes and outputs the improvement information embedded in the embedded image.

After that, the processing goes to step S93 and it is discriminated whether or not a frame of the embedded image that has not yet been a processing target is stored in the frame memory 71. If it is determined that such a frame is stored, the processing returns to step S81. The frame of the embedded image that has not yet been a processing target is used as a new processing target and similar processing is repeated.

If it is determined at step S93 that no frame of the embedded image that has not yet been a processing target is stored in the frame memory 71, the decoding processing ends.

In this manner, the embedded image, which is an image having improvement information embedded therein, is decoded to the original image and the improvement information by using the correlativity of the image. Thus, the embedded image can be decoded to the original image and the improvement information without having an overhead. Therefore, basically, the deterioration in the image quality due to the embedding of the improvement information does not occur in the decoded image.

Figure 27:
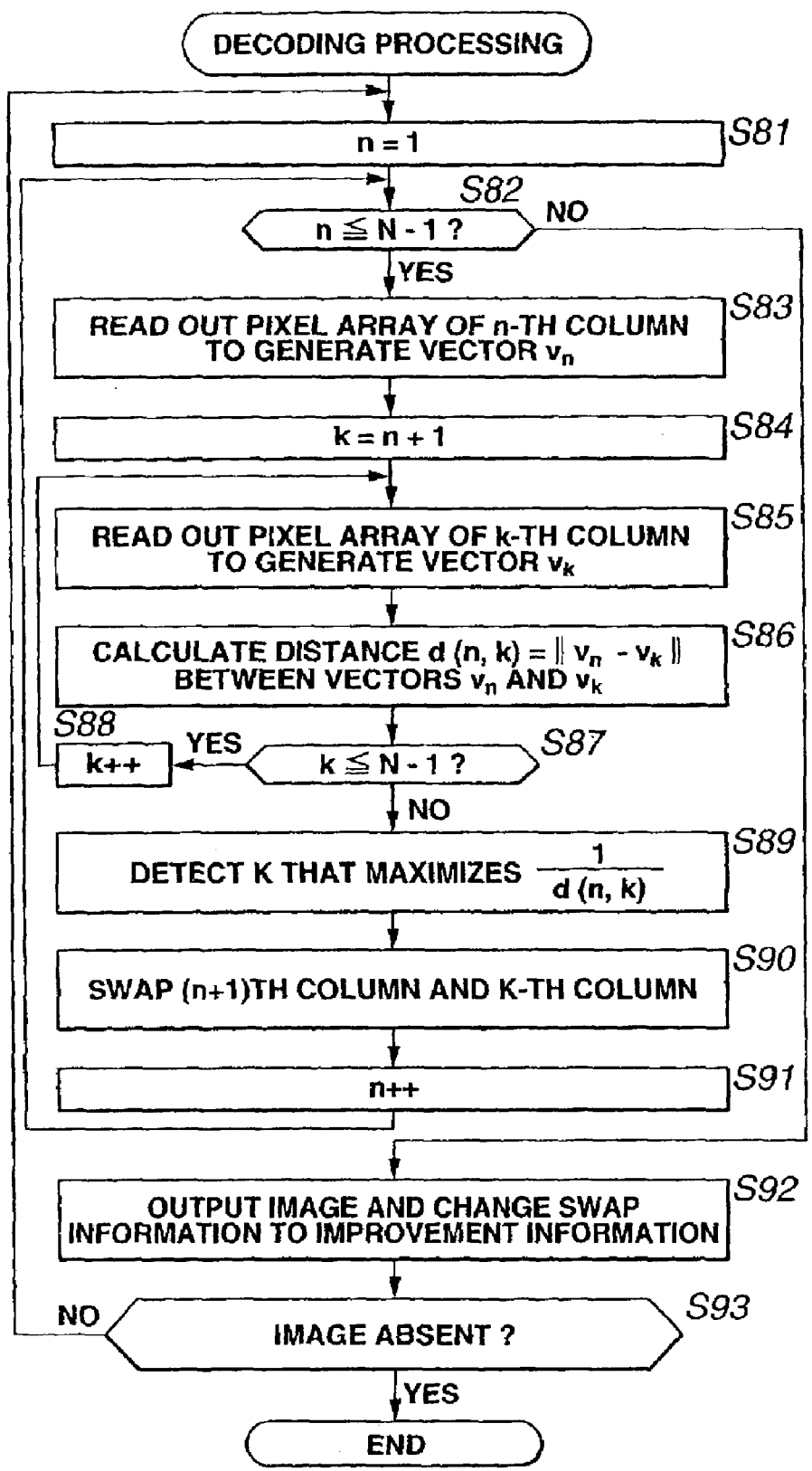
FIG. 27 is a flowchart for explaining the processing by the extracting unit 22 of FIG. 26.

In the decoding processing of FIG. 27, the correlation between the latest first column which has already been decoded (for example, in the case of n=1, the first column which has not been switched at the time of embedding) and a column which has not yet been decoded is found, and a column to be switched to the position rightward adjacent to the already decoded latest column is detected on the basis of the correlation. However, it is also possible to calculate the correlation between a plurality of columns which have already been decoded and a column which has not yet been decoded and thus detect a column to be switched to the already decoded latest column.

In the above-described case, the improvement information is embedded into the broadcast image data by switching the columns. However, the embedding can also be carried out by switching the rows, by switching the positions of pixel arrays situated at the same position, of a predetermined number of frames arrayed in the temporal direction, or by switching both the columns and the rows.

Moreover, the embedding can also be carried out by manipulating the pixel values on the basis of the improvement information or by rotating the horizontal lines or the like on the basis of the improvement information, instead of switching the columns or the like. In any of these cases, the original information can be restored by using the bias of energy.

The embedding method in which the original information can restored by using the bias of energy as described above is described in detail, for example, in the Japanese Patent Application No. H10-200093, Japanese Patent Application No. H10-222951, Japanese Patent Application No. H10-333700, Japanese Patent Application No. 11-129919, Japanese Patent Application No. H11-160529, Japanese Patent Application No. H11-160530, Japanese Patent Application No. H11-284198 (priority-claimed application based on the Japanese Patent Application No. 10-285310), Japanese Patent Application No. H11-284199 (priority-claimed application based on the Japanese Patent Application No. 10-285309), and Japanese Patent Application No. H11-284200 (priority-claimed application based on the Japanese Patent Application No. 10-285308) by the present applicant. The method described in these applications can be employed in the integrating unit 12 and the extracting unit 22.

As another embedding method for embedding improvement information into broadcast image data, spectrum spreading can also be employed.

Figure 28:
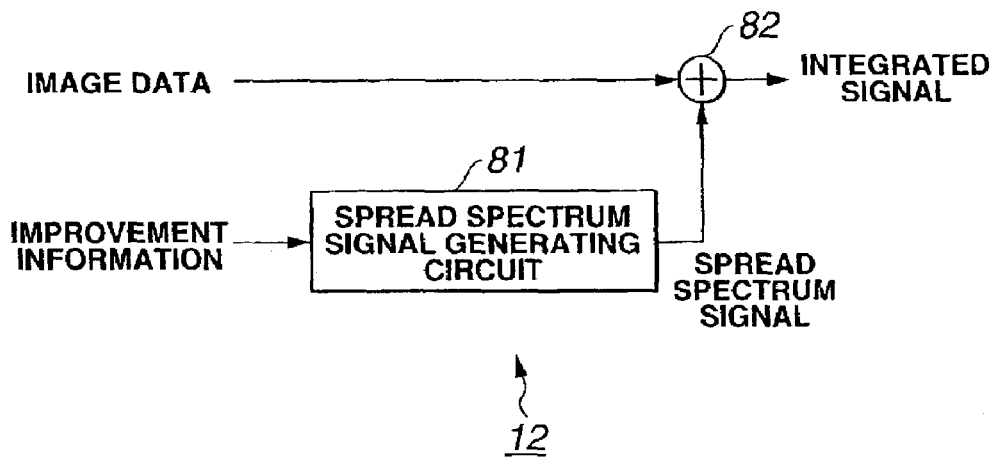
FIG. 28 is a block diagram showing another exemplary structure of the integrating unit 12.

FIG. 28 shows an exemplary structure of the integrating unit 12 of the transmitting device 1 (FIG. 2) in the case where improvement information is to be embedded into broadcast image data by using spectrum spreading.

Improvement information outputted from the improvement information generating unit 11 (FIG. 2) is supplied to a spread spectrum signal generating circuit 81. The spread spectrum signal generating circuit 81 sequentially generates, for example, a PN (pseudo random noise) code string of an M period sequence at predetermined timing. Then, the spread spectrum signal generating circuit 81 carries out spectrum spreading of the improvement information by the PN code string, thus obtains a spread spectrum signal, and supplies the spread spectrum signal to an adder 82.

The adder 82 is supplied with the broadcast image data as well as the spread spectrum signal from the spread spectrum signal generating circuit 81. The adder 82 superimposes the spread spectrum signal on the broadcast image data, thus obtains an integrated signal such that the improvement information is embedded in the broadcast image data, and outputs the integrated signal to the transmitting unit 13 (FIG. 2).

The broadcast image data and the spread spectrum signal can also be D/A (digital to analog) converted and then supplied to the adder 82.

Figure 29:
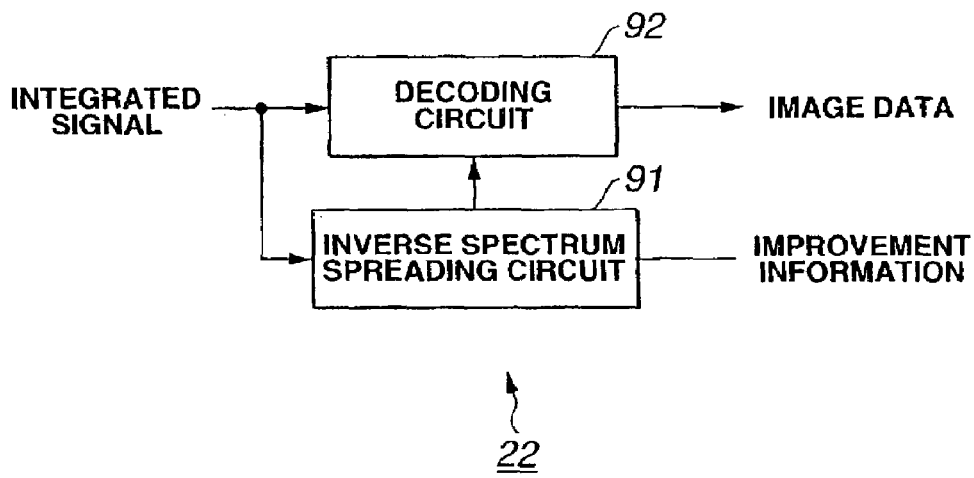
FIG. 29 is a block diagram showing another exemplary structure of the extracting unit 22.

FIG. 29 shows an exemplary structure of the extracting unit 22 of the receiving device 3 (FIG. 4) in the case where the integrating unit 12 of the transmitting device 1 (FIG. 2) is constituted as shown in FIG. 28.

An integrated signal outputted from the receiving unit 21 (FIG. 4) is supplied to an inverse spectrum spreading circuit 91 and a decoding circuit 92.

The inverse spectrum spreading circuit 91 generates a PN code string similar to the PN code string generated by the spread spectrum signal generating circuit 81 of FIG. 28 and carries out inverse spectrum spreading of the integrated signal on the basis of the PN code string, thus decoding improvement information. The decoded improvement information is supplied to the selecting unit 23 (FIG. 4).

Moreover, the inverse spectrum spreading circuit 91 supplies the generated PN code string to the decoding circuit 92.

On the basis of the PN code string from the inverse spectrum spreading circuit 91, the decoding circuit 92 removes a spread spectrum signal superimposed on the integrated signal, thus decoding broadcast image data. The decoded broadcast image data is supplied to the quality improving unit 24 (FIG. 4).

In FIG. 29, the extracting unit 22 can be constituted without providing the decoding circuit 92. In such a case, broadcast image data having a spectrum spread signal superimposed thereon is supplied to the quality improving unit 24.

The embedding method in which the original information can be restored by using the bias of energy and the embedding method using spectrum spreading are described above. For embedding improvement information into broadcast image data, it is also possible to use a conventional watermark.

Specifically, improvement information can be embedded into broadcast image data, for example, by changing (switching) lower one bit or two bits of pixels constituting the broadcast image data.

The above-described series of processing can be carried out by hardware or by software. In the case where the series of processing is to be carried out by software, a program constituting the software is installed in a general-purpose computer or the like.

Figure 30:
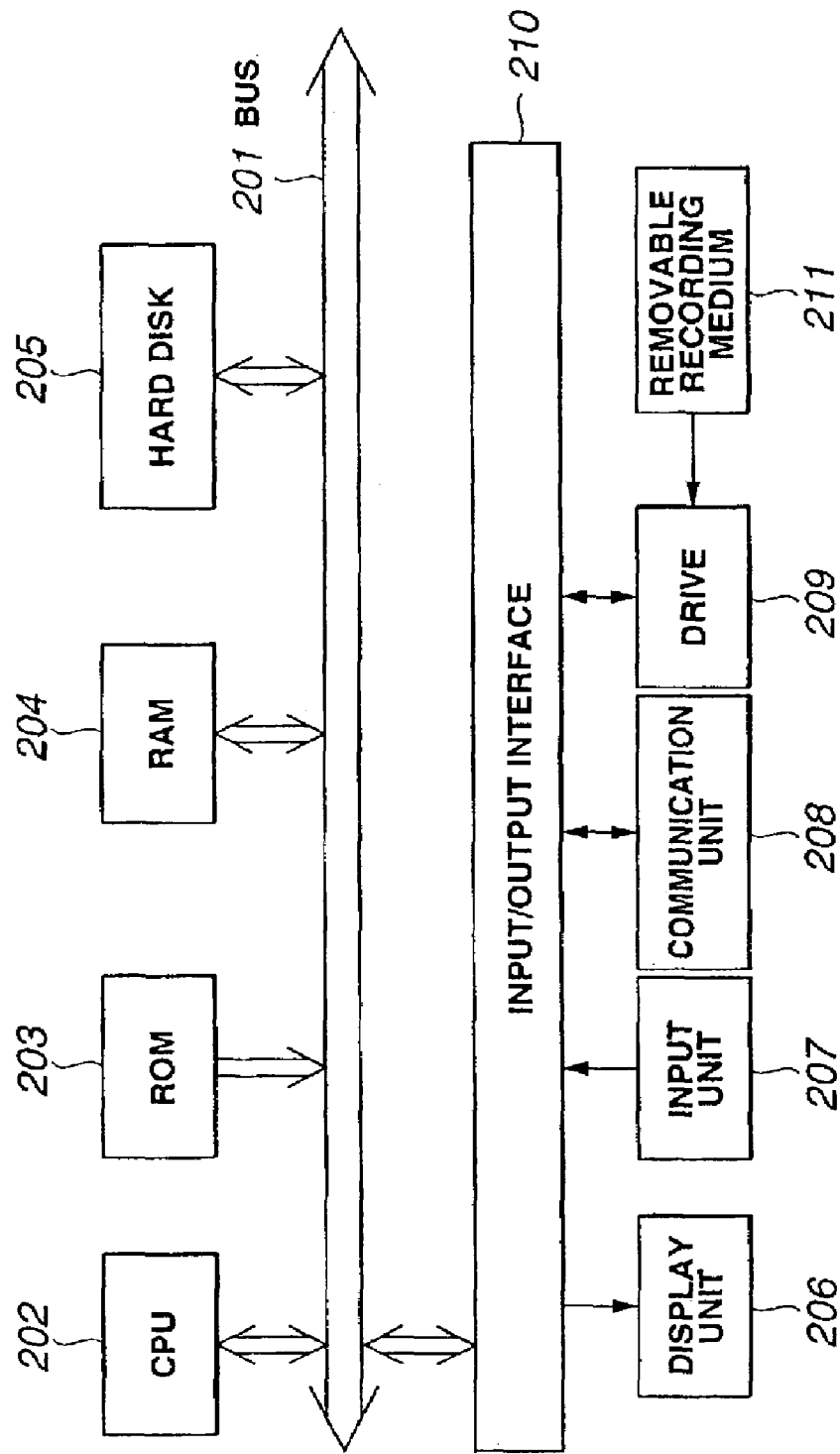
FIG. 30 is a block diagram showing an exemplary structure of an embodiment of a computer to which the present invention is applied.

FIG. 30 shows an exemplary structure of an embodiment of a computer in which a program for executing the above-described series of processing is stalled.

The program can be stored in advance on a hard disk 205 and a ROM 203 as built-in recording media in the computer.

Alternatively, the program can be temporarily or permanently stored (recorded) on a removable recording medium 211 such as a floppy disk, a CD-ROM (compact disc read only memory), an MO (magneto-optical) disc, a DVD (digital versatile disc), a magnetic disk, or a semiconductor memory. The removable recording medium 211 can be provided as so-called package software.

The program can be installed into the computer from the removable recording medium 211 as described above, and can also be transferred to the computer by radio communication from a download site via an artificial satellite for digital satellite broadcast, or transferred to the computer by wired communication via a network such as LAN (local area network) or the Internet. In the computer, a communication unit 208 can receive the transferred program and install the program onto the built-in hard disk 205.

The computer has a built-in CPU (central processing unit) 202. An input/output interface 210 is connected to the CPU 202 via a bus 201. When a command is entered via the input/output interface 210 as a user operates an input unit 207 made up of a keyboard, a mouse and so on, the CPU 202 executes the program stored in the ROM (read only memory) 203 in accordance with the command. Alternatively, the CPU 202 loads to the RAM 204 the program stored on the hard disk 205, the program transferred from the satellite or the network, received by the communication unit 208 and installed on the hard disk 205, or the program read out from the removable recording medium 211 loaded on a drive 209 and installed on the hard disk 205, and then executes the program. Thus, the CPU 202 carries out the processing in accordance with the above-described flowcharts or the processing in accordance with the structures of the above-described block diagrams. The CPU 202 outputs the result of processing from an output unit 206 made up of an LCD (liquid crystal display), a speaker and so on, or transmits the result of processing from the communication unit 208, or records the result of processing onto the hard disk 205, via the input/output interface 210, when necessary.

In this specification, the processing step of describing the program for causing the computer to execute various types of processing is not necessarily the time-series processing in the order described in the flowcharts and includes the processing executed in parallel or individually (for example, parallel processing or processing by object).

The program may be processed by one computer or may be processed in distributed processing by a plurality of computers. The program may also be transferred to a remote computer and executed thereby.

Although image data is used in the above-described embodiments, the present invention can also be applied to audio data and the like.

Moreover, though an embedded image is provided via a satellite link in the above-described embodiments, the embedded image can also be provided via ground waves or various types of transmission media such as the Internet and CATV, or can be recorded on various types of recording media such as an optical disc, a magneto-optical disc, a magnetic tap and a semiconductor memory.

INDUSTRIAL APPLICABILITY

With the data processing device and method, the recording medium and the program according to the present invention, improvement information for improving the quality of data is generated and the improvement information is embedded into the data. Therefore, it is possible to provide, for example, data having improvement information embedded therein, data having improvement information extracted therefrom, and data with its quality improved by improvement information.

With the data processing device and method, the recording medium and the program according to the present invention, improvement information is extracted from embedded data and the quality of data is improved by using the improvement information. Therefore, it is possible to receive the provision of high-quality data.

With the data processing device and method, the recording medium and the program according to the present invention, a plurality of types of improvement information for improving the quality of data are generated, and the data and one or more types of improvement information are transmitted. Therefore, it is possible to provide data of a plurality of qualities.

Moreover, with the data processing device and method, the recording medium and the program according to the present invention, data and one or more types of improvement information are supplied, and the quality of the data is improved by using the one or more types of improvement information while accounting is carried out in accordance with the improvement information used for improving the quality of the data. Therefore, it is possible to receive the provision of data of the quality corresponding to the amount paid.

The invention claimed is:

1. A data processing device comprising:
   an improvement information generating unit adapted to generate improvement information for improving quality of data; and
   an embedding unit adapted to embed a plurality of types of improvement information into the data, wherein the improvement information generating unit generates the plurality of types of improvement information for converting the data into a plurality of qualities, and
   wherein the embedding unit embeds the plurality of types of improvement information into the data so that the data and the improvement information can be restored.

2. The data processing device as claimed in claim 1, wherein the improvement information generating unit generates a prediction coefficient used for predicting a prediction value of quality-improved data obtained by improving the quality of the data, as the improvement information.

3. The data processing device as claimed in claim 2, wherein the improvement information generating unit generates the prediction coefficient for each predetermined class.

4. The data processing device as claimed in claim 3, wherein the improvement information generating unit comprises:
   a class tap constructing unit adapted to construct a class tap used for finding a class of target teacher data of teacher data to be a teacher, by using learner data to be a learner;

a classifying unit adapted to carry out classification for finding the class among the target teacher data on a basis of the class tap;

a prediction tap constructing unit adapted to construct a prediction tap used together with the prediction coefficient for predicting the target teacher data, by using the learner data; and a prediction coefficient operation unit adapted to find the prediction coefficient for each class by using the teacher data and the prediction tap.

5. The data processing device as claimed in claim 4, wherein the improvement information generating unit generates a plurality of types of improvement information.

6. The data processing device as claimed in claim 5, wherein the improvement information generating unit generates prediction coefficients for different number of classes as the plurality of types of improvement information.

7. The data processing device as claimed in claim 5, wherein the improvement information generating unit generates a plurality of types of prediction coefficients found by using learner data or teacher data of different qualities, as the plurality of types of improvement information.

8. The data processing device as claimed in claim 5, wherein the improvement information generating unit generates at least the prediction coefficient and information for carrying out linear interpolation, as the plurality of types of improvement information.

9. The data processing device as claimed in claim 5, wherein the improvement information generating unit generates a plurality of types of prediction coefficients found by using class taps or prediction taps of different structures, as the plurality of types of improvement information.

10. The data processing device as claimed in claim 5, wherein the improvement information generating unit generates a plurality of types of prediction coefficients found by carrying out classification by different methods, as the plurality of types of improvement information.

11. The data processing device as claimed in claim 1, wherein the improvement information generating unit generates, as the improvement information, a class code expressing the class of the data, used for predicting the prediction value of the quality-improved data obtained by improving the quality of the data.

12. The data processing device as claimed in claim 11, wherein the improvement information generating unit comprises:

a prediction tap constructing unit adapted to construct a prediction tap used for predicting target teacher data of teacher data to be a teacher, by using learner data to be a learner;

a prediction coefficient storage unit adapted to store a prediction coefficient for each class code found by learning;

a predictive operation unit adapted to find a prediction value of the target teacher data by using the prediction tap and the prediction coefficient; and a class code detecting unit adapted to detect the class code of a prediction coefficient that minimizes the prediction value of the target teacher data; and wherein the improvement information generating unit outputs the class code detected by the class code detecting unit, as the improvement information.

13. The data processing device as claimed in claim 11, wherein the improvement information generating unit comprises:

a class tap constructing unit adapted to generate a class tap used for finding the class of target teacher data of teacher data to be a teacher, by using the teacher data; and a classifying unit adapted to carry out classification for finding the class of the target teacher data on the basis of the class tap; and wherein the improvement information generating unit outputs a class code corresponding to the class found by the classifying unit, as the improvement information.

14. The data processing device as claimed in claim 1, wherein the embedding unit embeds the improvement information into the data so that the data and the improvement information can be restored, by using a bias of energy held by the data.

15. The data processing device as claimed in claim 1, wherein the embedding unit embeds the improvement information into the data by carrying out spectrum spreading.

16. The data processing device as claimed in claim 1, wherein the embedding unit embeds the improvement information into the data by changing one or more bits of the data to the improvement information.

17. The data processing device as claimed in claim 1, wherein the data is image data and the improvement information is information for improving image quality of the image data.

18. A data processing method comprising:

an improvement information generating step of generating improvement information for improving quality of data; and an embedding step of embedding a plurality of types of improvement information into the data, wherein the improvement information generating step generates the plurality of types of improvement information for converting the data into a plurality of qualities and, wherein the embedding step embeds the plurality of types of improvement information into the data so that the data and the improvement information can be restored.

19. A recording medium having recorded thereon a program to be executed by a computer, the program comprising:

an improvement information generating step of generating improvement information for improving quality of data; and an embedding step of embedding a plurality of types of improvement information into the data, wherein the improvement information generating step generates the plurality of types of improvement information for converting the data into a plurality of qualities and, wherein the embedding step embeds the plurality of types of improvement information into the data so that the data and the improvement information can be restored.

20. A data processing device for processing embedded data obtained by embedding a plurality of types of improvement information for improving quality of data into the data, the device comprising:

an extracting unit adapted to extract the plurality of types of improvement information from the embedded data, wherein the plurality of types of improvement information convert the data into a plurality of qualities; and an improving unit adapted to improve the quality of the data by using one of the plurality of types of improvement information according to a user request and wherein the plurality of types of improvement information are embedded into the data so that the data and the improvement information can be restored.

21. The data processing device as claimed in claim 20, wherein the improvement information is a prediction coefficient used for predicting a prediction value of quality-improved data obtained by improving the quality of the data, and the improving unit finds the prediction value of the quality-improved data by using the data and the prediction coefficient.

22. The data processing device as claimed in claim 21, wherein the improvement information is a prediction coefficient found for each predetermined class, and the improving unit finds the prediction value of the quality-improved data by using the data and the prediction coefficient for each class.

23. The data processing device as claimed in claim 22, wherein the improving unit comprises:
   a class tap constructing unit adapted to construct a class tap used for finding a class of target quality-improved data, which is targeted quality-improved data, by using the data;
   a classifying unit adapted to carry out classification for finding the class of the target quality-improved data on the basis of the class tap;
   a prediction tap constructing unit adapted to construct a prediction tap used together with a prediction coefficient for predicting the target quality-improved data, by using the data; and
   a predicting unit adapted to find a prediction value of the target quality-improved data by using the prediction coefficient of the class of the target quality-improved data and the prediction tap.

24. The data processing device as claimed in claim 20, wherein the improvement information is a class code expressing the class of a prediction coefficient for each predetermined class used for predicting a prediction value of quality-improved data obtained by improving the quality of data, and the improving unit finds the prediction value of the quality-improved data by using the data and the prediction coefficient corresponding to the class code.

25. The data processing device as claimed in claim 24, wherein the improving unit comprises:
   a prediction tap constructing unit adapted to construct a prediction tap used together with a prediction coefficient for predicting target quality-improved data, which is targeted quality-improved data, by using the data; and
   a predicting unit adapted to predict a prediction value of the target quality-improved data by using the prediction coefficient corresponding to the class code as the improvement information and the prediction tap.

26. The data processing device as claimed in claim 23, wherein a plurality of types of improvement information are embedded in the embedded data.

27. The data processing device as claimed in claim 26, wherein the prediction coefficients for different numbers of classes are embedded in the embedded data as the plurality of types of improvement information.

28. The data processing device as claimed in claim 26, wherein the prediction coefficient is generated by using learner data to be a learner and teacher data to be a teacher, and a plurality of types of prediction coefficients found by using learner data or teacher data of different qualities are embedded in the embedded data as the plurality of types of improvement information.

29. The data processing device as claimed in claim 26, wherein at least the prediction coefficient and information for carrying out linear interpolation are embedded in the embedded data as the plurality of types of improvement information.

30. The data processing device as claimed in claim 26, wherein a plurality of types of prediction coefficients found by using class taps or prediction taps of different structures are embedded in the embedded data as the plurality of types of improvement information.

31. The data processing device as claimed in claim 26, wherein a plurality of types of prediction coefficients found by carrying out classification by different methods are embedded in the embedded data as the plurality of types of improvement information.

32. The data processing device as claimed in claim 26, further comprising an improvement information selecting unit adapted to select improvement information used for improving the quality of the data, from the plurality of types of improvement information.

33. The data processing device as claimed in claim 20, wherein the extracting unit extracts the improvement information from the embedded data by using the bias of energy held by the data.

34. The data processing device as claimed in claim 20, wherein the extracting unit extracts the improvement information from the embedded data by carrying out inverse spectrum spreading.

35. The data processing device as claimed in claim 20, wherein the extracting unit extracts one or more bits of the embedded data as the improvement information.

36. The data processing device as claimed in claim 20, wherein the data is image data and the improvement information is information for improving the image quality of the image data.

37. A data processing method for processing embedded data obtained by embedding a plurality of types of improvement information for improving quality of data into the data, the method comprising:
   an extracting step of extracting the plurality of types of improvement information from the embedded data, wherein the plurality of types of improvement information convert the data into a plurality of qualities; and
   an improving step of improving the quality of the data by using one of the plurality of types of improvement information according to a user request and
   wherein the plurality of types of improvement information are embedded into the data so that the data and the improvement information can be restored.

38. A recording medium having recorded thereon a program to be executed by a computer for processing embedded data obtained by embedding a plurality of types of improvement information for improving the quality of data into the data, the program comprising:
   an extracting step of extracting the plurality of types of improvement information from the embedded data, wherein the plurality of types of improvement information convert the data into a plurality of qualities; and
   an improving step of improving the quality of the data by using one of the plurality of types of improvement information according to a user request and
   wherein the plurality of types of improvement information are embedded into the data so that the data and the improvement information can be restored.

39. A data processing device comprising:
   an improvement information generating unit adapted to generate a plurality of types of improvement information for improving quality of data, wherein one of the plurality of types of improvement information is embedded into the date wherein the plurality of types of improvement information convert the data into a plurality of qualities;
   an improvement information selecting unit adapted to select improvement information to be transmitted together with the data, from the plurality of types of improvement information; and;

a transmitting unit adapted to transmit the data and said one of the plurality of types of improvement information and, wherein said one of the plurality of types of improvement information is embedded into the data so that the data and the improvement information can be restored.

40. The data processing device as claimed in claim 39, further comprising improvement information selecting unit for selecting improvement information to be transmitted together with the data, from the plurality of types of improvement information.

41. The data processing device as claimed in claim 40, wherein the improvement information selecting unit selects the improvement information in response to a request from a receiving device which receives the data.

42. The data processing device as claimed in claim 41, further comprising an accounting unit adapted to carry out accounting in correspondence with the improvement information selected by the improvement information selecting unit.

43. The data processing device as claimed in claim 39, wherein the improvement information generating unit generates at least a prediction coefficient used for predicting a prediction value of quality-improved data obtained by improving the quality of the data, as the improvement information.

44. The data processing device as claimed in claim 43, wherein the improvement information generating unit generates a prediction coefficient for each predetermined class.

45. The data processing device as claimed in claim 44, wherein the improvement information generating unit comprises:
 a class tap constructing unit adapted to construct a class tap used for finding the class of target teacher data of teacher data to be a teacher, by using learner data to be a learner;
 a classifying unit adapted to carry out classification for finding the class of the target teacher data on the basis of the class tap;
 a prediction tap constructing unit adapted to construct a prediction tap used together with a prediction coefficient for predicting the target teacher data, by using the learner data; and
 a prediction coefficient operation unit adapted to find a prediction coefficient for each class by using the teacher data and the prediction tap.

46. The data processing device as claimed in claim 45, wherein the improvement information generating unit generates prediction coefficients for different numbers of classes as the plurality of types of improvement information.

47. The data processing device as claimed in claim 45, wherein the improvement information generating unit generates a plurality of types of prediction coefficients found by using learner data or teacher data of different qualities, as the plurality of types of improvement information.

48. The data processing device as claimed in claim 45, wherein the improvement information generating unit generates at least the prediction coefficient and information for carrying out linear interpolation, as the plurality of types of improvement information.

49. The data processing device as claimed in claim 45, wherein the improvement information generating unit generates a plurality of types of prediction coefficients found by using class taps or prediction taps of different structures, as the plurality of types of improvement information.

50. The data processing device as claimed in claim 45, wherein the improvement information generating unit generates a plurality of types of prediction coefficients found by carrying out classification by different methods, as the plurality of types of improvement information.

51. The data processing device as claimed in claim 39, wherein the transmitting unit embeds the improvement information into the data so that the data and the improvement information can be restored, by using the bias of energy held by the data, and transmits the data and one or more types of improvement information.

52. The data processing device as claimed in claim 39, wherein the transmitting unit embeds the improvement information into the data by carrying out spectrum spreading and transmits the data and one or more types of improvement information.

53. The data processing device as claimed in claim 39, wherein the transmitting unit embeds the improvement information into the data by changing one or more bits of the data to the improvement information and transmits the data and one or more types of improvement information.

54. The data processing device as claimed in claim 39, wherein the transmitting unit transmits the data and all the plurality of types of improvement information.

55. The data processing device as claimed in claim 39, wherein the data is image data and the improvement information is information for improving the image quality of the image data.

56. A data processing method comprising:
 an improvement information generating step of generating a plurality of types of improvement information for improving quality of data, wherein the plurality of types of improvement information convert the data into a plurality of qualities;
 an improvement information selecting unit adapted to select improvement information to be transmitted together with the data, from the plurality of types of improvement information, wherein one of the plurality of types of improvement information is embedded into the data; and;
 a transmitting step of transmitting the data and said one of the plurality of types of improvement information and,
 wherein said one of the plurality of types of improvement information is embedded into the data so that the data and the improvement information can be restored.

57. A recording medium having recorded thereon a program to be executed by a computer, the program comprising:
 an improvement information generating step of generating a plurality of types of improvement information for improving the quality of data, wherein the plurality of types of improvement information convert the data into a plurality of qualities;
 an improvement information selecting unit adapted to select improvement information to be transmitted together with the data, from the plurality of types of improvement information, wherein one of the plurality of types of improvement information is embedded into the data; and;
 a transmitting step of transmitting the data and said one of the plurality of types of improvement information and,
 wherein said one of the plurality of types of improvement information is embedded into the data so that the data and the improvement information can be restored.

58. A data processing device comprising:
 an improvement information generating unit adapted to generate improvement information for improving quality of data; and
 an embedding unit adapted to embed improvement information into the data, wherein the embedding unit embeds the improvement information into the data so that the data and the improvement information can be restored, by using a bias of energy held by the data.

59. A data processing device for processing embedded data obtained by embedding improvement information for improving quality of data into the data, the device comprising:
an extracting unit adapted to extract the improvement information from the embedded data; and
an improving unit adapted to improve the quality of the data by using the improvement information, wherein the extracting unit extracts the improvement information from the embedded data by using the bias of energy held by the data.

60. A data processing device comprising:
an improvement information generating unit adapted to generate a plurality of types of improvement information for improving quality of data;
an improvement information selecting unit for selecting improvement information to be transmitted together with the data, from the plurality of types of improvement information; and
a transmitting unit adapted to transmit the data and one or more types of improvement information, wherein the improvement information selecting unit selects the improvement information in response to a request from a receiving device which receives the data.

61. A data processing device comprising:
an improvement information generating unit adapted to generate a plurality of types of improvement information for improving quality of data;
an improvement information selecting unit for selecting improvement information to be transmitted together with the data, from the plurality of types of improvement information;
a transmitting unit adapted to transmit the data and one or more types of improvement information; and
an accounting unit adapted to carry out accounting in correspondence with the improvement information selected by the improvement information selecting unit, wherein the improvement information selecting unit selects the improvement information in response to a request from a receiving device which receives the data.

62. A data processing device comprising:
an improvement information generating unit adapted to generate a plurality of types of improvement information for improving quality of data; and
a transmitting unit adapted to transmit the data and one or more types of improvement information, wherein the transmitting unit embeds the improvement information into the data so that the data and the improvement information can be restored, by using the bias of energy held by the data, and transmits the data and one or more types of improvement information.

63. A data processing device comprising:
an improvement information generating unit adapted to generate a plurality of types of improvement information for improving quality of data based on either receiving a selecting signal at a transmitting device or receiving, at the transmitting device, a request from a receiving device which receives the data; and
an embedding unit adapted to embed the plurality of types of improvement information into the data, wherein the improvement information generating unit generates the plurality of types of improvement information for converting the data into a plurality of qualities, and
wherein the embedding unit embeds the plurality of types of improvement information into the data so that the data and the improvement information can be restored.

64. A data processing method comprising:
an improvement information generating step of generating a plurality of types of improvement information for improving quality of data based on either receiving a selecting signal at a transmitting device or receiving, at the transmitting device, a request from a receiving device which receives the data; and
an embedding step of embedding the plurality of types of improvement information into the data, wherein the improvement information generating step generates the plurality of types of improvement information for converting the data into a plurality of qualities and,
wherein the embedding step embeds the plurality of types of improvement information into the data so that the data and the improvement information can be restored.

65. A recording medium having recorded thereon a program to be executed by a computer, the program comprising:
an improvement information generating step of generating a plurality of types of improvement information for improving quality of data based on either receiving a selecting signal at a transmitting device or receiving, at the transmitting device, a request from a receiving device which receives the data; and
an embedding step of embedding the plurality of types of improvement information into the data, wherein the improvement information generating step generates the plurality of types of improvement information for converting the data into a plurality of qualities and,
wherein the embedding step embeds the plurality of types of improvement information into the data so that the data and the improvement information can be restored.

* * * * *